United States Patent
Sako et al.

(10) Patent No.: US 10,546,281 B2
(45) Date of Patent: Jan. 28, 2020

(54) POWER SUPPLY DEVICE, POWER RECEIVING DEVICE AND BILLING METHOD

(71) Applicant: Sony Corporation, Tokyo (JP)

(72) Inventors: Yoichiro Sako, Tokyo (JP); Taro Tadano, Chiba (JP); Takanori Washiro, Kanagawa (JP); Kazuyoshi Takemura, Tokyo (JP); Kuniya Hayashi, Tokyo (JP); Isao Soma, Saitama (JP); Kayoko Tanaka, Tokyo (JP); Satoshi Higano, Kanagawa (JP); Kazutoshi Serita, Tokyo (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 14/376,865

(22) PCT Filed: Jan. 31, 2013

(86) PCT No.: PCT/JP2013/000534
§ 371 (c)(1),
(2) Date: Aug. 6, 2014

(87) PCT Pub. No.: WO2013/121724
PCT Pub. Date: Aug. 22, 2013

(65) Prior Publication Data
US 2015/0006343 A1  Jan. 1, 2015

(30) Foreign Application Priority Data

Feb. 13, 2012 (JP) .................................. 2012-028651
Apr. 4, 2012 (JP) .................................. 2012-085362

(51) Int. Cl.
*G06Q 20/14* (2012.01)
*H02J 50/12* (2016.01)
(Continued)

(52) U.S. Cl.
CPC .......... *G06Q 20/145* (2013.01); *G06Q 50/06* (2013.01); *H01F 38/14* (2013.01); *H02J 7/025* (2013.01);
(Continued)

(58) Field of Classification Search
CPC ...... G06Q 20/10; G06Q 20/102; G06Q 20/16; H01M 10/425
(Continued)

(56) References Cited

U.S. PATENT DOCUMENTS 5,742,229 A    4/1998  Smith
7,747,240 B1 * 6/2010  Briscoe .................. H04L 12/14
                                                          370/238

(Continued)

FOREIGN PATENT DOCUMENTS

EP    2246957 A1    11/2010
JP    57-132460 A    8/1982
(Continued)

OTHER PUBLICATIONS

[No Author Listed], Near-Field Communication. Wikipedia. Accessed online Jan. 5, 2015. http://en.wikipedia.org/wiki/Near_field_communication. 16 pages.
(Continued)

*Primary Examiner* — Vanel Frenel
(74) *Attorney, Agent, or Firm* — Chip Law Group

(57) ABSTRACT

Devices, methods, and programs for billing for electric power. A billing method may include generating billing information for an amount related to electric power transmitted by a power supply device, performing a billing process based on the billing information, and selectively transmitting electric power based on the result of the billing process. A power supply device may include a billing information generating unit, a billing processing unit, and a
(Continued)

power control unit. Another billing method may include determining whether billing information has been received, performing a billing process after it is determined that the billing information has been received, transmitting a response signal to a power supply device, and providing notice regarding information related to the billing process. A power receiving device may include a billing processing unit, a power control unit, and a notice control unit.

20 Claims, 16 Drawing Sheets

(51) Int. Cl.
*H02J 50/80* (2016.01)
*H02J 7/02* (2016.01)
*G06Q 50/06* (2012.01)
*H01F 38/14* (2006.01)
*H03C 1/00* (2006.01)
*H03H 7/01* (2006.01)
*H04B 5/00* (2006.01)

(52) U.S. Cl.
CPC .............. *H02J 50/12* (2016.02); *H02J 50/80* (2016.02); *H03C 1/00* (2013.01); *H03H 7/0115* (2013.01); *H04B 5/0037* (2013.01); *H01F 2038/143* (2013.01)

(58) Field of Classification Search
USPC ......... 705/34, 412, 39, 40, 44; 320/132, 108
See application file for complete search history.

(56) References Cited

U.S. PATENT DOCUMENTS

| | | | |
|---|---|---|---|
| 8,103,563 B2* | 1/2012 | O'Neil | G01D 4/002 |
| | | | 705/30 |
| 8,108,081 B2 | 1/2012 | Lenox | |
| 2002/0000793 A1 | 1/2002 | Hanaki | |
| 2002/0158749 A1 | 10/2002 | Ikeda et al. | |
| 2002/0198629 A1* | 12/2002 | Ellis | G06Q 10/06 |
| | | | 700/286 |
| 2003/0034757 A1* | 2/2003 | Woodnorth | H01M 10/425 |
| | | | 320/132 |
| 2005/0127757 A1 | 6/2005 | Wilson et al. | |
| 2005/0135819 A1* | 6/2005 | Ahn | G03G 15/0856 |
| | | | 399/27 |
| 2008/0010193 A1* | 1/2008 | Rackley III | G06Q 20/042 |
| | | | 705/39 |
| 2008/0197802 A1 | 8/2008 | Onishi et al. | |
| 2009/0177580 A1* | 7/2009 | Lowenthal | B60L 11/1824 |
| | | | 705/39 |
| 2009/0231320 A1* | 9/2009 | Kumakura | G09G 3/293 |
| | | | 345/212 |
| 2009/0248526 A1* | 10/2009 | Park | G06Q 20/10 |
| | | | 705/14.15 |
| 2010/0141204 A1 | 6/2010 | Tyler et al. | |
| 2010/0141777 A1* | 6/2010 | Jin | G06F 1/3218 |
| | | | 348/189 |
| 2010/0174629 A1* | 7/2010 | Taylor | G06Q 20/10 |
| | | | 705/34 |
| 2010/0201306 A1 | 8/2010 | Kazama et al. | |
| 2011/0006603 A1 | 1/2011 | Robinson et al. | |
| 2011/0022222 A1 | 1/2011 | Tonegawa | |
| 2011/0032110 A1* | 2/2011 | Taguchi | B60L 3/12 |
| | | | 340/636.1 |
| 2011/0043327 A1* | 2/2011 | Baarman | H02J 5/005 |
| | | | 340/5.8 |
| 2012/0109764 A1* | 5/2012 | Martin | G06Q 20/204 |
| | | | 705/17 |
| 2012/0233045 A1* | 9/2012 | Verfuerth | H05B 37/0272 |
| | | | 705/34 |
| 2012/0310801 A1* | 12/2012 | Komano | G06Q 10/00 |
| | | | 705/34 |
| 2013/0009607 A1* | 1/2013 | Nishibayashi | B60L 11/1844 |
| | | | 320/162 |

FOREIGN PATENT DOCUMENTS

| | | |
|---|---|---|
| JP | 2006-013683 A | 1/2006 |
| JP | 2006-109022 A | 4/2006 |
| JP | 2006-262570 A | 9/2006 |
| JP | 2008-047410 A | 2/2008 |
| JP | 2009-094768 A | 4/2009 |
| JP | 2009-164924 A | 7/2009 |
| JP | 2009-171700 A | 7/2009 |
| JP | 2010-092232 A | 4/2010 |
| WO | WO 2009/126811 A2 | 10/2009 |
| WO | WO 2011/067655 A2 | 6/2011 |
| WO | WO 2011/094627 A1 | 8/2011 |
| WO | WO 2012/026353 A1 | 3/2012 |

OTHER PUBLICATIONS

[No Author Listed], Power-line communication. Wikipedia. Accessed online Jan. 5, 2015. http://en.wikipedia.org/wiki/Power-line_communication. 5 pages.
Dig Info News Japan, NFC & Smart World. Mar. 9, 2012. YouTube video. Retrieved from https://www.youtube.com/watch?v=DS3t-7PCUYM&feature=fvwrel (.mp4 file; DVD enclosed).
Sony, Concept Movie: New Authentication Outlet. 2012. YouTube video. Retrieved from https://www.youtube.com/watch?v=dtNXXBmCQPM (.mp4 file; DVD enclosed).
U.S. Appl. No. 14/376,170, filed Aug. 1, 2014, Sako et al.
U.S. Appl. No. 14/383,916, filed Sep. 9, 2014, Sako et al.
International Search Report and Written Opinion and English translation thereof dated Apr. 9, 2013 in connection with Application No. PCT/JP2013/000429.
International Preliminary Report on Patentability and English translation thereof dated Aug. 21, 2014 in connection with Application No. PCT/JP2013/000429.
International Search Report and Written Opinion dated Jul. 9, 2013 in connection with Application No. PCT/JP2013/000534.
International Preliminary Report on Patentabilty dated Aug. 28, 2014 in connection with Application No. PCT/JP2013/000534.

* cited by examiner

[Fig. 1]
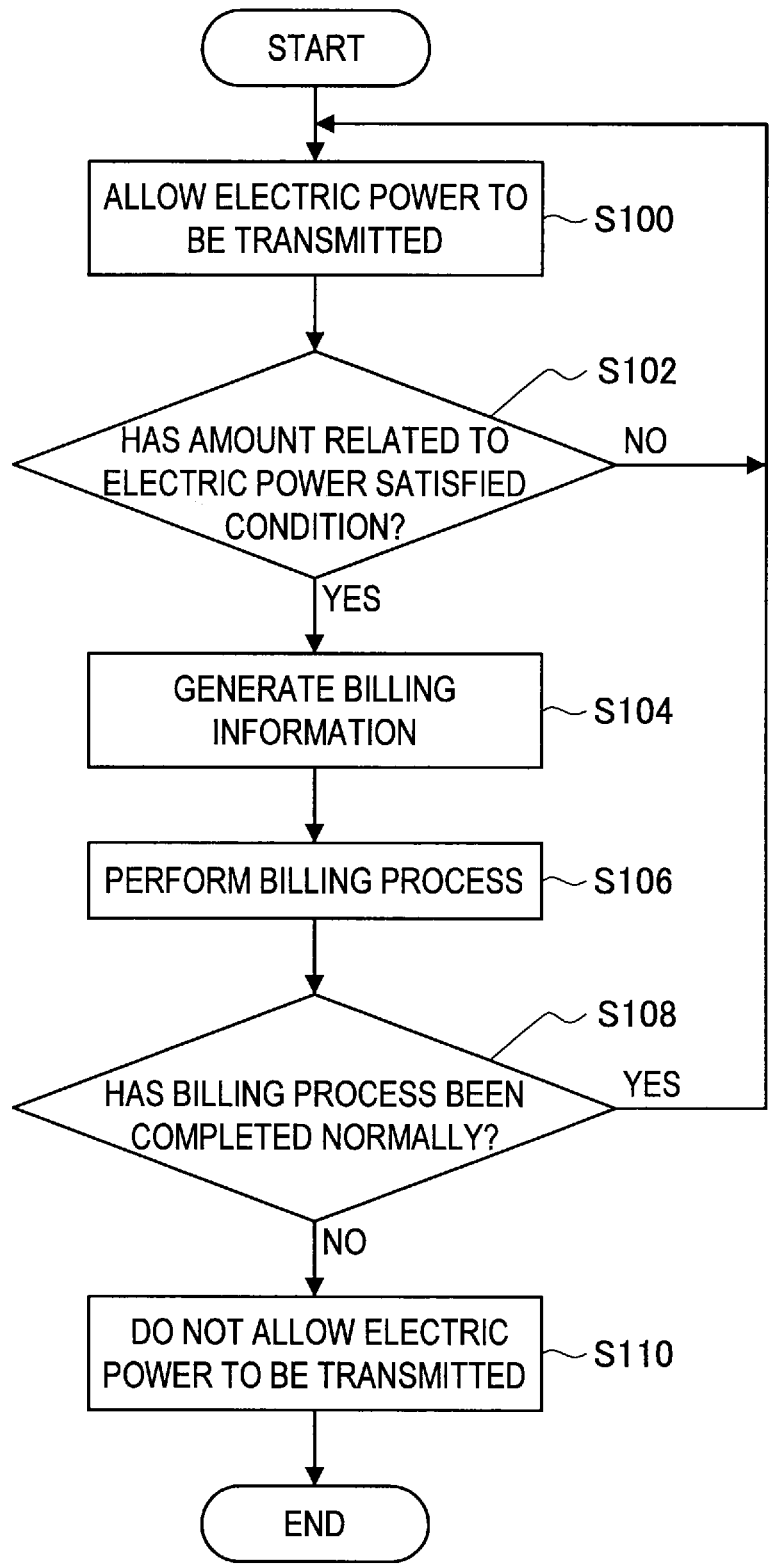

[Fig. 2]
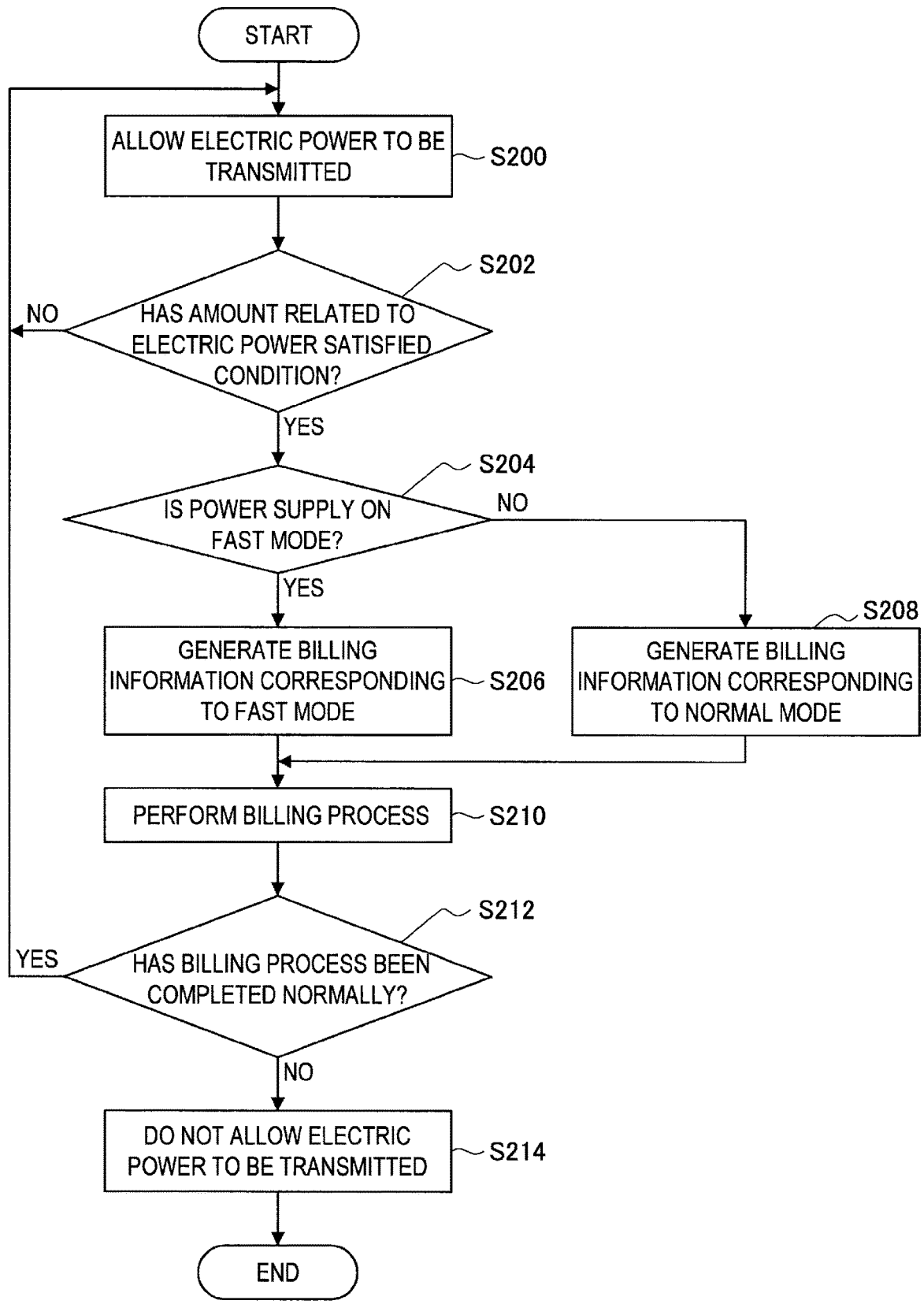

[Fig. 3]
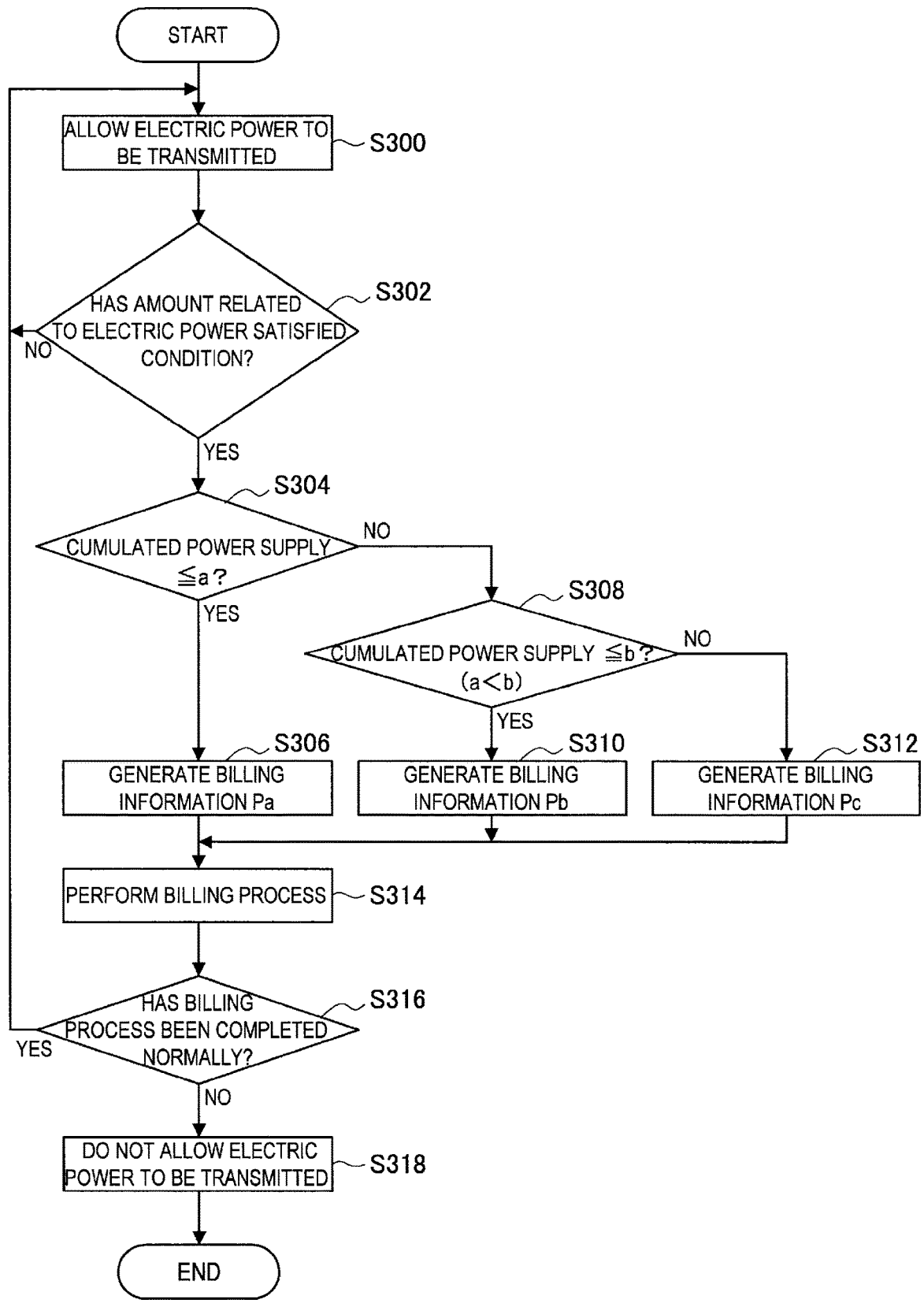

[Fig. 4]
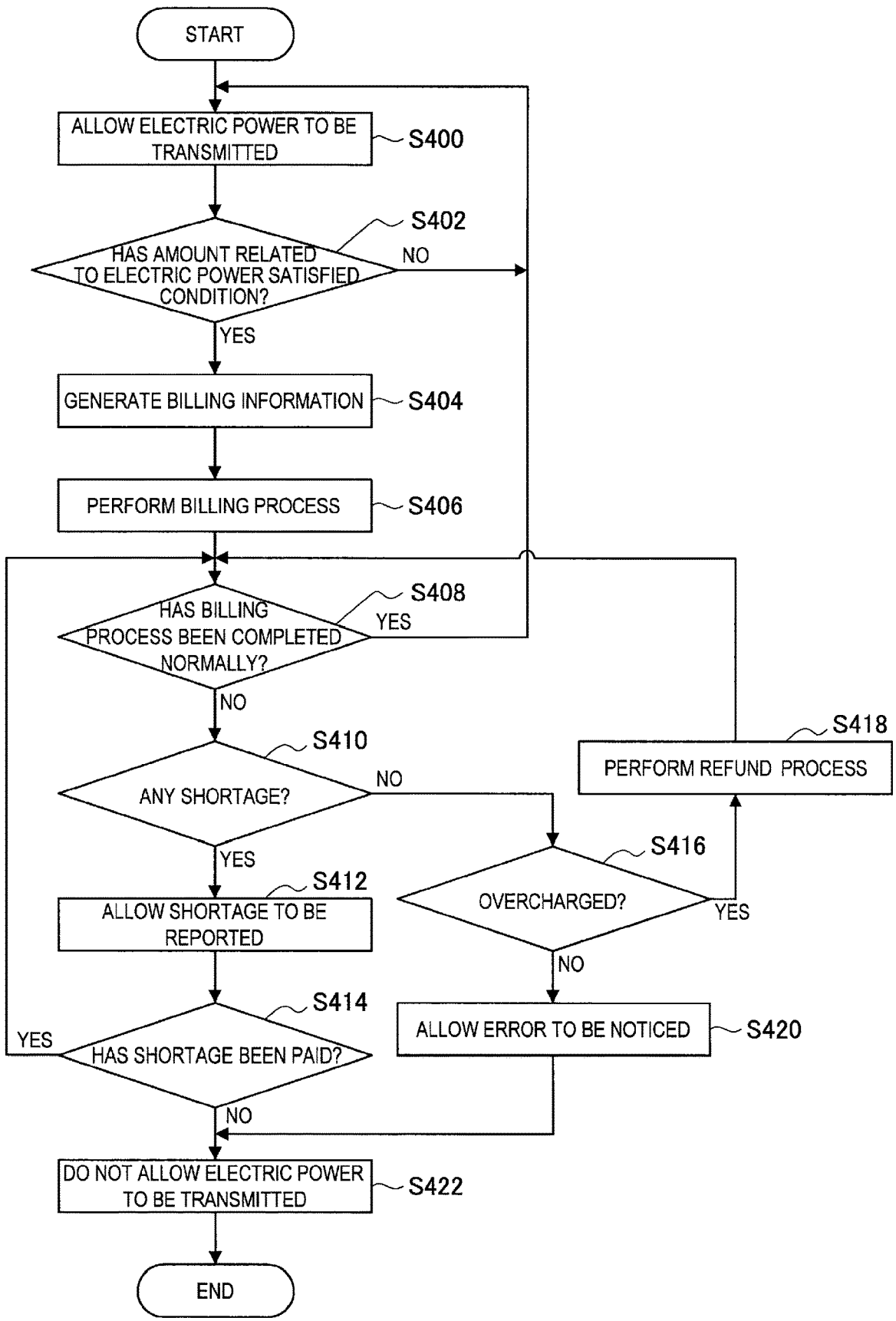

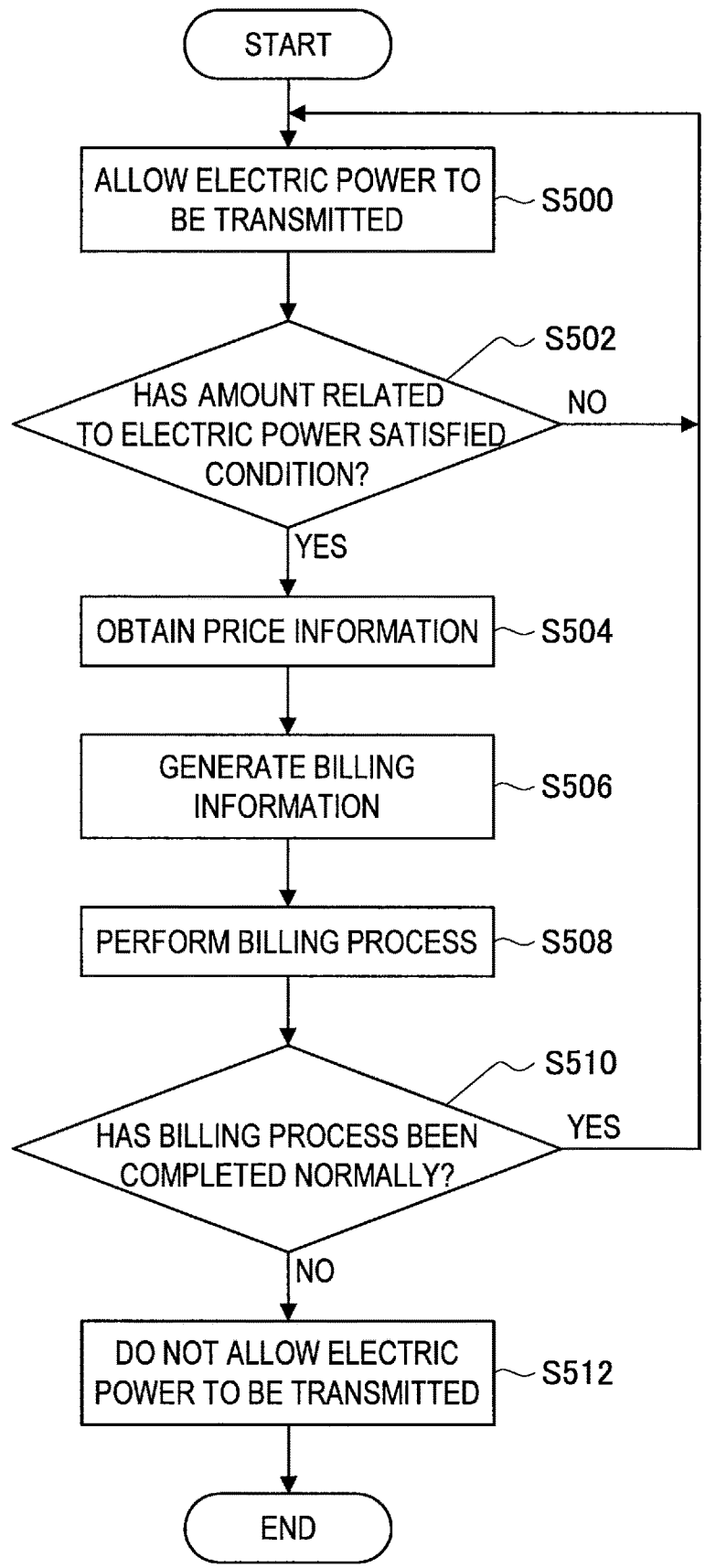
[Fig. 5]

[Fig. 6]
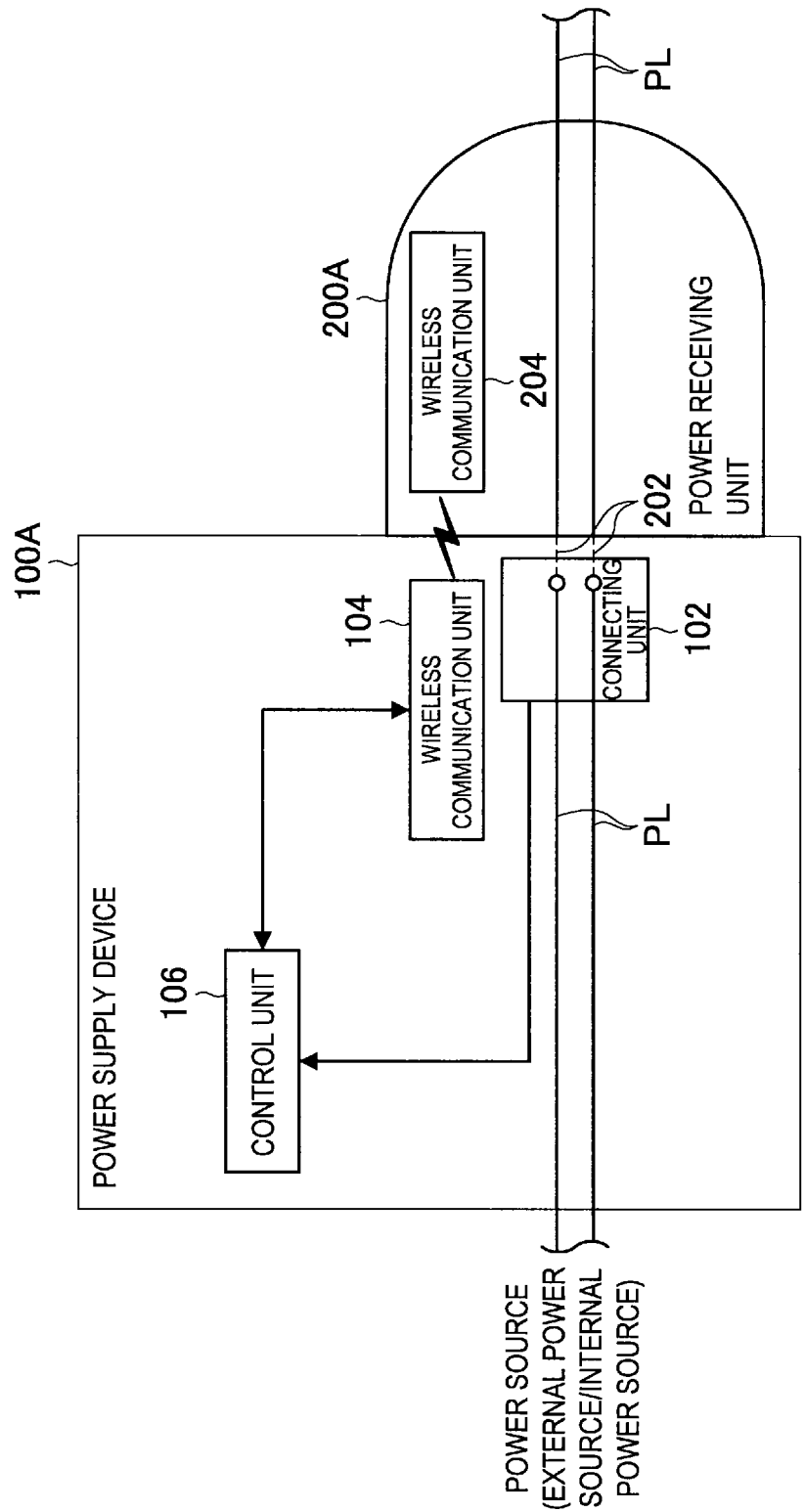

[Fig. 7]
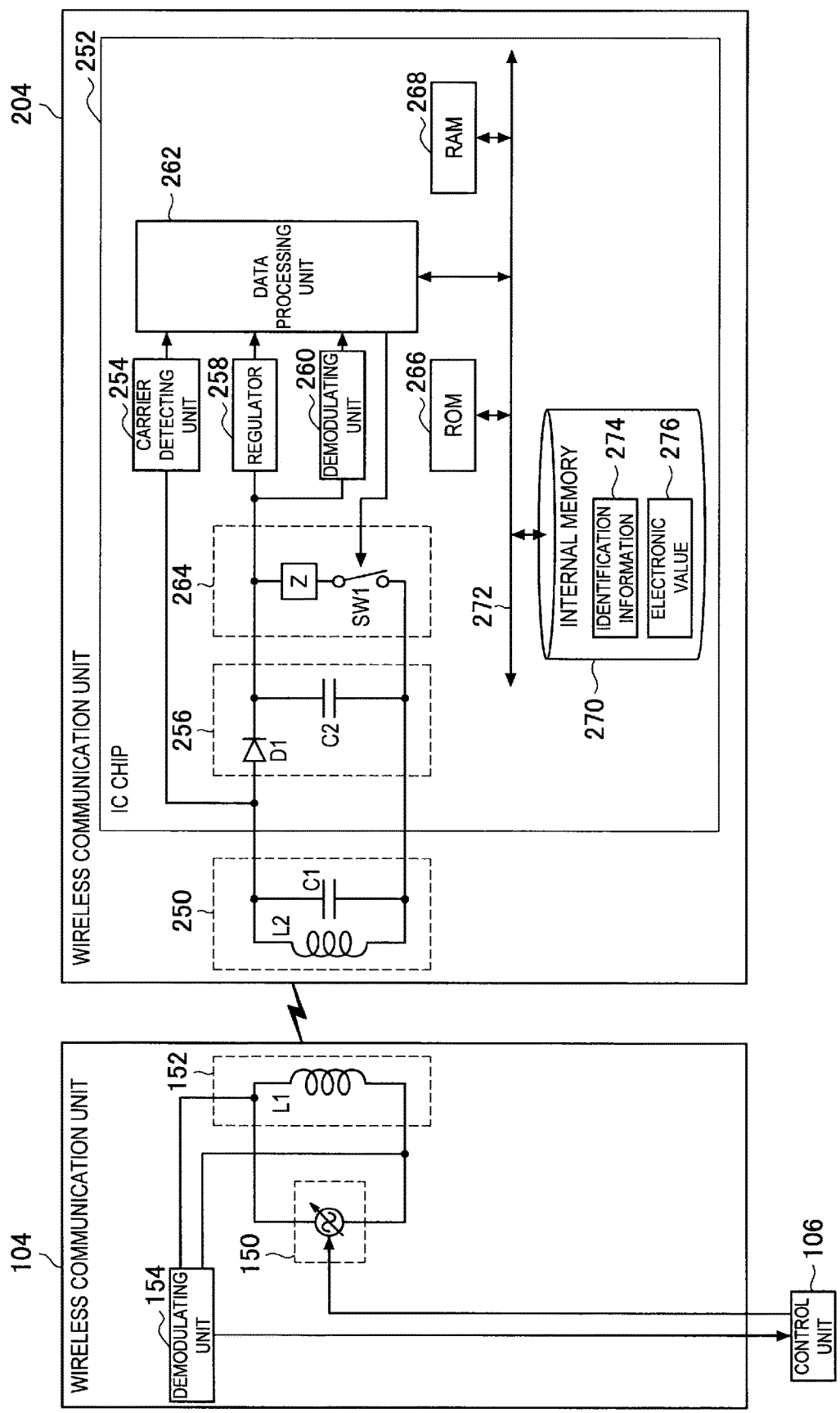

[Fig. 8]
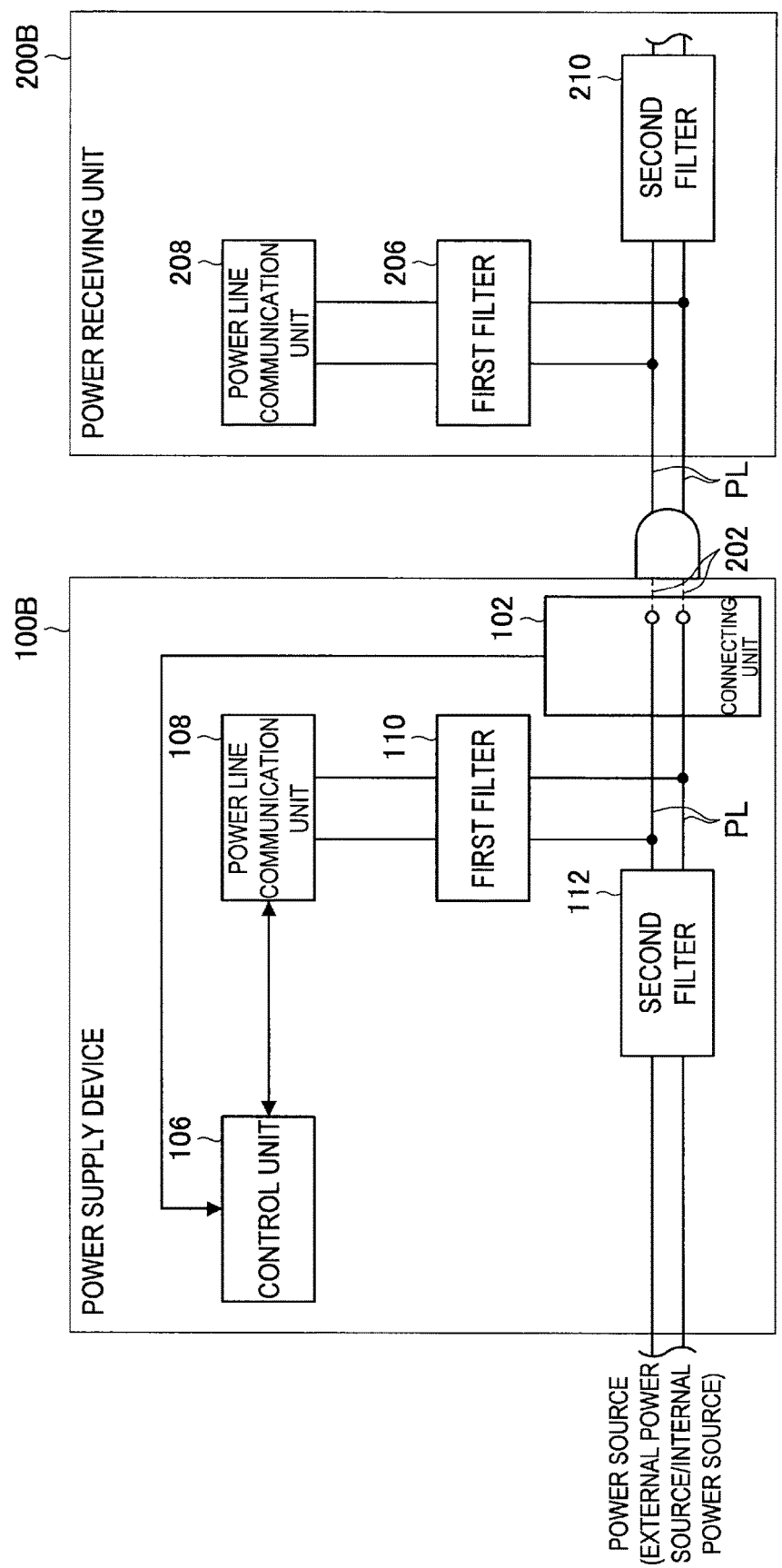

[Fig. 9]
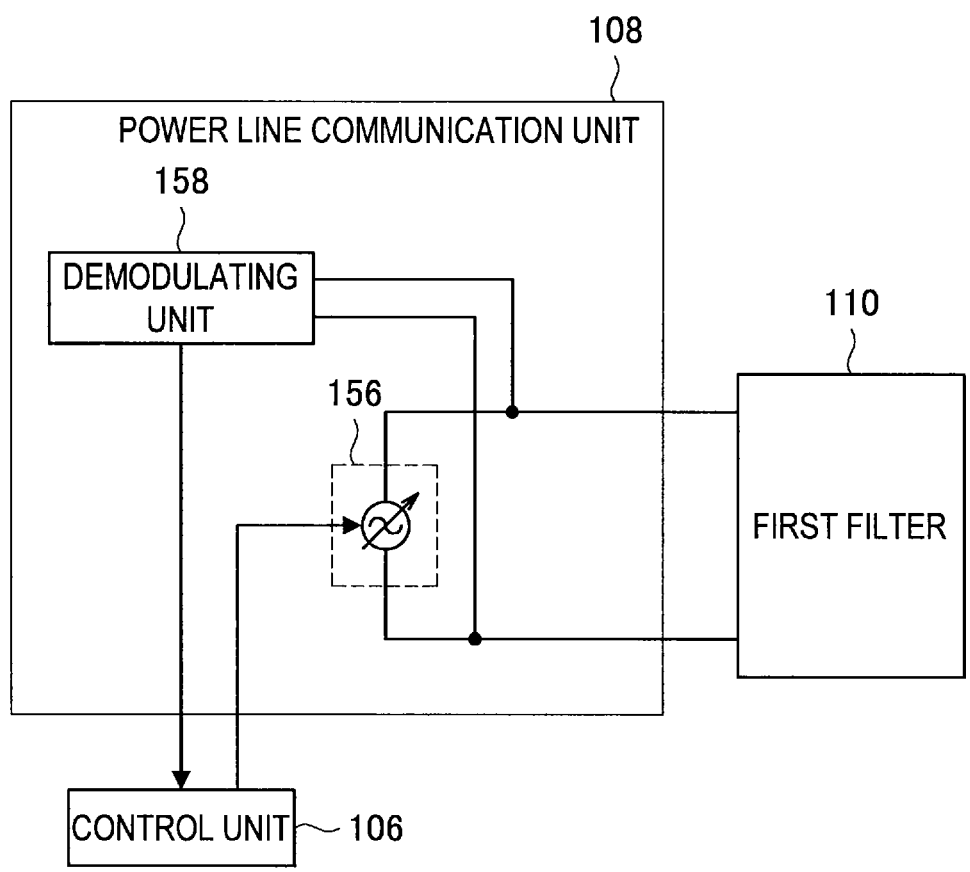

[Fig. 10]
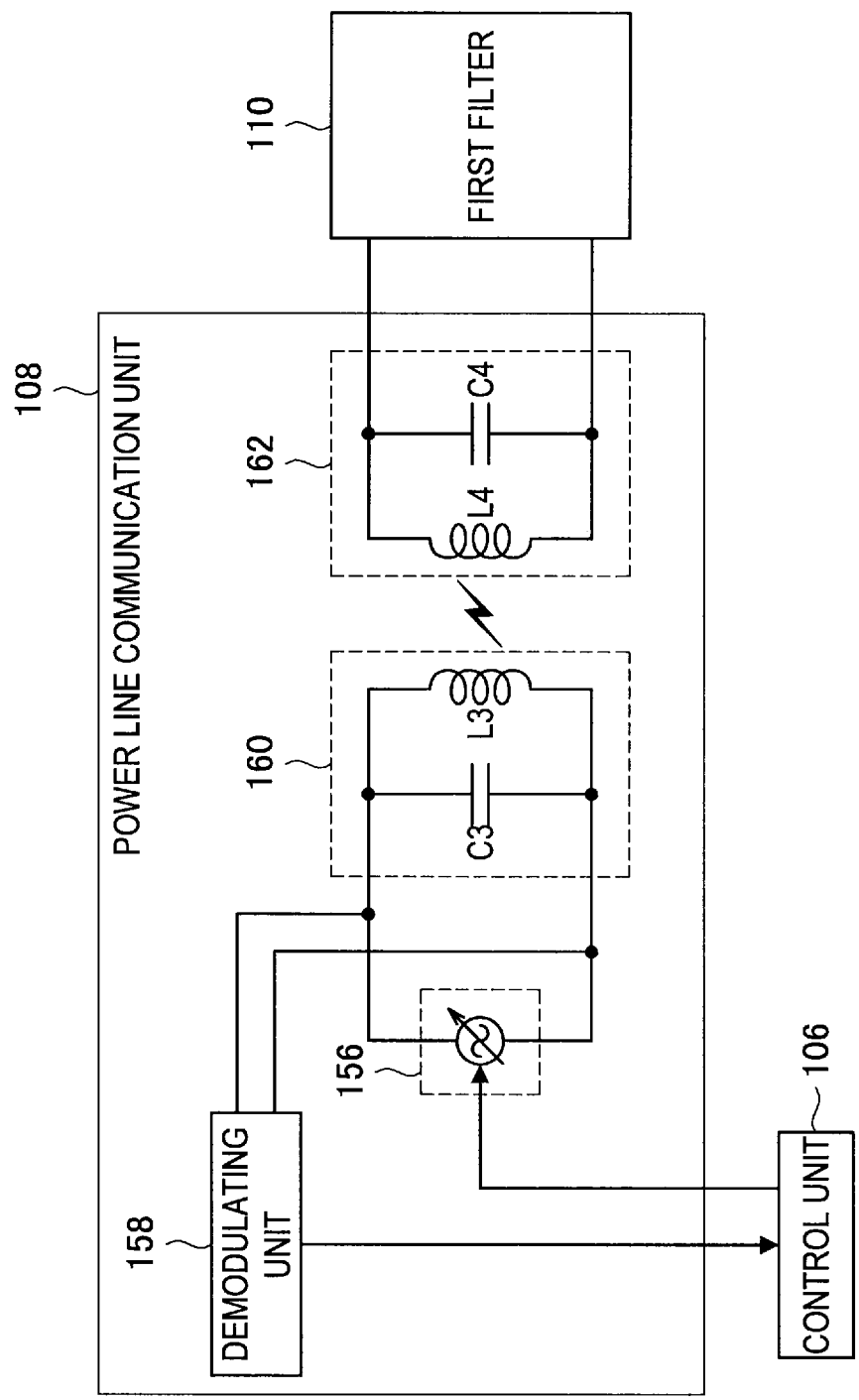

[Fig. 11]
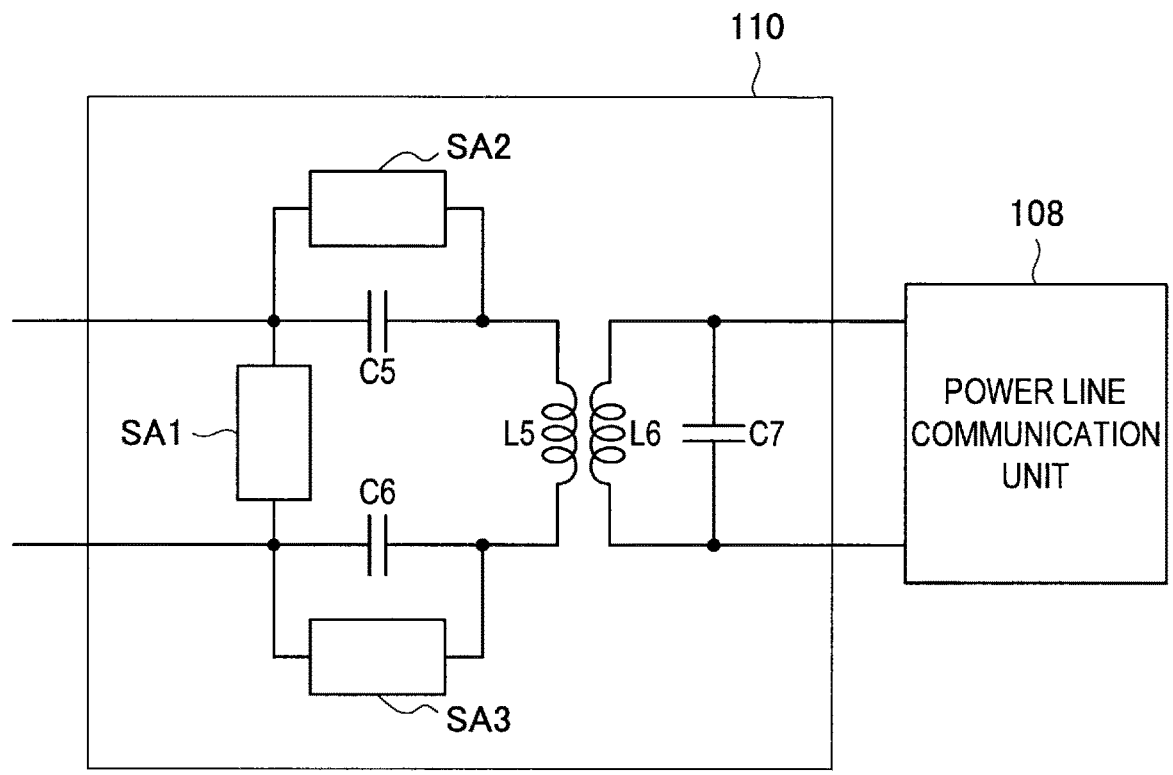
[Fig. 12]
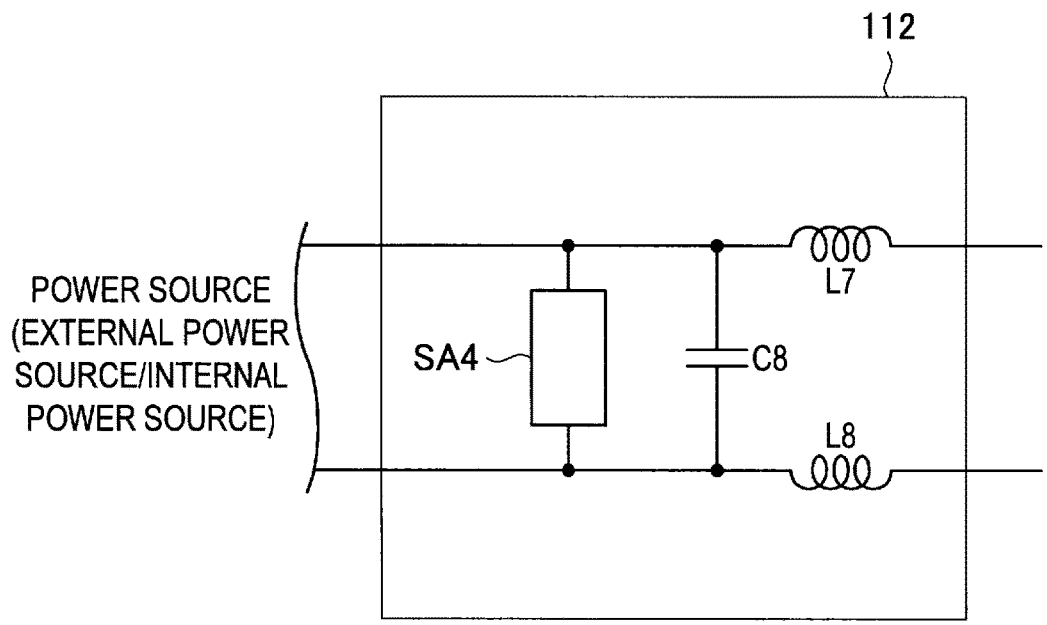

[Fig. 13]
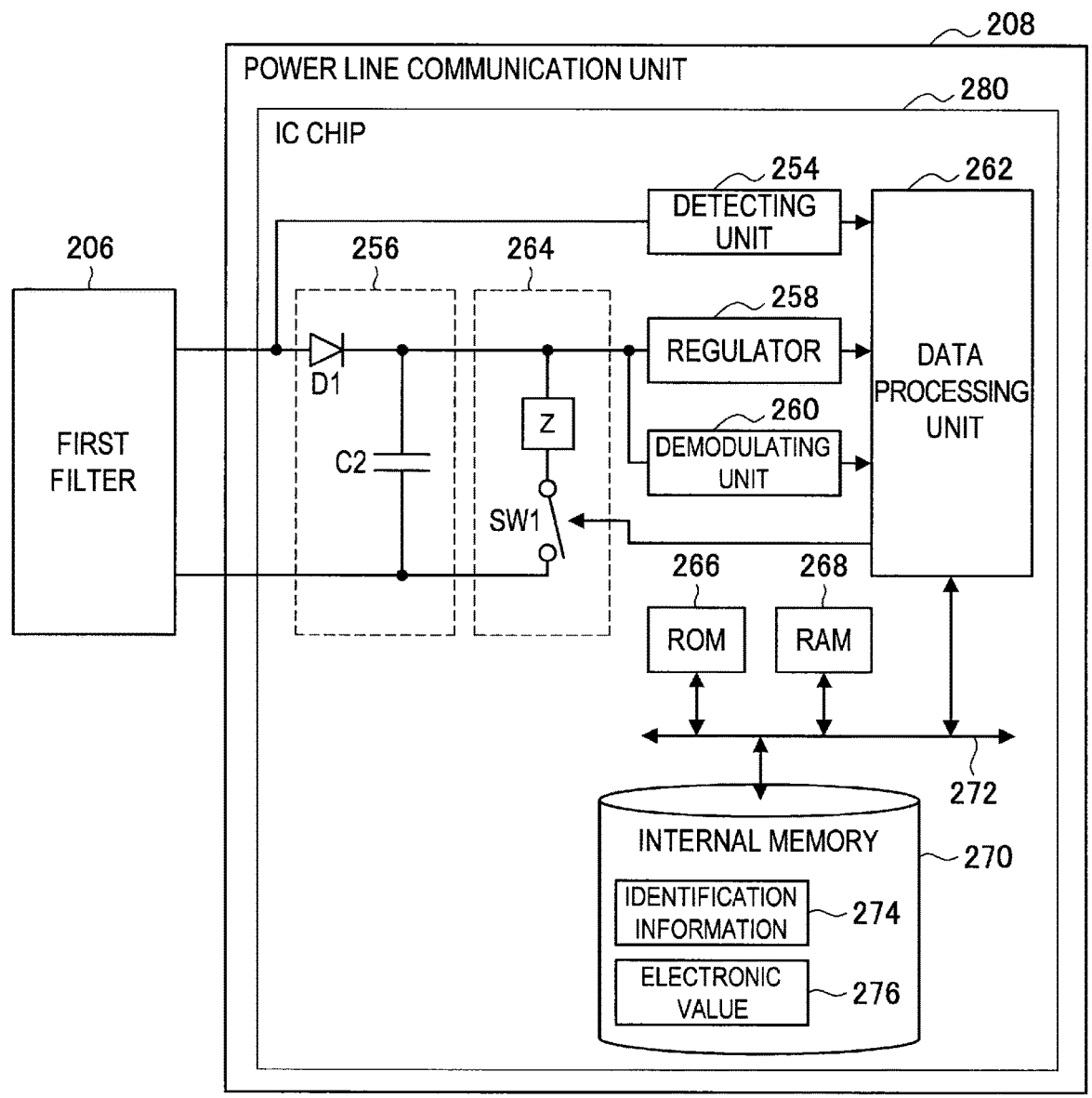

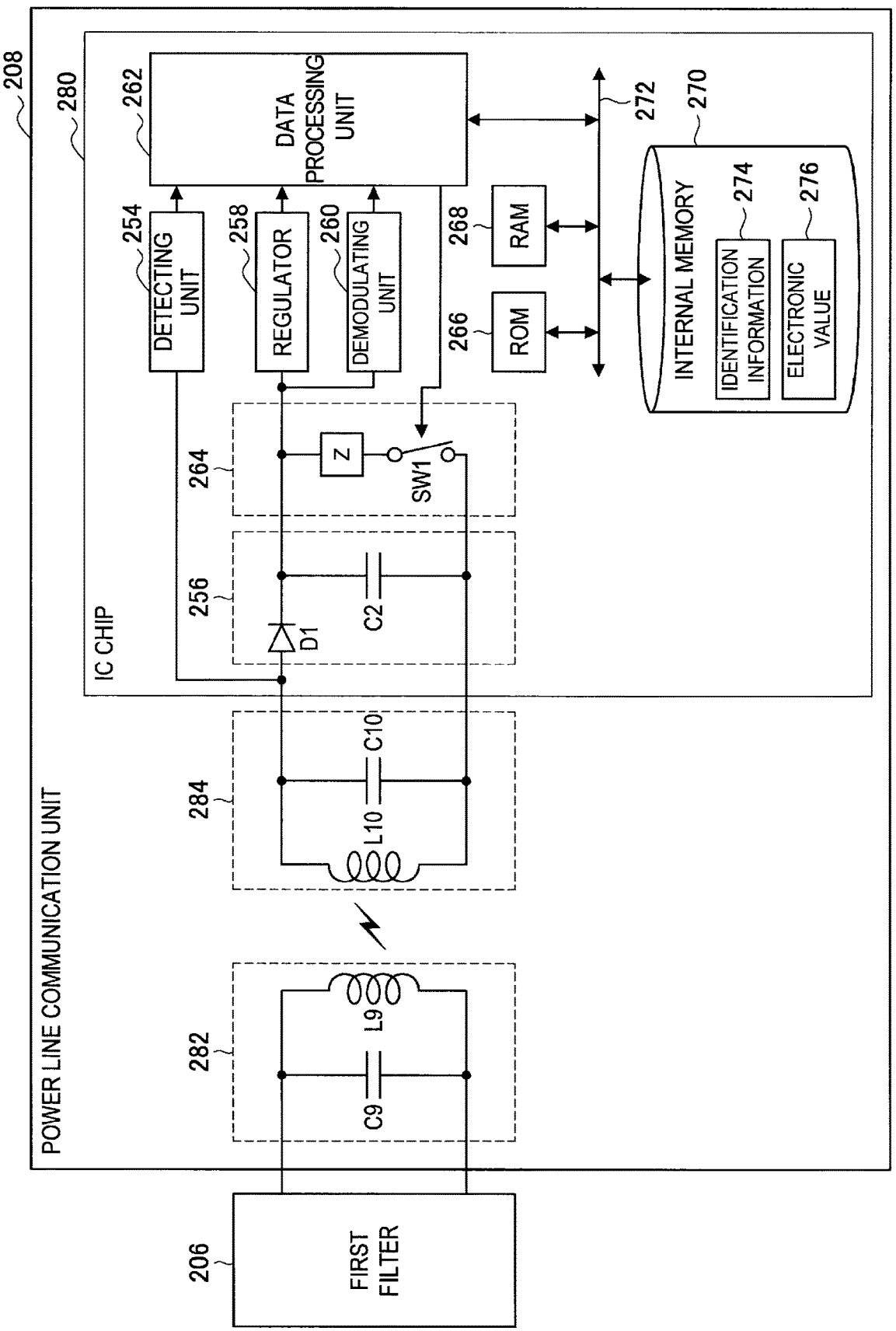

[Fig. 15]
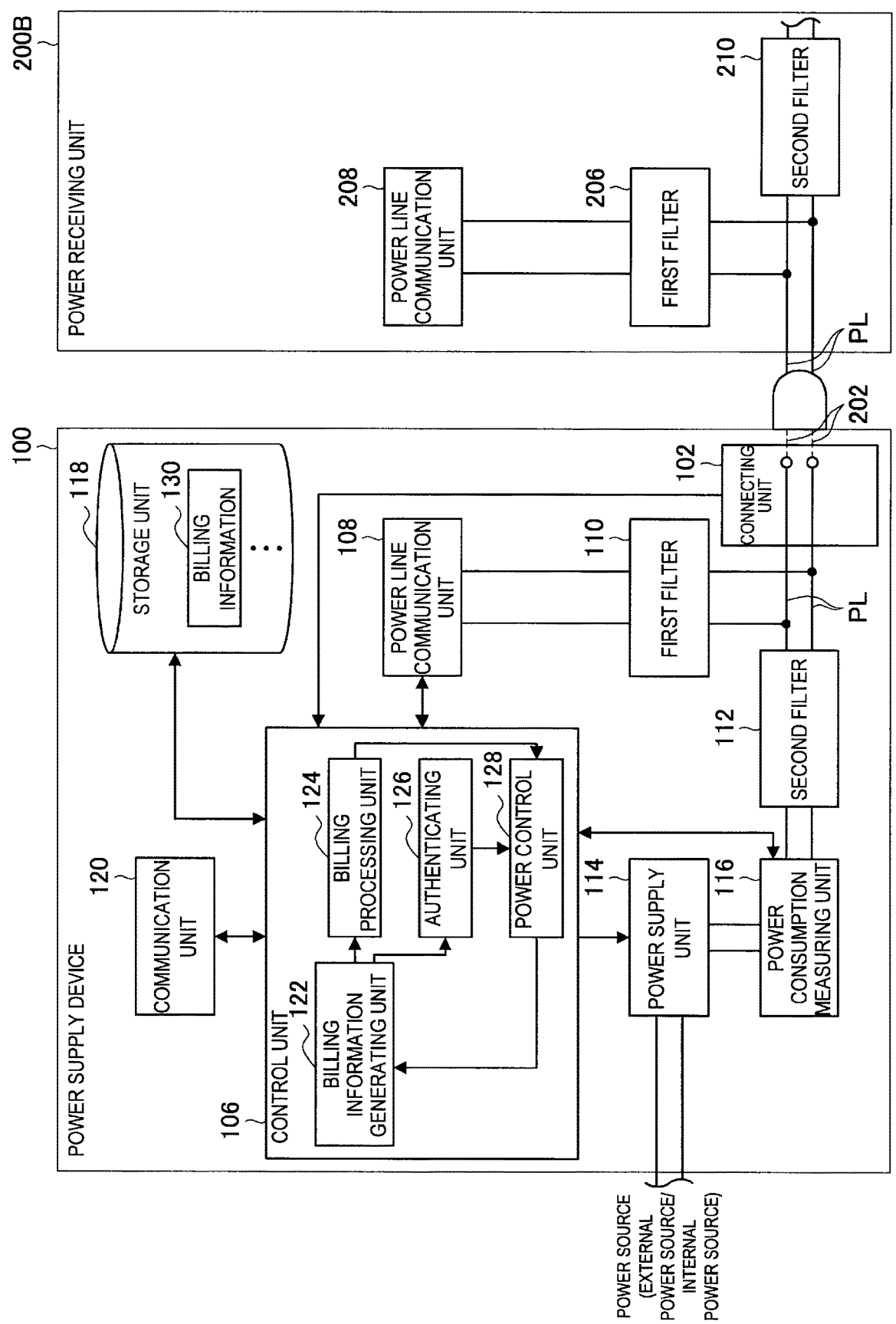

[Fig. 16]
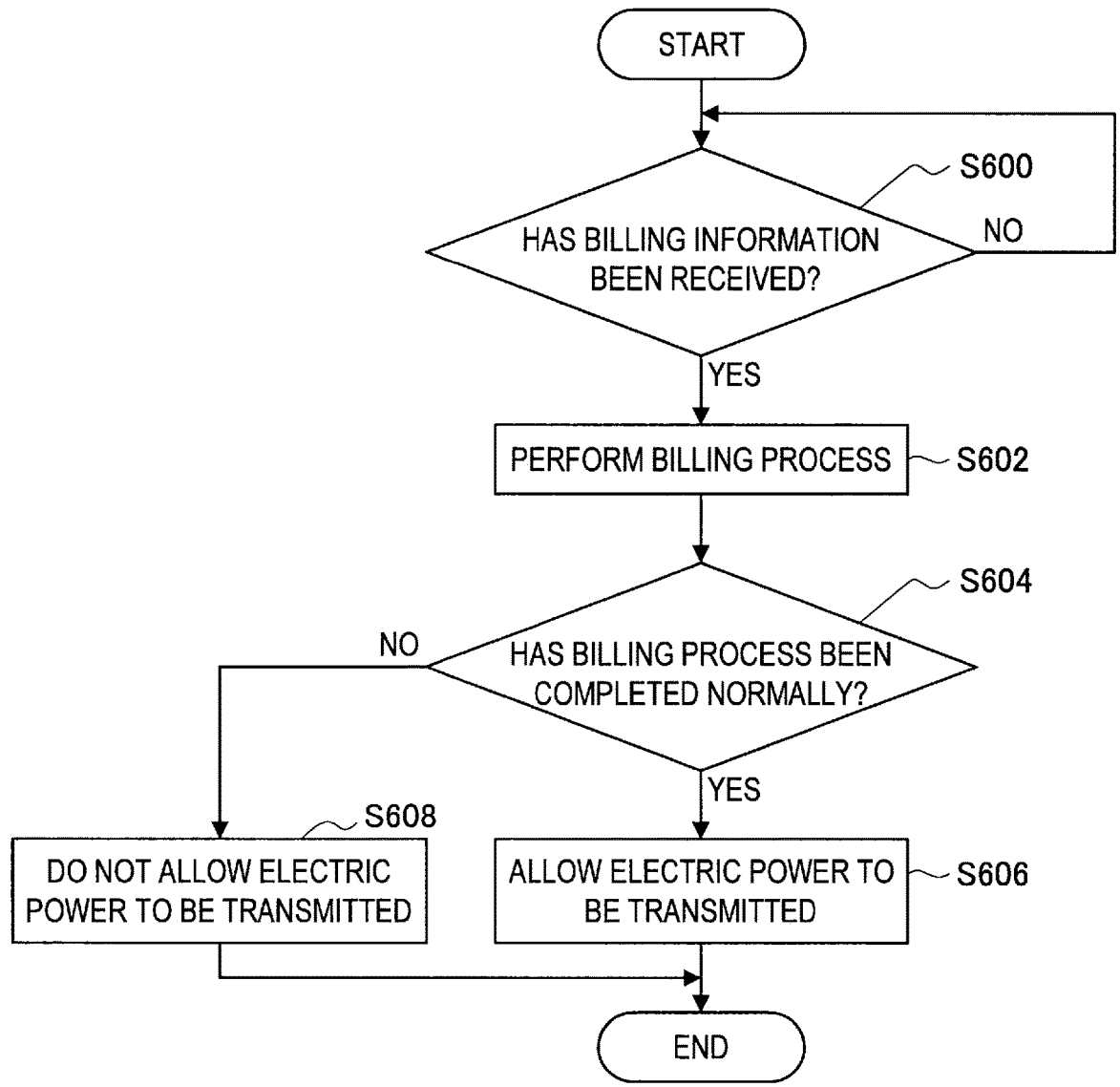

[Fig. 17]
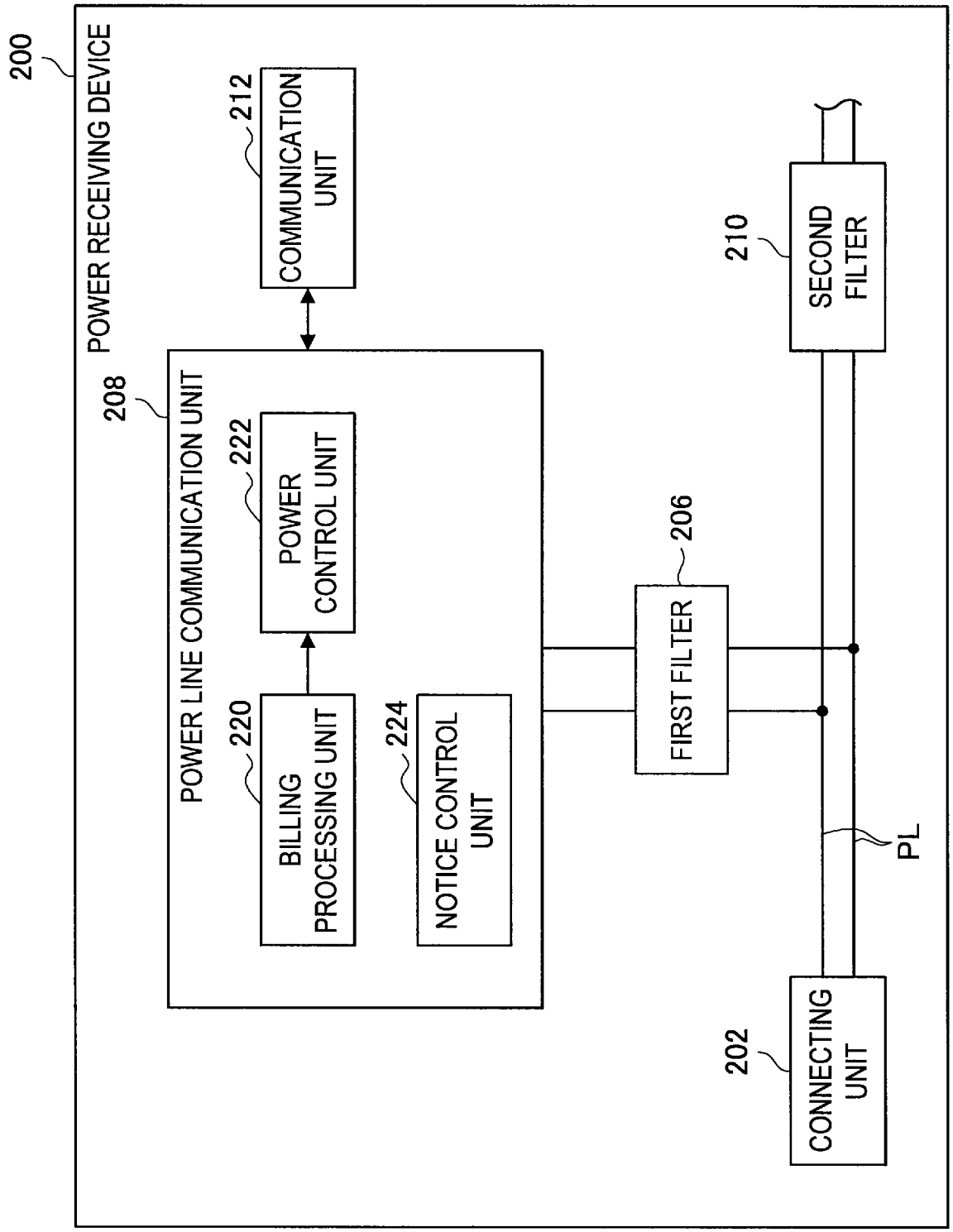

POWER SUPPLY DEVICE, POWER RECEIVING DEVICE AND BILLING METHOD

TECHNICAL FIELD

The present disclosure relates to a power supply device, a power receiving device, a billing method, and a program.

The present application builds upon concepts disclosed in prior applications by one or more of the inventors and/or the assignee, including the following: Japan Patent Application No. 2012-028651, titled "OUTLET SYSTEM FOR CONTROLLING CHARGING USING IDENTIFICATION," filed Feb. 13, 2012, and Japan Patent Application No. 2012-085362, filed Apr. 4, 2012. The entire contents of each of the above-identified applications are hereby incorporated by reference.

BACKGROUND ART

In recent years, devices capable of performing authentication on a device of a power supply target such as a power supply device for a vehicle, for example, an electric vehicle (EV), and selectively supplying the device of the power supply target with power according to an authentication result have been released. In addition, a technique of performing a billing process according to an amount of supplied electric power has been also developed. As a technique of performing billing for every local area network (LAN) on an amount of electric power supplied to LAN device, for example, there is a technique discussed in Patent Literature 1.

CITATION LIST

Patent Literature

PTL 1: JP 2006-13683 A

SUMMARY

Technical Problem

A device at a power reception side (hereinafter referred to as a "power receiving device") that receives electric power is connected with a device (for example, a device at a transmission side (hereinafter referred to as a "power supply device")) that supplies electric power via a power line in a wired manner, and receives electric power transmitted from the power supply device. Here, when a connection between a power supply device and a power receiving device via a power line is interrupted during transmission of electric power, for example, intentionally (for example, for power stealing) or unintentionally (for example, by accident), a user of the power supply device or a user of the power receiving device is likely to face a disadvantage in billing for the supply of electric power. For example, when electric power is transmitted after the user of the power receiving device pays the cost of the electric power that receives power (when pre-payment is made for the cost of the electric power), if a connection is interrupted for reasons such as those mentioned above, it may be difficult for the power receiving device to receive electric power corresponding to the amount paid by the user of the power receiving device. Further, for example, when payment is made for the supplied electric power after supply to the power receiving device ends (when deferred payment is made for the cost of the electric power), when a connection is interrupted for reasons such as those mentioned above, it may be difficult for the user of the power supply device to receive payment for the cost of the supplied electric power.

In the present disclosure, a power supply device, a power receiving device, a billing method, and a program, which are new and improved and capable of reducing the disadvantage to a user in billing for supply of electric power.

Solution to Problem

According to an embodiment of the present disclosure, there is provided a power supply device including a billing information generating unit for generating billing information for an amount related to electric power transmitted by the power supply device; a billing processing unit for performing a billing process based on the billing information, wherein performing the billing process includes: performing communication with a second device, and determining a result of the billing process based on the communication; and a power control unit for selectively transmitting electric power based on the result of the billing process.

In some embodiments, performing communication with the second device includes: transmitting a billing process command to the second device, and receiving a response signal from the second device, the response signal representing the result of the billing process, the second device being a power receiving device; and selectively transmitting the electric power comprises selectively transmitting the electric power to the power receiving device.

According to another embodiment of the present disclosure, there is provided a billing method including generating billing information for an amount related to electric power transmitted by a power supply device; performing a billing process based on the billing information, wherein performing the billing process includes: performing communication with a second device, and determining a result of the billing process based on the communication; and selectively transmitting electric power based on the result of the billing process.

In some embodiments, performing communication with the second device includes: transmitting a billing process command to the second device, and receiving a response signal from the second device, the response signal representing the result of the billing process, the second device being a power receiving device; and selectively transmitting the electric power comprises selectively transmitting the electric power to the power receiving device.

According to another embodiment of the present disclosure, there is provided a power receiving device including a billing processing unit for: determining whether billing information has been received, the billing information being for an amount related to electric power received from a power supply device; and after it is determined that the billing information has been received, performing a billing process; a power control unit for causing transmission of a response signal to the power supply device, the response signal being based on the billing process; and a notice control unit for providing notice regarding information related to the billing process.

According to another embodiment of the present disclosure, there is provided a billing method including determining whether billing information has been received, the billing information being for an amount related to electric power received from a power supply device; after it is determined that the billing information has been received, performing a billing process; transmitting a response signal to the power supply device, the response signal being based on the billing process; and providing notice regarding information related to the billing process.

Advantageous Effects

According to the present disclosure, it is possible to reduce the disadvantage to a user in billing for supply of electric power.

BRIEF DESCRIPTION OF DRAWINGS

FIG. 1 is a flowchart illustrating a first example of a process related to a billing method in a power supply device according to the present embodiment.

FIG. 2 is a flowchart illustrating a second example of a process related to a billing method in a power supply device according to the present embodiment.

FIG. 3 is a flowchart illustrating a second example of a process related to a billing method in a power supply device according to the present embodiment.

FIG. 4 is a flowchart illustrating a second example of a process related to a billing method in a power supply device according to the present embodiment.

FIG. 5 is a flowchart illustrating a second example of a process related to a billing method in a power supply device according to the present embodiment.

FIG. 6 is an explanatory diagram for describing an example of wireless communication according to the present embodiment.

FIG. 7 is an explanatory diagram illustrating an example of a configuration for implementing wireless communication performed between a power supply device according to the present embodiment and a power receiving device according to the present embodiment.

FIG. 8 is an explanatory diagram for describing an example of a power line communication according to the present embodiment.

FIG. 9 is an explanatory diagram illustrating an example of a configuration of a power line communication unit arranged in a power supply device according to the present embodiment.

FIG. 10 is an explanatory diagram illustrating another example of a power line communication unit arranged in a power supply device according to the present embodiment.

FIG. 11 is an explanatory diagram illustrating an example of a configuration of a first filter arranged in a power supply device according to the present embodiment.

FIG. 12 is an explanatory diagram illustrating an example of a configuration of a second filter arranged in a power supply device according to the present embodiment.

FIG. 13 is an explanatory diagram illustrating an example of a configuration of a power line communication unit arranged in a power receiving device according to the present embodiment.

FIG. 14 is an explanatory diagram illustrating another example of a configuration of a power line communication unit arranged in a power receiving device according to the present embodiment.

FIG. 15 is an explanatory diagram illustrating an example of a configuration of a power supply device according to the present embodiment.

FIG. 16 is a flowchart illustrating an example of a process related to a billing method in a power receiving device according to the present embodiment.

FIG. 17 is an explanatory diagram illustrating an example of a configuration of a power receiving device according to the present embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.

1. Billing Method According to Present Embodiment
2. Communication According to Present Embodiment
3. Power Supply Device According to Present Embodiment
4. Power Receiving Device According to Present Embodiment
5. Program According to Present Embodiment Billing Method According to Present Embodiment Before configurations of the power supply device according to the present embodiment and the power receiving device according to the present embodiment are described, first, the billing method according to the present embodiment will be described. In the following, the billing method according to the present embodiment will be described in connection with an example in which a process related to the billing method according to the present embodiment is performed by the power supply device according to the present embodiment. A process related to the billing method according to the present embodiment in the power receiving device according to the present embodiment will be described later.

As described above, when a connection between a power supply device and a power receiving device via a power line is disconnected during transmission of electric power for a certain reason, the user of the power supply device and the user of the power receiving device are likely to face disadvantages in billing for supply of electric power.

In this regard, the power supply device according to the present embodiment generates billing information representing the cost of electric power supplied to an external device (which corresponds to the power receiving device and which may be hereinafter referred to as an "external connection device") connected by a power line in a wired manner for each predetermined amount related to electric power transmitted to the power line (a billing information generating process). Here, for example, data representing the price or data representing a value equivalent to currency may be used as the billing information according to the present embodiment. The billing information according to the present embodiment may further include, for example, identification information (which will be described later) representing a billing target device (an external connection device).

Further, the power supply device according to the present embodiment performs a billing process based on the generated billing information (a billing process). Then, the power supply device according to the present embodiment selectively transmits electric power to the external connection device based on the result of the billing process (a power control process).

(1) Billing Information Generating Process

For example, the power supply device according to the present embodiment detects an amount related to electric power transmitted to the external connection device, and determines whether or not the detected amount related to electric power satisfies a set condition based on the detected amount related to electric power. Then, when it is determined that the detected amount related to electric power satisfies the set condition, the power supply device according to the present embodiment determines that the detected amount related to electric power has reached a predetermined amount of transmitted electric power, and generates billing information corresponding to electric power supplied to the external connection device.

Here, for example, at least one or two or more of an amount of a power supply time to the external connection device, an amount of electric power supplied to the external connection device, and the cost of an amount of electric power supplied to the external connection device may be used as an amount related to transmitted electric power according to the present embodiment.

Here, when the power supply time to the external connection device is used as an amount related to transmitted electric power, the power supply device according to the present embodiment determines that a detected amount related to electric power has satisfied a set condition, for example, each time a predetermined time (an example of the set condition) elapses after power supply to the external connection device (transmission of electric power to the external connection device) starts. Here, for example, the predetermined time may be a fixed time interval which is set in advance or may be a variable time interval which can be changed by the user of the power supply device according to the present embodiment. Further, for example, the predetermined time may be randomly set.

Further, when an amount of electric power supplied to the external connection device is used as an amount related to transmitted electric power, the power supply device according to the present embodiment determines that a detected amount related to electric power has satisfied a set condition, for example, each time a predetermined amount of electric power (an example of the set condition) is supplied after power supply to the external connection device starts. Here, for example, the predetermined amount of electric power may be a fixed amount of electric power which is set in advance or may be a variable amount of electric power which can be changed by the user of the power supply device according to the present embodiment. Further, the predetermined amount of electric power may be randomly set.

Further, when the cost of an amount of electric power supplied to the external connection device is used as an amount related to transmitted electric power, the power supply device according to the present embodiment determines that a detected amount related to electric power has satisfied the set condition, for example, each time the price corresponding to electric power supplied after power supply to the external connection device starts reaches a predetermined amount (an example of the set condition). Here, for example, the predetermined amount is a fixed amount which is set in advance or may be a variable amount which can be changed by the user of the power supply device according to the present embodiment. Further, the predetermined amount may be randomly set.

Further, when two or more amounts are used as an amount related to transmitted electric power, for example, the power supply device according to the present embodiment determines whether or not the detected amount related to electric power has satisfied a combination condition in which a plurality of conditions are combined. Here, for example, an AND condition or an OR condition may be used as the combination condition according to the present embodiment, but the combination condition according to the present embodiment is not limited to this example. For example, a condition in which a priority or a weight is set to the condition configuring the combination condition may be used as the combination condition according to the present embodiment.

The billing information generating process in the power supply device according to the present embodiment is not limited to the above examples. For example, when it is detected that a connection with the external connection device via the power line is disconnected, the power supply device according to the present embodiment may generate billing information corresponding to electric power supplied to the external connection device at a detection point in time (an example of the exceptional process). Further, for example, when a disturbance signal is detected in communication with the external connection device, the power supply device according to the present embodiment may generate billing information corresponding to electric power supplied to the external connection device at a detection point in time (another example of an exceptional process).

Further, for example, the power supply device according to the present embodiment may change the cost of an amount of electric power supplied to the external connection device based on a status of power supply to the external connection device and generate the billing information. For example, a process of changing the cost of an amount of electric power supplied to the external connection device when electric power is supplied to the external connection device at a normal power supply speed (hereinafter, referred to as "on normal mode") and when electric power is supplied to the external connection device at a higher power supply speed (hereinafter, referred to as "on fast mode" or "on higher speed mode") and generating the billing information may be used as the process of generating the billing information based on the status of power supply to the external connection device. In other words, for example, the power supply device according to the present embodiment may generate the billing information that indicates a cost corresponding to the power supply mode being set selected from a plurality of levels of power supply speed (one or more power supply modes, for example, the normal mode or fast mode (higher speed mode) mentioned above.

Note that the process of generating billing information based on a status of power supply to the external connection device is not limited to the above examples. For example, the power supply device according to the present embodiment may generate the billing information corresponding to the amount of electric power supplied to the external connection device based on the total amount of electric power supplied to the external connection device. By generating the billing information corresponding to the total amount of electric power supplied to the external connection device, the power supply device according to the present embodiment may change the cost of the amount of the electric power supplied to the external connection device, for example, and generate the billing information. Here, as process for changing the cost based on the total amount of electric power supplied to the external connection device, for example, there may be a process to reduce the cost of electric power (for example, unit price such as a cost per kWh, and so on) as the amount of electric power supplied to the external connection device is increased.

Further, the power supply device according to the present embodiment may generate the billing information corresponding to price information (data) of electric power indicated by the price information indicating price of acquired electric power. By generating the billing information based on the acquired price information, the power supply device according to the present embodiment may generate the billing information on which price on real time is reflected. Here, the power supply device according to the present embodiment, for example, acquires price information from an external device such as a server, and generates the billing information based on price of electric power indicated by the acquired price information and the amount of electric power supplied to the external connection device. Note that a method for acquiring price information according to the present embodiment is not limited to the above. For example, the power supply device according to the present embodiment may receive the price information packetized to be transmitted to the power line, and acquire the price information.

(2) Billing Process

The power supply device according to the present embodiment performs the billing process based on the billing information generated in the process (1) (the billing information generating process).

(2-1) First Billing Process

For example, the power supply device according to the present embodiment performs communication with the external connection device and performs billing on the external connection device.

More specifically, the power supply device according to the present embodiment transmits a billing process command causing a value corresponding to the cost represented by the billing information to be subtracted from an electronic value (currency or data having a value equivalent to currency) to the external connection device. For example, data including data representing processing content and data representing a value of an electronic value to be subtracted may be used as the billing process command according to the present embodiment. The billing process command according to the present embodiment is not limited to this example. For example, the billing process command according to the present embodiment may be data representing a process (a process of moving an electronic value) of transmitting an electronic value corresponding to the value corresponding to the cost represented by the billing information to the external connection device.

The external connection device that has received the billing process command performs processing, for example, on an electronic value stored in the external connection device or an electronic value stored in an external device capable of performing communication with the external connection device based on the billing process command. Then, the external connection device transmits a response signal representing a processing result based on the billing process command to the power supply device according to the present embodiment. Here, for example, an electronic value that the external connection device uses as a target of the processing based on the billing process command may be an electronic value which is stored in the external connection device or the external device capable of performing communication with the external connection device in advance or may be a newly charged electronic value.

Here, for example, a signal representing that the process based on the billing process command has been completed normally (subtraction of an electronic value, that is, billing is completed) or a signal representing that the process based on the billing process command has not been completed normally (billing has not been completed) may be used as the response signal transmitted from the external connection device. Further, a signal representing that subtraction of an electronic value has not been performed or a signal representing that subtraction of an electronic value has been partially performed and including an electronic value that has not been subjected to subtraction of an electronic value may be used as the signal representing that the process based on the billing process command has not been completed normally.

The power supply device according to the present embodiment determines whether or not the billing process has been completed normally based on the response signal to the received billing process command. By determining whether or not the billing process has been completed normally based on the received response signal, for example, the power supply device according to the present embodiment can determine whether or not billing has been completed normally, billing has not been performed at all, or billing has been partially performed.

The first billing process in the power supply device according to the present embodiment is not limited to the above example. For example, when it is determined that the billing process has not been completed normally based on the response signal, the power supply device according to the present embodiment may notify the user of the external connection device of the fact that the billing process has not been completed normally, a deficient amount of money, a charge request of an electronic value corresponding to a deficient amount of money, or the like. The power supply device according to the present embodiment causes a notice to be given to the user of the external connection device, for example, using a visual notice method using a letter or an image or an acoustical notice method using a sound (including music or a beep sound; the same applies hereinafter). Here, an example of a target that is caused to give a notice by the power supply device according to the present embodiment includes an external device such as a display unit (which will be described later) arranged in its own device (the power supply device according to the present embodiment), an external display device, or an external connection device.

(2-2) Second Billing Process

For example, the power supply device according to the present embodiment performs communication with an external billing processing device capable of performing billing (for example, post-usage billing performed after power reception) for the user of the external connection device, and causes the external billing processing device to perform billing for the user of the external connection device. In other words, the second billing process according to the present embodiment corresponds to an indirect billing process that causes the external billing processing device to perform a substantive billing process, whereas the first billing process according to the present embodiment is a direct billing process on the external connection device. Here, a server corresponding to a credit card owned by the user of the external connection device, a server corresponding to an account owned by the user of the external connection device, or the like may be used as the external billing processing device according to the present embodiment.

For example, the power supply device according to the present embodiment performs communication with the external billing processing device based on information set before supply of electric power to the external connection device starts. For example, information representing the external billing processing device or information specifying the user of the external connection device may be used as the set information according to the present embodiment. Here, for example, an Internet protocol (IP) address or a selection number selected by the user from a list in which an IP address is associated with a selection number may be used as the information representing the external billing processing device according to the present embodiment. Further, a credit card number or an account number may be used as the information specifying the user of the external connection device according to the present embodiment. For example, the power supply device according to the present embodiment starts supply of electric power to the external connection device after it is confirmed that communication with the external billing processing device is performed based on the set information according to the present embodiment.

More specifically, for example, the power supply device according to the present embodiment transmits the billing information generated in the process (1) (the billing information generating process) to the external billing processing device as the billing process. Here, for example, the power supply device according to the present embodiment transmits the generated billing information to the external billing processing device each time the billing information is generated, but the second billing process in the power supply device according to the present embodiment is not limited to this example. For example, the power supply device according to the present embodiment may add up the cost represented by the billing information corresponding to the same external connection device when a predetermined time arrives or at predetermined time intervals, and cause the billing information representing the added value to be transmitted to the external billing processing device.

For example, the power supply device according to the present embodiment determines whether or not the billing process has been completed normally based on the communication result with the external billing processing device. For example, when communication with the external billing processing device has been performed and the response signal representing that the billing information is received normally has been received, the power supply device according to the present embodiment determines that the process based on the billing process command has been completed normally. For example, when communication with the external billing processing device has not been performed or when the response signal representing that the billing information is received normally has not been received, the power supply device according to the present embodiment determines that the process based on the billing process command has not been completed normally.

By determining whether or not the billing process has been completed normally based on the communication result with the external billing processing device, for example, the power supply device according to the present embodiment can determine whether or not billing has been completed normally.

(2-3) Third Billing Process

The billing process in the power supply device according to the present embodiment is limited to neither the first billing process nor the second billing process. For example, the power supply device according to the present embodiment may perform a process in which the first billing process (the direct billing process on the external connection device) is combined with the second billing process (the indirect billing process on the external connection device).

More specifically, for example, the power supply device according to the present embodiment first performs the direct billing process on the external connection device through the same process as the first billing process. Further, when it is determined that the billing process has been completed normally based on the response signal to the received billing process command, the power supply device according to the present embodiment does not perform the same process as the second billing process.

Further, when it is determined that the billing process has not been completed normally based on the response signal to the received billing process command, the power supply device according to the present embodiment performs the same process as the second billing process.

Here, when it is determined that billing has not been performed at all based on the response signal to the received billing process command, for example, the power supply device according to the present embodiment transmits the billing information generated in the process (1) (the billing information generating process) to the external billing processing device. Further, when it is determined that billing has been partially performed based on the response signal to the received billing process command, new billing information corresponding to part of the cost represented by the billing information generated in the process (1) (the billing information generating process) is transmitted to the external billing processing device. For example, the power supply device according to the present embodiment generates the new billing information based on an electronic value which has not been subjected to subtraction of an electronic value, which is included in the received response signal.

For example, the power supply device according to the present embodiment preferentially performs the first billing process, and performs the process in which the first billing process is combined with the second billing process as the third billing process.

The third billing process according to the present embodiment is not limited to this example. For example, the power supply device according to the present embodiment may selectively perform the first billing process (the direct billing process on the external connection device) and the second billing process (the indirect billing process on the external connection device) based on a set billing process setting. Here, for example, the billing process setting according to the present embodiment is set in advance, and reset based on a user operation by the user of the power supply device according to the present embodiment.

The power supply device according to the present embodiment performs, for example, any one of the first billing process to the third billing process as the billing process based on the billing information generated in the process (1) (the billing information generating process). The billing process in the power supply device according to the present embodiment is not limited to the first billing process to the third billing process. For example, when the power supply device according to the present embodiment has a function of the external billing processing device according to the second billing process, the power supply device according to the present embodiment may perform billing (for example, a process related to withdrawal of an amount of money corresponding to the cost represented by the billing information) based on the billing information on the account owned by the user of the external connection device.

(3) Power Control Process

The power supply device according to the present embodiment selectively transmits electric power to the external connection device based on the result of the process (2) (the billing process). Further, when no external device (power receiving device) is connected by a power line in a wired manner, the power supply device according to the present embodiment does not transmit electric power.

More specifically, for example, when it is determined that billing has been completed normally in the process (2) (the billing process), the power supply device according to the present embodiment causes a power supply unit (which will be described later) capable of selectively supplying electric power to enter the power suppliable state. Thus, when it is determined that billing has been completed normally in the process (2) (the billing process), electric power is continuously transmitted to the external connection device.

However, when it is determined that billing has not been completed normally in the process (2) (the billing process), the power supply device according to the present embodiment does not cause a power supply unit (which will be described later) capable of selectively supplying electric power to enter the power suppliable state. Thus, when it is determined that billing has not been completed normally in the process (2) (the billing process), electric power is not transmitted to the external connection device.

The power control process in the power supply device according to the present embodiment is not limited to the above example. For example, the power supply device according to the present embodiment may perform authentication on the external connection device (an authentication process) and selectively transmit electric power to the external connection device based on the result of the process (2) (the billing process) and the authentication result.

More specifically, the power supply device according to the present embodiment performs communication with the external connection device, acquires the identification information representing the external connection device from the external connection device, and performs authentication on the external connection device based on the acquired identification information. Here, the identification information according to the present embodiment refers to information which can be used to identify the external connection device. For example, data representing an identification number specific to the external connection device, data representing the type of external connection device (data representing, for example, a manufacturer or a model number), power waveform data representing a power waveform when the external connection device is used (when the external connection device is driven), or the like may be used as the identification information according to the present embodiment. The identification information according to the present embodiment is not limited to the above examples as long as information which can be used to identify the external connection device is used.

Here, for example, when communication with the external connection device is not performed or when the identification information is not acquired from the external connection device, the power supply device according to the present embodiment determines that the external connection device is not the external device of the power supply target.

Further, when the identification information is not acquired from the external connection device by communication with the external connection device, the power supply device according to the present embodiment performs authentication based on the identification information For example, the power supply device according to the present embodiment performs authentication on the external connection device based on whether or not identification information corresponding to the identification information acquired from the external connection device remains stored in a database recording identification information representing the external device of the power supply target. Here, the database may be stored in a recording medium such as a storage unit (which will be described later) arranged in the power supply device according to the present embodiment, or the power supply device according to the present embodiment may acquire the database from an external device such as a server. For example, the power supply device according to the present embodiment may acquire the identification information from the external connection device before supply of electric power to the external connection device starts, record the acquired identification information in the database, and then start supply of electric power to the external connection device.

For example, the power supply device according to the present embodiment determines that the external connection device is the external device of the power supply target when authentication has been performed normally, but determines that the external connection device is not the external device of the power supply target when authentication has not been performed normally.

For example, when it is determined that billing has been performed normally in the process (2) (the billing process) and it is determined that the external connection device is the external device of the power supply target, the power supply device according to the present embodiment causes the power supply unit (which will be described later) capable of selectively supplying electric power to enter the power suppliable state. Thus, in this case, electric power can be continuously transmitted to the external connection device.

However, for example, when it is determined that billing has not been performed normally in the process (2) (the billing process) and it is determined that the external connection device is not the external device of the power supply target, the power supply device according to the present embodiment does not cause the power supply unit (which will be described later) capable of selectively supplying electric power to enter the power suppliable state. Thus, in this case, electric power is not transmitted to the external connection device.

For example, the power supply device according to the present embodiment performs the process (1) (the billing information generating process) to the process (3) (the power control process) as the process related to the billing method according to the present embodiment.

Here, the power supply device according to the present embodiment generates the billing information for each predetermined amount related to transmitted electric power in the process (1) (the billing information generating process), and performs the billing process based on the generated billing information in the process (2) (the billing process). Further, the power supply device according to the present embodiment selectively transmits electric power to the external connection device based on the result of the process (2) (the billing process) in the process (3) (the power control process).

As described above, the power supply device according to the present embodiment does not perform billing on electric power continuously supplied to the external connection device once in advance or later but performs billing based on the billing information which is generated for each predetermined amount related to transmitted electric power. Thus, even when a connection between the power supply device according to the present embodiment and the power receiving device according to the present embodiment (the external connection device) via the power line is interrupted during transmission of electric power for a certain reason, it is possible to prevent the situation in which electric power corresponding to the cost paid by the user of the power receiving device is not received by the power receiving device. Further, even when a connection between the power supply device according to the present embodiment and the power receiving device according to the present embodiment (the external connection device) via the power line is interrupted during transmission of electric power for a certain reason, the cost of supplied electric power which is not received by the user of the power supply device can be reduced to be smaller than when billing on supplied electric power is performed once later.

Thus, for example, processes from the process (1) (the billing information generating process) to the process (3) (the power control process) are performed as the process related to the billing method according to the present embodiment, and thus the power supply device according to the present embodiment can reduce the disadvantage to the user in billing for supply of electric power.

The process related to the billing method in the power supply device according to the present embodiment is not limited to the above example. For example, when it is detected that a connection with the external connection device via the power line is interrupted, the power supply device according to the present embodiment may perform the process (1) (the billing information generating process) at a detection point in time, and perform the process (2) (the billing process) based on the billing information in the second billing process. Here, for example, the power supply device according to the present embodiment detects that a connection with the external connection device via the power line is interrupted based on the fact that transmission of electric power has not been performed or a change in the connection state of the external device in the connecting unit (which will be described later).

Further, the power supply device according to the present embodiment, for example, may cause various information related to the billing methods, such as information on supply power on the power supply mode configurable (or the power supply mode being set), information on prices of electric power at each time (for example, unit price per [kWh], and so on), information on discount adopted for the total amount of electric power supplied, to be noticed (notice control process). The power supply device according to the present embodiment, for example, causes a device (such as a display device, an audio output device such as a speaker, and so on) related to notice arranged in the supply device according to the present embodiment, and/or an external device such as an external connection device or device regarding external notice, to make a notice on various information related to the billing method. For example, when notifying the external connection device, the power supply device according to the present embodiment causes the external connection device to make a notice on various information related to the billing method by transmitting control data that controls notice using the later-described communication according to the present embodiment. Here, the control data that controls notice according to the present embodiment includes, for example, a notice command that executes notice. Further, the control data that controls notices according to the present embodiment may further include, for example, data indicating contents of the notice (for example, image data, audio data, and so on).

Hereinafter, an example of process related to the billing method of the power supply device according to the present embodiment will be described in more detail.

1. First Example of a Process Related to a Billing Method

FIG. 1 is a flowchart illustrating a first example of the process related to the billing method in the power supply device according to the present embodiment. Here, the process of steps S102 and S104 illustrated in FIG. 1 corresponds to the process (1) (the billing information generating process), and the process of steps S106 and S108 illustrated in FIG. 1 corresponds to the process (2) (the billing process). Further, the process of steps S100 and S110 illustrated in FIG. 1 corresponds to the process (3) (the power control process). Further, FIG. 1 illustrates an example of a process after transmission of electric power to the external connection device starts.

The power supply device according to the present embodiment transmits electric power to the external connection device (S100). Here, the power supply device according to the present embodiment detects an amount related to electric power transmitted to the external connection device. For example, at least one or two or more amount of the power supply time to the external connection device, an amount of electric power supplied to the external connection device, and the cost of an amount of electric power supplied to the external connection device may be used as an amount related to transmitted electric power detected by the power supply device according to the present embodiment.

The power supply device according to the present embodiment determines whether or not an amount related to electric power has satisfied a set condition (S102). Here, for example, when the detected amount related to electric power has satisfied the set condition, the power supply device according to the present embodiment determines that an amount related to electric power has satisfied the set condition. Further, when the detected amount related to electric power has not satisfied the set condition, the power supply device according to the present embodiment determines that an amount related to electric power has not satisfied the set condition.

Here, when it is determined in step S102 that an amount related to electric power has not satisfied the set condition, the power supply device according to the present embodiment repeats the process starting from step S100.

However, when it is determined in step S102 that an amount related to electric power has satisfied the set condition, the power supply device according to the present embodiment generates the billing information corresponding to electric power supplied to the external connection device (S104). Here, for example, the billing information generated in step S104 is data representing an amount of money or a price equivalent to a currency serving as the cost of electric power supplied to the external connection device after transmission of electric power to the external connection device starts (first time) or after previous billing information is generated (after first time).

Here, when the billing information is generated in step S104, the power supply device according to the present embodiment performs the billing process (S106). Then, the power supply device according to the present embodiment determines whether or not the billing process has been completed normally (S108). Here, in steps S106 and S108, for example, the power supply device according to the present embodiment performs any one of the first billing process to the third billing process.

Here, when it is determined in step S108 that the billing process has been completed normally, the power supply device according to the present embodiment repeats the process starting from step S100.

Further, when it is determined in step S108 that the billing process has not been completed normally, the power supply device according to the present embodiment does not transmit electric power to the external connection device (S110).

For example, the power supply device according to the present embodiment performs the first example of a process illustrated in FIG. 1 as the process related to the billing method.

The first example of process related to the billing method in the power supply device according to the present embodiment is not limited to the process illustrated in FIG. 1. For example, when it is detected that a connection with the external connection device via the power line is interrupted, the power supply device according to the present embodiment may perform the process starting form step S104 at a detection point in time (an example of the exceptional process). Further, for example, when the disturbance signal is detected in communication with the external connection device, the power supply device according to the present embodiment may perform the process starting from step S104 at a detection point in time (another example of the exceptional process).

2. Second Example of Process Related to Billing Method

FIG. 2 is a flowchart illustrating a second example of a process related to a billing method in a power supply device according to the present embodiment. Here, processes of step S202 to S208 shown in FIG. 2 correspond to the above (1) process (billing information generation process), while processes of step S210 to S212 shown in FIG. 2 corresponds to the above (2) process (billing process). Further, processes of steps S200 and S214 shown in FIG. 2 correspond to the above (3) process (power control unit). In addition, FIG. 2 illustrates an example after the power transmission has been started to the external connection device.

The power supply device according to the present embodiment transmits electric power to the external connection device same as step S100 shown in FIG. 1 (S200).

The power supply device according to the present embodiment determines whether or not an amount related to electric power satisfies a condition being set (S202) same as step S102 shown in FIG. 1. When it is not determined that the amount related to the electric power does not satisfy the condition being set in step S202, the power supply device according to the present embodiment repeats the process starting from step S200.

Further, when it is determined that an amount related to electric power satisfies a condition being set in step 202, the power supply device according to the present embodiment determines whether or not the power supply mode related to the power supply speed is the fast mode (higher speed mode, which is one example of the power supply mode) (S204). Here, the power supply mode according to the present embodiment may be set, for example, based on a user's setting operation, or the like prior to starting transmission of electric power to the external connection device.

When it is determined as to be the fast mode in step 204, the power supply device according to the present embodiment generates billing information corresponding to the fast mode (S206). The power supply device according to the present embodiment, for example, specifies a price of electric power corresponding to the fast mode based on data indicating a price of electric power corresponding to the fast mode (for example, an unit price such as a price per [kWh]), and generates the billing information corresponding to the fast mode.

Here, data representing a price of electric power corresponding to the fast mode is stored in a storage unit (later described) which the power supply device according to the present embodiment, or an external recording medium removably mounted in the power supply device according to the present embodiment, and the power supply device according to the present embodiment reads the data representing the price of electric power corresponding to the fast mode from the storage unit (later described) or the like to acquire the data representing the price of electric power corresponding to the fast mode. Note that, a method of acquiring the data representing the price of electric power corresponding to the fast mode is not limited to the method described above. For example, the power supply device according to the present embodiment may acquire the data representing the price of electric power corresponding to the fast mode by communicating with an external device, such as a server.

When it is not determined to be a fast mode in step 204, the power supply device according to the present embodiment generates billing information corresponding to a normal mode (one example of the power supply mode) (S208). The power supply device according to the present embodiment, same as the above step S206, for example, specifies a price of electric power corresponding to the normal mode based on data indicating a price of electric power corresponding to the normal mode (for example, an unit price such as a price per [kWh]), and generates the billing information corresponding to the normal mode.

When the billing information is generated in the process of step S206 or step S208, the power supply device according to the present embodiment performs the billing process, same as step S106 shown in FIG. 1 (S210). Then the power supply device according to the present embodiment determines whether the billing process has normally completed (S212).

When the billing process is determined to have been normally completed in step S212, the power supply device according to the present embodiment repeats the processes starting from step S200.

Further, when the billing process is not determined to have been normally completed in step S212, the power supply device according to the present embodiment does not allow an external connection device to transmit electric power (S214).

The power supply device according to the present embodiment performs processing shown in FIG. 2, for example, as a process related to the second example of the billing method.

Note that the process related to the billing method for the power supply device according to the present embodiment is not limited to the process shown in FIG. 2. In FIG. 2, an example shows that the power supply device according to the present embodiment generates billing information corresponding to one power supply mode being set from the two power supply modes, fast mode or normal mode, however, the power supply device according to the present embodiment may generate the billing information corresponding to one power supply mode being set from three or more power supply modes.

3. Third Modified Example of Process Related to Billing Method

FIG. 3 is a flowchart illustrating a third example of a process related to a billing method in a power supply device according to the present embodiment. Here, processes of step S302 to S312 shown in FIG. 3 correspond to the above (1) process (billing information generation process), while processes of steps S314 and S316 shown in FIG. 3 corresponds to the above (2) process (billing process). Further, processes of steps S300 and S318 shown in FIG. 3 correspond to the above (3) process (power control unit). In addition, FIG. 3 illustrates an example after the power transmission has been started to the external connection device.

The power supply device according to the present embodiment transmits electric power to the external connection device same as step S100 shown in FIG. 1 (S300).

The power supply device according to the present embodiment determines whether or not an amount related to electric power has satisfied a set condition, same as step S102 shown in FIG. 1 (S302). When it is not determined that the amount related to electric power has satisfied a set condition in step S302, the power supply device according to the present embodiment repeats the process starting from step S300.

Further, when it is determined that the amount related to electric power has satisfied a set condition in step S302, the power supply device according to the present embodiment determines whether cumulated power supply which is total amount of electric power supplied to the external connection device is equal to or less than a predetermined value a (or, whether the cumulated power supply is less than the predetermined value a, and so on) (S304). Here, the predetermined value a (a[kWh], for example) may be a fixed value which has been set already, or may be a variable which is variable based on a user's operation or the like.

When it is determined that the cumulated power supply is equal to or less than the predetermined value a in step S304, the power supply device according to the present embodiment generates billing information Pa which corresponds to the predetermined value a (S306). The power supply device according to the present embodiment, same as step S206 shown in FIG. 2, for example, generates billing information corresponding to the predetermined value a by specifying a price of electric power corresponding to the predetermined value a based on data representing the price of electric power corresponding to the predetermined value a (for example, an unit prices such as a price per [kWh]).

Further, when it is not determined that the cumulated in step S304, the cumulated power supply is equal to or less than the predetermined value a in step S304, the power supply device according to the present embodiment determines whether the cumulated power supply which is the total amount of electric power supplied to the external connection device is equal to or less than a predetermined value b (where a<b) (or whether the cumulated power supply is less than the predetermined value b, and so on) (S308). Here, the predetermined value b (b[kWh], for example) may be a fixed value which has been set already, or may be a variable which is variable based on a user's operation or the like.

When it is determined that the cumulated power supply is equal to or less than the predetermined value b in step S308, the power supply device according to the present embodiment generates billing information Pb which corresponds to the predetermined value b (S310). The power supply device according to the present embodiment, same as step S206 shown in FIG. 2, for example, generates billing information corresponding to the predetermined value b by specifying a price of electric power corresponding to the predetermined value b based on data representing the price of electric power corresponding to the predetermined value b (for example, an unit prices such as a price per [kWh]).

When it is not determined that the cumulated power supply is equal to or less than the predetermined value b in step S308, the power supply device according to the present embodiment generates billing information Pc (S312). The power supply device according to the present embodiment, same as step S206 shown in FIG. 2, for example, generates corresponding billing information by specifying a price of electric power based on data representing the price of electric power corresponding to a case where it is not determined that the cumulated power supply is equal to or less than the predetermined value b (for example, an unit prices such as a price per [kWh]).

When the billing information is generate in any of the processes of step S306, S310, or S312, the power supply device according to the present embodiment performs billing same as step S106 shown in FIG. 1 (S314). The power supply device according to the present embodiment then determines whether the billing has been normally complete (S316).

When it is determined that the billing has been normally complete in step S316, the power supply device according to the present embodiment repeats processing starting from S300.

When it is not determined that the billing has been normally complete in step S316, the power supply device according to the present embodiment does not allow the electric power to be transmitted to the external connection device (S318).

The power supply device according to the present embodiment performs process shown FIG. 3, for example, as process related to billing method.

Note that the process related to the billing method in the power supply device according to the present embodiment is not limited to the processing shown in FIG. 3. For example, FIG. 3 shows a case where the power supply device according to the present embodiment generates the billing information based on a comparison between two values of the predetermined values a and b, and the cumulate power supply, however, the power supply device according to the present embodiment may generate the billing information based on a comparison between one or more than three predetermined values and the cumulated power supply.

Moreover, the power supply device according to the present embodiment may grant points to the external connection device (or a user of the external connection device) based on the comparison between one or more predetermined values and an amount of the cumulated power supply. Here, when granting points, cost represented by the billing information that is generated base the comparison between one or more predetermined values and the cumulate power supply may be the same or may be different.

4. Fourth Modified Example of Process Related to Billing Method

FIG. 4 is a flowchart illustrating a fourth example of a process related to a billing method in a power supply device according to the present embodiment. Here, processes of steps S402 and S404 shown in FIG. 4 correspond to the above (1) process (billing information generation process), while processes of steps S406 to S420 shown in FIG. 4 corresponds to the above (2) process (billing process). Further, processes of steps S400 and S422 shown in FIG. 4 correspond to the above (3) process (power control unit). In addition, FIG. 4 illustrates an example after the power transmission has been started to the external connection device.

The power supply device according to the present embodiment transmits electric power to the external connection device same as step S100 shown in FIG. 1 (S400).

The power supply device according to the present embodiment determines whether or not an amount related to electric power has satisfied a set condition, same as step S102 shown in FIG. 1 (S402). When it is not determined that the amount related to electric power has satisfied a set condition in step S402, the power supply device according to the present embodiment repeats the process starting from step S400.

Further, when it is determined that the amount related to electric power has satisfied a set condition in step S402, the power supply device according to the present embodiment generates billing information corresponding to the electric power supplied to the external connection device same as step S404 shown in FIG. 1 (S404).

When the billing information is generated in step S404, the power supply device according to the present embodiment performs billing same as step S106 shown in FIG. 1 (S406). Then the power supply device according to the present embodiment determines whether the billing process has been normally completed.

When it is determined that the billing process has been normally completed in step S408, the power supply device according to the present embodiment repeats the process starting from step S400.

When it is not determined that the billing process has been normally completed in step S408, the power supply device according to the present embodiment determines whether there is any shortage (S410). The power supply device according to the present embodiment determines that the billing process has not been normally completed due to the shortage when received response signals to a billing process command that is sent from the external connection device shows that at least a part of values corresponding to the cost represented by the billing information cannot be reduced from the electronic value.

When it is determined that there is shortage in step S410, the power supply device according to the present embodiment makes the shortage reported (S412). The power supply device according to the present embodiment, for example, notifies the external connection device of the shortage by transmitting control data for notifying the shortage to the external connection device.

After performing the process of step S412, the power supply device according to the present embodiment determines whether the shortage has been paid (whether the billing process has been normally completed) (S414). Here, the power supply device according to the present embodiment performs the processes of the above step S406 and S408 as a part of processing of step S414, for example.

When it is determined that the shortage has been paid in step S414, the power supply device according to the present embodiment performs the process of step S408 again. Note that when performing the process of step S408 as a part of the process of step S414, the power supply device according to the present embodiment does not need to perform the process of step S408 again.

Further, when it is not determined that the shortage has been paid in step S414, the power supply device according to the present embodiment performs process of later-described step S422.

When it is not determined that there is shortage in step S410, the power supply device according to the present embodiment determines whether it overcharged (S416). The power supply device according to the present embodiment confirms validity of the billing information generated in step S404 comparing the cost represented by the billing information generate in step S404 with the cost of electric power actually supplied to the external connection device. Then, when the billing information generated in step S404 is not valid, it determines that it is overcharged. Note that a method for confirming the validity of the billing information in the power supply device according to the present embodiment and process of step S416 are not limited to the above.

When it is determined it overcharged in steps S416, the power supply device according to the present embodiment refunds (S418). Then the power supply device according to the present embodiment repeats the processing starting from S408. Here, as a refund processing according to the present embodiment, there are one or more following processing, for example:

To grant points that corresponds to an amount of refund to the external connection device (or a user of the external connection device);

To refund on credit to a user of the external connection device in cooperation with an external device such as a server of a credit card company;

To issue and send a refund payment letter to a user of the external connection device; and To transmit a refund command for adding value corresponding to the amount of refund to electronic value, to the external connection device (or to make the external connection device to transmit electronic value for the amount of refund to an external device).

Further, when it is not determined that it overcharged in step S416, the power supply device according to the present embodiment allows an error notification to be made (S420). Here, the power supply device according to the present embodiment performs process of step S420 by conveying or transmitting a command signal or control data for an error notification to a device related to a notice (for example, a display device, audio output device such as a speaker, and so on) which the power supply device according to the present embodiment includes and/or an external device such as an external connection device or a device related to external notification.

When it is not determined that the shortage has not been paid in step S414 or when the process of step S420 has been performed, the power supply device according to the present embodiment does not transmit electric power to the external connection device (S422).

The power supply device according to the present embodiment performs process shown in FIG. 4, for example, as process related to the fourth example of the billing method.

Note that the process of the billing method of the power supply device according to the present embodiment is not limited to the process shown in FIG. 4. For example, the power supply device according to the present embodiment may perform process of step S416 and selectively process of step S418, when it is determined that the billing process has been normally completed in step S408 shown in FIG. 4. When performing selectively the process of step S418 if it is determined that the billing process has been normally completed in step S408, the power supply device according to the present embodiment may realize, for example, refund process corresponding to discounts to be applied after the process (for example, discounts corresponding to the cumulated power supply applied later).

5. Fifth Modified Example of Process Related to Billing Method

FIG. 5 is a flowchart illustrating a fifth example of a process related to a billing method in a power supply device according to the present embodiment. Here, processes of steps S502 to S506 shown in FIG. 5 correspond to the above (1) process (billing information generation process), while processes of steps S508 and S510 shown in FIG. 5 corresponds to the above (2) process (billing process). Further, processes of steps S500 and S512 shown in FIG. 5 correspond to the above (3) process (power control unit). In addition, FIG. 5 illustrates an example after the power transmission has been started to the external connection device.

The power supply device according to the present embodiment transmits electric power to the external connection device same as step S100 shown in FIG. 1 (S500).

The power supply device according to the present embodiment determines whether or not an amount related to electric power has satisfied a set condition, same as step S102 shown in FIG. 1 (S502). When it is not determined that the amount related to electric power has satisfied a set condition in step S502, the power supply device according to the present embodiment repeats the process starting from step S500.

The power supply device according to the present embodiment acquires price information when it is determined that the amount related to electric power has satisfied a set condition in step S502. The power supply device according to the present embodiment acquires the price information from an external device, such as a server. In addition, the power supply device according to the present embodiment may receive the price information packetized to be transmitted to the power line, and acquire the price information.

The power supply device according to the present embodiment generates billing information corresponding to a price of electric power represented by the price information based on the acquired price information in step S504 (S506). The power supply device according to the present embodiment generates the billing information by calculating cost for electric power supplied to the external connection device, for example, based on the price (for example, a unit price) of electric power represented by the price information. Here, a method of calculating the cost in the power supply device according to the present embodiment may be calculation that multiplies the unit price of electric power and an amount of electric power supplied to the external connection device, or the like.

When the billing information is generated in the process of step S506, the power supply device according to the present embodiment performs billing same as step S106 shown in FIG. 1 (S508). Then the power supply device according to the present embodiment determines whether the billing has been normally completed (S510).

When it is determined that the billing has been normally completed, the power supply device according to the present embodiment repeats process starting from step S500.

Further, when it is not determined that the billing has been normally completed, the power supply device according to the present embodiment does not transmit electric power to the external connection device (S512).

The power supply device according to the present embodiment performs process shown in FIG. 5, for example, as process related to the fifth example of the billing method.

Note that the process of the billing method of the power supply device according to the present embodiment is not limited to the process shown in FIG. 5. For example, the power supply device according to the present embodiment may allow the user of the external connection device to be notified of the price of electric power represented by the price information acquired in step S504, and allow the user to select whether to continue the electric power supply. When allowing the user to select whether to continue the power supply, the power supply device according to the present embodiment may determine whether to continue the electric power supply based on operation signals depending on the user's selection operation conveyed or transmitted from an operation device (for example, a button, touch panel, or the like) that the power supply device according to the present embodiment includes, or an external device, such as an external connection device, a remote controller or the like.

Moreover, the power supply device according to the present embodiment may compare the price of electric power represented by the price information acquired in step S504 and a predetermined threshold, and control the power supply based on the comparison result. For example, the power supply device according to the present embodiment stops the power supply in case when the price of the electric power represented by the price information exceeds the predetermined threshold (or when the price of electric power represented by the price information is equal to or more than the predetermined threshold). Further, the power supply device according to the present embodiment continues the power supply when the price of electric power represented by the price information is equal to or less than the predetermined threshold (or when the price of electric power represented by the price information is less than the predetermined threshold).

The power supply device according to the present embodiment performs any of processes regarding from the above first example to the fifth example as a process related to the billing method. Note that the process regarding the billing method in the power supply device according to the present embodiment is not limited to the above processes regarding from the above first example to the fifth example. For example, the power supply device according to the present embodiment may perform any given combination of processes among the above processes regarding from the above second example to the fifth example, such as, "the processes regarding the above second example an the third example", "the processes regarding the above second example and the fourth example", "the processes regarding the above second example and the fifth example", "the processes regarding the above second example, the third example and the fourth example", "the processes regarding the above second example, the third example and the fifth example", or the like.

Communication According to Present Embodiment

Next, the description will proceed with communication performed between the power supply device according to the present embodiment and the external connection device according to the present embodiment. Hereinafter, the external connection device that communicates with the power supply device according to the present embodiment may be referred to as "the power receiving device".

For example, wireless communication or power line communication (wired communication) may be performed as communication between the power supply device according to the present embodiment and the power receiving device according to the present embodiment.

For example, wireless communication is performed between the power supply device according to the present embodiment and the power receiving device according to the present embodiment using a wireless communication technique such as a communication technique by a Near Field Communication (NFC) or Radio Frequency Identification (RFID) technique. Further, power line communication is performed between the power supply device according to the present embodiment and the power receiving device according to the present embodiment, for example, such that the wireless communication technique such as the communication technique by the NFC or RFID technique is applied to wired communication. Here, examples of the power line communication of the present embodiment include communication (so-called contact communication) performed between terminal of devices coming in contact with each other and communication performed when terminals of devices are connected to each other in a wired manner.

For example, the power supply device according to the present embodiment includes a high-frequency signal generating unit (which will be described later) that generates a high-frequency signal, and transmits the high-frequency signal to the external connection device. In other words, the power supply device according to the present embodiment has, for example, a so-called reader/writer function.

Further, the power receiving device according to the present embodiment, for example, performs communication with the external device by performing load modulation based on a signal transmitted from the external device such as the power supply device according to the present embodiment. For example, when the power receiving device according to the present embodiment receives the high-frequency signal transmitted from the power supply device according to the present embodiment, the power receiving device is driven by power obtained from the received high-frequency signal, performs the load modulation based on a result of processing the received high-frequency signal, and thus transmits the high-frequency signal.

For example, as the power supply device according to the present embodiment and the power receiving device according to the present embodiment perform the above-described processes, respectively, the wireless communication according to the present embodiment or the power line communication of the present embodiment is implemented between the power supply device according to the present embodiment and the power receiving device according to the present embodiment.

Here, examples of the high-frequency signal according to the present embodiment include a frequency signal used in RFID and a frequency signal used in non-contact communication. Examples of the frequency of the high-frequency signal include 130 to 135 [kHz], 13.56 [MHz], 56 [MHz], 433 [MHz], 954.2 [MHz], 954.8 [MHz], 2441.75 [MHz], and 2448.875 [MHz], but the frequency of the high-frequency signal according to the present embodiment is not limited to the above examples. In the following, a high frequency transmitted based on the high-frequency signal according to the present embodiment may be referred to as a "carrier wave."

The wireless communication according to the present embodiment and the power line communication of the present embodiment are not limited to the communication using the wireless communication technique such as the communication technique by the NFC or the RFID technique. For example, a wireless communication of an arbitrary scheme such as wireless communication based on IEEE802.11b or power line communication such as PLC (Power Line Communication or power line carrier communication) may be performed between the power supply device according to the present embodiment and the power receiving device according to the present embodiment. In the following, the communication according to the present embodiment will be described in connection with an example in which communication using the wireless communication technique such as the communication technique by the NFC or RFID technique is performed between the power supply device according to the present embodiment and the power receiving device according to the present embodiment.

1. Wireless Communication According to Present Embodiment

First, the wireless communication according to the present embodiment will be described. FIG. 6 is an explanatory diagram for describing an example of the wireless communication according to the present embodiment. In the following, the wireless communication according to the present embodiment will be described using a power supply device 100A and a power receiving device 200A illustrated in FIG. 6 as an example. In addition, FIG. 6 illustrates structural elements related to the wireless communication according to the present embodiment in a configuration of the power supply device according to the present embodiment and a configuration of the power receiving device according to the present embodiment. Further, FIG. 6 illustrates a plug as the power receiving device 200A, but the power receiving device according to the present embodiment is not limited to the plug.

For example, the power supply device 100A includes a connecting unit 102, a wireless communication unit 104, and a control unit 106. Further, for example, the power receiving device 200A includes a connecting unit 202 and a wireless communication unit 204.

The connecting unit 102 connects a power line PL through which power is transmitted to an external device. Further, the connecting unit 102 may include a connection supporting member that supports the maintenance of a connection state of the connected external device. Here, a power line through which an alternating current (AC) having a predetermined frequency such as 50 [Hz] or 60 [Hz] or a direct current (DC) flows may be used as the power line PL according to the present embodiment. Further, for example, a magnet may be used as the connection supporting member according to the present embodiment. In the following, the description will proceed in connection with an example in which an AC current having a predetermined frequency flows through the power line PL.

More specifically, the connecting unit 102 has a terminal connected to the power line PL, and the connecting unit 202 has a terminal connected to the power line PL (which corresponds to an external power line when seen from the power supply device 100A). Further, when the terminal of the connecting unit 102 is electrically connected to the terminal of the connecting unit 202, the power supply device 100A is connected to the power receiving device 200A

(which corresponds to an external device when seen from the power supply device 100A). Here, an "electrical connection between the terminal of the connecting unit 102 and the terminal of the connecting unit 202" according to the present embodiment refers to, for example, a contact between the connecting units of the devices or a wired connection between the connecting units of the devices. In addition, the connecting unit 202 may include a connection supporting member that supports the maintenance of a connection state of the connected external device, similarly to the connecting unit 102 of the power supply device 100A.

For example, the connecting unit 102 detects a change in the connection state of the external device (a change from the non-connection state to the connection state or a change from the connection state to the non-connection state). Then, the connecting unit 102 transfers a detection signal representing the detection (detection result) to the control unit 106. In addition, when the wireless communication unit 104 has a function of transmitting the high-frequency signal in response to the transfer of the detection signal, the connecting unit 102 may transfer the detection signal to the wireless communication unit 104. Moreover, the connecting unit 102 may transmit the detection signal, for example, to a power supply unit (described later) arranged in the power supply device according to the present embodiment.

Here, for example, the connecting unit 102 includes a switch of detecting a physical connection state of the external device, and transfers the detection signal to the control unit 106 or the like when a state of the switch changes. However, a configuration of the connecting unit 102 is not limited to this example. In addition, when the power supply device 100A is configured to transmit the high-frequency signal at regular intervals or irregular intervals, for example, the connecting unit 102 according to the present embodiment may not be configured to have a function of detecting a change in the connection state of the external device.

The wireless communication unit 104 and the wireless communication unit 204 undertake the wireless communication according to the present embodiment. Further, for example, the communication in the wireless communication unit 104 is controlled by the control unit 106.

The control unit 106 is constituted by a Micro Processing Unit (MPU) or an integrated circuit (IC) in which various kinds of processing circuits are integrated, and controls the components of the power supply device 100A. More specifically, for example, the control unit 106 transfers a high-frequency signal generation command or a high-frequency signal transmission stop command to a power line communication unit 108 based on the detection signal transferred from the connecting unit 102 or a response signal of the external connection device such as a power receiving device 200B transferred from the power line communication unit 108, and controls the communication in the power line communication unit 108.

Further, the control unit 106 actively undertakes the process (for example, from the process (1) (the billing information generation process) to the process (3) (the power control process)) related to the billing method according to the present embodiment. In the control unit 106 of the power supply device according to the present embodiment, a configuration for implementing the process related to the billing method according to the present embodiment will be described later.

FIG. 7 is an explanatory diagram illustrating an example of a configuration for implementing wireless communication performed between the power supply device according to the present embodiment and the power receiving device according to the present embodiment. Here, FIG. 7 illustrates an example of configurations of the wireless communication unit 104 and the control unit 106 arranged in the power supply device 100A illustrated in FIG. 6 and the wireless communication unit 204 arranged in the power receiving device 200A illustrated in FIG. 6.

1-1. Wireless Communication Unit 104 Arranged in Power Supply Device According to Present Embodiment For example, the wireless communication unit 104 includes a high-frequency signal generating unit 150, a high-frequency transmitting unit 152, and a demodulating unit 154. For example, the wireless communication unit 104 transmits the high-frequency signal in response to the high-frequency signal generation command transferred from the control unit 106, and stops transmission of the high-frequency signal in response to the high-frequency signal transmission stop command transferred from the control unit 106.

The wireless communication unit 104 may include, for example, an encryption circuit (not shown) for encrypting communication, a communication anti-collision circuit, or a connection interface (not shown) for connecting an external device with another circuit. Here, for example, the structural elements of the wireless communication unit 104 are connected to each other via a bus serving as a transmission path of data. Examples of the connection interface include a Universal Asynchronous Receiver Transmitter (UART), a Local Area Network (LAN) terminal, and a transceiving circuit.

The high-frequency signal generating unit 150 receives the high-frequency signal generation command from the control unit 106, and the high-frequency signal corresponding to the high-frequency signal generation command. Here, in FIG. 3, AC power is used as the high-frequency signal generating unit 150, but the high-frequency signal according to the present embodiment generating unit 150 is not limited to this example. For example, the high-frequency signal according to the present embodiment generating unit 150 may include a modulating circuit (not shown) that performs Amplitude Shift Keying (ASK) modulation and an amplifying circuit (not shown) that amplifies an output of the modulating circuit.

Here, for example, a high-frequency signal including the identification information transmission request to request the external connection device to transmit the identification information or a high-frequency signal including various kinds of processing commands or data to process may be used as the high-frequency signal generated by the high-frequency signal generating unit 150. However, the high-frequency signal generated by the high-frequency signal generating unit 150 is not limited to this example. For example, the high-frequency signal according to the present embodiment may be a signal (for example, a non-modulated signal) causing the power line communication unit 208 of the power receiving device 200A to perform power supply.

For example, the high-frequency transmitting unit 152 includes a coil (inductor) L1 having a predetermined inductance, and transmits the carrier wave corresponding to the high-frequency signal generated by the high-frequency signal generating unit 150. Further, the high-frequency transmitting unit 152 can receive the response signal from the external connection device. In other words, the high-frequency transmitting unit 152 can undertake a function of a communication antenna of the wireless communication unit 104. Here, FIG. 7 illustrates the example in which the high-frequency transmitting unit 152 is constituted by the coil L1, but the configuration of the high-frequency transmitting unit 152 according to the present embodiment is not limited to this example. For example, the high-frequency transmitting unit according to the present embodiment may further include a capacitor to configure a resonance circuit.

For example, the demodulating unit 154 demodulates the response signal from the external connection device by performing envelope detection on a change in amplitude of a voltage in an antenna end of the high-frequency transmitting unit 152 and binarizing the detected signal. The demodulating device of the response signal in the demodulating unit 154 is not limited to the above example, and, for example, the demodulating unit 154 can demodulate the response signal using a change in a phase of a voltage in the antenna end of the high-frequency transmitting unit 152.

Further, the demodulating unit 154 transfers the demodulated response signal to the control unit 106. Then, when the demodulated response signal is transmitted to the control unit 106, for example, the control unit 106 performs a variety of processing as processing of processing data corresponding to the response signal and processing of generating the high-frequency signal generation command based on the processing result.

For example, through the configuration illustrated in FIG. 7, the wireless communication unit 104 transmits the carrier wave, and demodulates the response signal transmitted from the external connection device such as the power receiving device 200A. Of course, the configuration of the wireless communication unit 104 according to the present embodiment is not limited to the configuration illustrated in FIG. 7.

1-2. Wireless Communication Unit 204 Arranged in Power Receiving Device According to Present Embodiment The wireless communication unit 204 includes a communication antenna 250 and an IC chip 252. For example, the structural elements of the wireless communication unit 204 are connected to each other via a bus 272 serving as a data transmission path.

The communication antenna 250 receives the carrier wave transmitted from the external connection device such as the power supply device 100A, and transmits the response signal based on a processing result of processing in the IC chip 252.

For example, the communication antenna 250 is constituted by a resonance circuit including a coil (inductor) L2 having a predetermined inductance and a capacitor C1 having a predetermined capacitance, and generates an inductive voltage by electromagnetic induction upon receiving the carrier wave. Then, the communication antenna 250 outputs a reception voltage obtained by resonating the inductive voltage at a predetermined resonance frequency. Here, for example, the resonance frequency in the communication antenna 250 is set according to the frequency of the carrier wave such as 13.56 [MHz]. Through the above-described configuration, the communication antenna 250 receives the carrier wave, and transmits the response signal by load modulation performed in a load modulating unit 264 (which will be described later) arranged in the IC chip 252.

The IC chip 252 demodulates and processes the high-frequency signal based on the received carrier wave, and transmits the response signal through the communication antenna 250 by the load modulation. In other words, the IC chip 252 functions substantially as a wireless communication unit that actively performs wireless communication in the wireless communication unit 204.

For example, the IC chip 252 includes a carrier detecting unit 254, a detecting unit 256, a regulator 258, a demodulating unit 260, a data processing unit 262, a load modulating unit 264, a Read Only Memory (ROM) 266, a Random Access Memory (RAM) 268, and an internal memory 270. The data processing unit 262, the ROM 266, the RAM 268, and the internal memory 270 are connected to one another, for example, via the bus 272 serving as a data transmission path. Although not shown in FIG. 7, for example, the IC chip 252 may further include a protection circuit (not shown) for preventing an overvoltage or an overcurrent from being applied to the data processing unit 262. Here, for example, a clamp circuit constituted by a diode and the like may be used as the protection circuit (not shown).

The carrier detecting unit 254 generates a detection signal of a rectangular shape based on the reception voltage transferred from the communication antenna 250, and transfers the detection signal to the data processing unit 262. For example, the data processing unit 262 uses the transferred detection signal as a processing clock for data processing. Here, the detection signal is based on the reception voltage transferred from the communication antenna 250 and thus synchronized with the frequency of the carrier wave transmitted from the external connection device. Thus, the IC chip 252 includes the carrier detecting unit 254 and thus can perform processing with the external connection device in synchronization with the external connection device.

The detecting unit 256 rectifies the reception voltage output from the communication antenna 250. Here, for example, the detecting unit 256 includes a diode D1 and a capacitor C2.

The regulator 258 converts the reception voltage into a constant voltage through smoothing, and outputs a driving voltage to the data processing unit 262. Here, for example, the regulator 258 uses a DC component of the reception voltage as the driving voltage.

The demodulating unit 260 demodulates the high-frequency signal based on the reception voltage, and outputs data (for example, a binary data signal having a high level and a low level) corresponding to the high-frequency signal included in the carrier wave. Here, for example, the demodulating unit 260 outputs an AC component of the reception voltage as data.

For example, the data processing unit 262 is driven using the driving voltage output from the regulator 258 as a power source, and processes data demodulated in the demodulating unit 260. Here, for example, the data processing unit 262 is constituted by an MPU, various processing circuits, or the like.

Further, the data processing unit 262 selectively generates a control signal used to control the load modulation related to the response to the external connection device according to the processing result. Then, the data processing unit 262 selectively outputs the control signal to the load modulating unit 264.

Further, for example, the data processing unit 262 reads data stored in the internal memory 270 based on a command included in the data demodulated in the demodulating unit 260 and updates the read data.

For example, the load modulating unit 264 includes a load Z and a switch SW1, and performs the load modulation by selectively connecting (validates) the load Z in response to the control signal transferred from the data processing unit 262. Here, for example, the load Z is constituted by a resistor having a predetermined resistance value, but the load Z is not limited to this example. For example, the switch SW1 is constituted by a p-channel type Metal Oxide Semiconductor Field Effect Transistor (MOSFET) or an n-channel type MOSFET, but the switch SW1 is not limited to this example.

The ROM 266 stores a program and control data such as a calculation parameter, which are used by the data processing unit 262. The RAM 268 temporarily stores a program executed by the data processing unit 262, a calculation result, an execution state, and the like.

The internal memory 270 is a storage unit arranged in the IC chip 252. For example, the internal memory 270 has a tamper resistance characteristic, and performs reading of data, new writing of data, updating of data, or the like through the data processing unit 262. For example, the internal memory 270 stores a variety of data such as identification information, an electronic value (currency or data having a value equivalent to currency), and an application. Here, FIG. 7 illustrates the example in which the internal memory 270 stores identification information 274 and an electronic value 276, but data stored in the internal memory 270 is not limited to this example.

For example, through the above-described configuration illustrated in FIG. 7, the IC chip 252 processes the high-frequency signal received through the communication antenna 250, and transmits the response signal from the communication antenna 250 through the load modulation.

For example, the wireless communication unit 204 includes the communication antenna 250 and the IC chip 252, and thus processes the high-frequency signal transmitted from the external connection device such as the power supply device 100A and transmits the response signal through the load modulation. Further, the configuration of the wireless communication unit 204 according to the present embodiment is not limited to the configuration illustrated in FIG. 7. For example, in the wireless communication unit 204, the structural elements configuring the IC chip 252 illustrated in FIG. 7 may not be configured in the form of an IC chip.

For example, when the wireless communication unit 104 illustrated in FIG. 7 is arranged in the power supply device according to the present embodiment, and the wireless communication unit 204 illustrated in FIG. 7 is arranged in the power receiving device according to the present embodiment, the power supply device according to the present embodiment and the power receiving device according to the present embodiment can perform wireless communication using the wireless communication technique such as the communication technique by NFC.

Here, by performing the wireless communication technique such as the communication technique by NFC or the wireless communication by the RFID technique, the power receiving device according to the present embodiment can be driven by power obtained from the received high-frequency signal and can transmit stored information by performing the load modulation. In other words, in the communication system including the power supply device according to the present embodiment and the power receiving device according to the present embodiment, the power receiving device according to the present embodiment can perform wireless communication even when a separate power supply circuit to perform communication is not arranged. Further, for example, the power receiving device according to the present embodiment can transmit stored information by performing the load modulation even when a signal (a signal representing the user's instruction) according to the user's operation is not input.

2. Power Line Communication of Present Embodiment

Next, the power line communication of the present embodiment will be described. FIG. 8 is an explanatory diagram for describing an example of the power line communication of the present embodiment. In the following, the power line communication of the present embodiment will be described using a power supply device 100B and a power receiving device 200B illustrated in FIG. 8 as an example. FIG. 8 illustrates structural elements related to the power line communication of the present embodiment in the configuration of the power supply device according to the present embodiment and the configuration of the power receiving device according to the present embodiment. In the power receiving device according to the present embodiment, for example, the structural elements related to the power line communication may be disposed in a plug as in the power receiving device 200A illustrated in FIG. 6.

2-1. Power Supply Device 100B

For example, the power supply device 100B includes a connecting unit 102, a control unit 106, a power line communication unit 108, a first filter 110 (a communication filter), and a second filter 112.

For example, the power supply device 100B may further include a ROM (later described), a RAM (not shown), a storage unit (not shown), a display unit (not shown), and the like. For example, the structural elements of the power supply device 100B are connected to one another via a bus serving as a data transmission path. Here, the ROM (not shown) stores a program or control data such as a calculation parameter, which is used by the control unit 106. The RAM (not shown) temporarily stores a program executed by the control unit 106 or the like.

The display unit (not shown) is a display device arranged in the power supply device 100B, and displays various pieces of information (for example, an image, text, and/or the like) on a display screen. For example, an operation screen through which a desired operation is performed on the power supply device 100B may be used as the screen displayed on the display screen of the display unit (not shown).

Here, a display device such as a Liquid Crystal Display (LCD) or an organic EL display (an organic ElectroLuminescence display device or an Organic Light Emitting Diode display) may be used as the display unit (not shown). For example, in the power supply device 100B, the display unit (not shown) may be constituted by a touch screen. In this case, the display unit (not shown) can function as an operation display unit in which both the user operation and a display can be performed.

In addition, the power supply device 100B can perform communication with an external terminal via a network (or directly) regardless of the installation the display unit (not shown) and cause the operation screen or various information to be displayed on a display screen of an external terminal. For example, when the external terminal is the external terminal (for example, a portable communication device or a remote controller) possessed by the user of the power supply device 100B, the user can operate his/her external terminal and cause the power supply device 100B to perform desired processing, and can check information transmitted from the power supply device 100B using the external terminal. Thus, in this case, for example, when the power supply device 100B is installed below a desk and it is not easy for the user to directly operate the power supply device 100B or to see information displayed on the display unit (not shown), the user's convenience can be improved.

The control unit 106 is constituted by an MPU or an IC circuit in which various kinds of circuits are integrated, and controls the components of the power supply device 100B. More specifically, for example, the control unit 106 controls the communication in the power line communication unit 108 by transferring the high-frequency signal generation command or the high-frequency signal transmission stop command to the power line communication unit 108 based on the detection signal transferred from the connecting unit 102 or the response signal of the external connection device such as the power receiving device 200B transferred from the power line communication unit 108. Here, as the control unit 106 transfers the high-frequency signal generation command or the high-frequency signal transmission stop command to the power line communication unit 108 based on the detection signal, communication with the external connection device which is the external device connected via the power line can be actually performed.

As the control unit 106 transfers the high-frequency signal generation command or the high-frequency signal transmission stop command to the power line communication unit 108 as described above, for example, the power line communication unit 108 can transmit the high-frequency signal based on the detection result in the connecting unit 102. Further, as the control unit 106 transfers the high-frequency signal generation command or the high-frequency signal transmission stop command to the power line communication unit 108 based on the response signal, it is possible to control communication with the external connection device such as the power receiving device 200B, which is performed via the power line. In addition, for example, as the control unit 106 transfers the high-frequency signal generation command to the power line communication unit 108 at regular intervals or irregular intervals, it is possible to cause the power line communication unit 108 to transmit the high-frequency signal at regular intervals or irregular intervals.

Further, the control unit 106 actively performs the process related to the billing method according to the present embodiment (for example, from the process (1) (the billing information generation process) to the process (3) (the power control process)) as described above. In the control unit 106 arranged in the power supply device according to the present embodiment, an example of a configuration to implement the process related to the billing method according to the present embodiment will be described later.

The power line communication unit 108 undertakes communication with the external connection device such as the power receiving device 200B via the power line.

FIG. 9 is an explanatory diagram illustrating an example of a configuration of the power line communication unit 108 arranged in the power supply device 100B according to the present embodiment. Here, in FIG. 9, the control unit 106 and the first filter 110 are illustrated together. For example, the power line communication unit 108 includes a high-frequency signal generating unit 156 and a demodulating unit 158, and functions as a reader/writer (or an interrogator) in the NFC or the like. For example, the power line communication unit 108 may further include an encryption circuit (not shown) or a communication anti-collision circuit.

For example, upon receiving the high-frequency signal generation command transferred from the control unit 106, the high-frequency signal generating unit 156 generates the high-frequency signal corresponding to the high-frequency signal generation command. Further, upon receiving the high-frequency signal transmission stop command that is transferred from the control unit 106 and represents the transmission stop of the high-frequency signal, the high-frequency signal generating unit 156 stops the generation of the high-frequency signal. Here, in FIG. 9, AC power is illustrated as the high-frequency signal generating unit 156, but the high-frequency signal generating unit 156 according to the present embodiment is not limited to this example. For example, the high-frequency signal according to the present embodiment generating unit 132 may include a modulating circuit (not shown) that performs ASK modulation and an amplifying circuit (not shown) that amplifies an output of the modulating circuit.

Here, for example, the high-frequency signal including the identification information transmission request to request the external connection device to transmit the identification information or the high-frequency signal including various kinds of processing commands on the external connection device or data to process may be used as the high-frequency signal generated by the high-frequency signal generating unit 156. However, the high-frequency signal generated by the high-frequency signal generating unit 156 is not limited to this example. For example, the high-frequency signal according to the present embodiment may be a signal (for example, a non-modulated signal) causing the power line communication unit 208 of the power receiving device 200B to perform power supply.

For example, the demodulating unit 158 demodulates the response signal from the external connection device by performing envelope detection on a change in amplitude of a voltage between the high-frequency signal generating unit 156 and the first filter 110 and binarizing the detected signal. Then, the demodulating unit 158 transfers the demodulated response signal (for example, the response signal representing the identification information or the response signal representing the response based on processing corresponding to the high-frequency signal) to the control unit 106. The demodulating device of the response signal in the demodulating unit 158 is not limited to the above example, and, for example, the demodulating unit 158 can demodulate the response signal using a change in a phase of a voltage between the high-frequency signal generating unit 156 and the first filter 110.

For example, through the configuration illustrated in FIG. 9, the power line communication unit 108 of the present embodiment can function as the reader/writer in the NFC or the like and perform communication with the external connection device via the power line.

The configuration of the power line communication unit 108 of the present embodiment is not limited to the configuration illustrated in FIG. 9. FIG. 10 is an explanatory diagram illustrating another example of the power line communication unit 108 arranged in the power supply device 100B according to the present embodiment. Here, in FIG. 10, the control unit 106 and the first filter 110 are illustrated together, similarly to FIG. 9.

The power line communication unit 108 related to another example includes a high-frequency signal generating unit 156, a demodulating unit 158, a first high-frequency transceiving unit 160, and a second high-frequency transceiving unit 162. For example, the power line communication unit 108 related to another example may further include an encryption circuit (not shown) or a communication anti-collision circuit.

The high-frequency signal generating unit 156 generates the high-frequency signal in response to the high-frequency signal generation command, and stops the generation of the high-frequency signal in response to the high-frequency signal transmission stop command, similarly to the high-frequency signal generating unit 156 illustrated in FIG. 9.

The demodulating unit 158 demodulates the response signal from the external connection device by performing envelope detection on a change in amplitude of a voltage in an antenna end of the high-frequency signal generating unit 156 and binarizing the detected signal. The demodulating device of the response signal in the demodulating unit 158 is not limited to the above example, and, for example, the demodulating unit 158 can demodulate the response signal using a change in a phase of a voltage in the antenna end of the high-frequency signal generating unit 156.

For example, the first high-frequency transceiving unit 160 includes a coil (inductor; the same applies hereinafter) L3 having a predetermined inductance and a capacitor C3 having a predetermined capacitance and so configures a resonance circuit. Here, for example, the frequency of the high-frequency signal such as 13.56 [MHz] may be used as the resonance frequency of the first high-frequency transceiving unit 156. Through the above-described configuration, the first high-frequency transceiving unit 160 can transmit the high-frequency signal generated by the high-frequency signal generating unit 156, and receive the response signal transmitted from the external connection device through the second high-frequency transceiving unit 162. In other words, the first high-frequency transceiving unit 160 functions as a first communication antenna in the power line communication unit 108.

For example, the second high-frequency transceiving unit 162 includes a coil L4 having a predetermined inductance and a capacitor C4 having a predetermined capacitance and so configures a resonance circuit. Here, for example, the frequency of the high-frequency signal such as 13.56 [MHz] may be used as the resonance frequency of the second high-frequency transceiving unit 162. Through the above-described configuration, the second high-frequency transceiving unit 162 can receive the high-frequency signal transmitted from the first high-frequency transceiving unit 160 and transmit the response signal transmitted from the external connection device. In other words, the second high-frequency transceiving unit 162 functions as a second communication antenna in the power line communication unit 108.

Through the configuration illustrated in FIG. 10, the power line communication unit 108 of the present embodiment can function as the reader/writer in NFC and perform communication with the external connection device via the power line, similarly to the configuration illustrated in FIG. 9.

In the power supply device 100B according to the present embodiment, an example of a configuration related to the power line communication of the present embodiment will be described with reference to FIG. 8 again. The first filter 110 is connected between the power line communication unit 108 and the power line PL, and functions to filter a signal transferred from the power line PL. More specifically, the first filter 110 has a function of blocking at least a signal of a frequency of power supplied from the external connection device such as the power receiving device 200B via the power among signals transferred from the power line PL but passing the high-frequency signal. The power supply device 100B includes the first filter 110 and thus does not transfer a signal of a frequency of power that may cause noise to the power line communication unit 108. Thus, it is possible to improve the accuracy of communication between the power line communication unit 108 and the external connection device (more technically, for example, a power line communication unit arranged in the external connection device such as the power line communication unit 208 of the power receiving device 200B, which will be described later).

FIG. 11 is an explanatory diagram illustrating an example of a configuration of the first filter 110 arranged in the power supply device 100B according to the present embodiment. The first filter 110 includes inductors L5 and L6, capacitors C5 to C7 and surge absorbers SA1 to SA3. Of course, the configuration of the first filter 110 according to the present embodiment is not limited to the configuration illustrated in FIG. 11.

In the power supply device 100B according to the present embodiment, an example of a configuration of the power line communication of the present embodiment will be described with reference to FIG. 8 again. The second filter 112 is disposed on the power line PL between the connecting unit 102 and the power, and functions to perform filtering on a signal transferred from the connecting unit 102 side. Here, for example, an external power source such as a commercial power source or an internal power source such as a battery may be used as a power source according to the present embodiment.

More specifically, the second filter 112 has a function of blocking at least the high-frequency signal transmitted by the power line communication unit 108 or the high-frequency signal transmitted by the external connection device but passing a signal of a frequency of power supplied to the external connection device. The power supply device 100B includes the second filter 112 and thus can block, for example, the high-frequency signal related to the communication via the power line or a noise component such as a noise component transferred from the external connection device side. In other words, the second filter 112 functions as a so-called power splitter.

FIG. 12 is an explanatory diagram illustrating an example of a configuration of the second filter 112 arranged in the power supply device 100B according to the present embodiment. The second filter 112 includes inductors L7 and L8, a capacitor C8, and a surge absorber SA4. Of course, the configuration of the second filter 112 according to the present embodiment is not limited to the configuration illustrated in FIG. 12.

For example, through the configuration illustrated in FIG. 8, the power supply device 100B according to the present embodiment can perform communication with the external connection device such as the power receiving device 200B connected to the connecting unit 102 via the power line. Further, for example, through the configuration illustrated in FIG. 8, the power supply device 100B according to the present embodiment can cause the external connection device to perform a predetermined process based on the transmitted high-frequency signal such as transmission of the identification information and an accounting process using an electronic value.

2-2. Power Receiving Device 200B

For example, the power receiving device 200B includes a connecting unit 202, a first filter 206, a power line communication unit 208, and a second filter 210.

For example, the power receiving device 200B includes a battery (not shown) and various kinds of devices (for example, an MPU, various kinds of processing circuits, and a driving device (not shown)) for implementing the function of the power receiving device 200B, which are arranged at the stage subsequent to the second filter 210 (on the side of the second filter 210 illustrated in FIG. 8 opposite to the power supply device 100B). In other words, for example, the power receiving device 200B can cause the battery (not shown) to be charged by power supplied from the external connection device such as the power supply device 100B via the power line and can implement the function of the power receiving device 200B using the supplied power. For example, when the power receiving device 200B is a vehicle such as an electric vehicle, the power receiving device 200B is supplied with power to charge an internal battery and rotates a vehicle using power from the battery. Further, when the power receiving device 200B includes a display device capable of displaying an image (a moving image/a still image) and/or text, the power receiving device 200B is supplied with power and causes an image or text to be displayed on the display screen of the display device.

The first filter 206 is connected between the power line (technically, the power line PL in the power receiving device 200B) and the power line communication unit 208, and functions to perform filtering on a signal transferred from the power line. More specifically, the first filter 206 has a function of blocking at least a signal of a frequency of power among signals transferred from the power line but passing the high-frequency signal. The power receiving device 200B includes the first filter 206 and thus does not transfer a signal of a frequency of power that causes a noise to the power line communication unit 208. Thus, it is possible to improve the accuracy of communication between the power line communication unit 208 and the external connection device (more technically, for example, the power line communication unit arranged in the external connection device such as the power line communication unit 108 of the power supply device 100B).

Here, for example, the first filter 206 has the same configuration as the first filter 110 of the power supply device 100B illustrated in FIG. 11. Of course, the configuration of the first filter 206 according to the present embodiment is not limited to the configuration illustrated in FIG. 11.

The power line communication unit 208 performs communication with the external connection device such as the power supply device 100B via the power line based on the high-frequency signal. More specifically, for example, when the power line communication unit 208 receives the high-frequency signal from the external connection device, the power line communication unit 208 is driven by power obtained from the high-frequency signal and performs processing based on the received high-frequency signal. Then, the power line communication unit 208 transmits the response signal according to the above processing as the high-frequency signal through the load modulation.

For example, when the power line communication unit 208 receives the high-frequency signal including an identification information transmission request to request transmission of the identification information, the power line communication unit 208 reads the stored identification information based on the identification information transmission request included in the high-frequency signal. Then, the power line communication unit 208 performs transmission such that the read identification information is superimposed on the power line through the load modulation. For example, when the power line communication unit 208 receives the high-frequency signal including various kinds of processing commands or data to process, the power line communication unit 208 performs processing based on the processing command or the data included in the high-frequency signal. Then, the power line communication unit 208 performs transmission such that the response signal based on the above processing is superimposed on the power line through the load modulation. In other words, for example, the power line communication unit 208 functions as a responder in the NFC.

FIG. 13 is an explanatory diagram illustrating an example of a configuration of the power line communication unit 208 arranged in the power receiving device 200B according to the present embodiment. Here, FIG. 13 illustrates this together with the first filter 206. Further, FIG. 13 illustrates a configuration in which the power line communication unit 208 includes an IC chip 280 that demodulates and processes the received high-frequency signal and transmits the response signal through the load modulation. In the power line communication unit 208 of the present embodiment, each of structural elements configuring the IC chip 280 illustrated in FIG. 9 may not be configured in the form of an IC chip.

For example, the IC chip 280 includes a detecting unit 254, a detecting unit 256, a regulator 258, a demodulating unit 260, a data processing unit 262, and a load modulating unit 264. Although not shown in FIG. 13, for example, the IC chip 280 may further include a protection circuit (not shown) for preventing an overvoltage or an overcurrent from being applied to the data processing unit 262. Here, for example, a clamp circuit constituted by a diode or the like may be used as the protection circuit (not shown).

For example, the IC chip 280 includes a ROM 234, a RAM 236, and an internal memory 238. For example, the data processing unit 262, the ROM 234, the RAM 236, and the internal memory 238 are connected to one another via a bus 240 serving as a data transmission path.

Here, when the configuration of the IC chip 280 illustrated in FIG. 13 is compared with the configuration of the IC chip 252 arranged in the wireless communication unit 204 illustrated in FIG. 7 which relates to the wireless communication according to the present embodiment, it can be understood that the IC chip 280 has the same configuration as the IC chip 252 illustrated in FIG. 7.

As described above, the high-frequency signal based on the received carrier wave is input to the IC chip 252 illustrated in FIG. 7 through the communication antenna 250, and the IC chip 252 modulates and processes the high-frequency signal based on the carrier wave received by the communication antenna 250, and transmits the response signal to the communication antenna 250 through the load modulation. On the other hand, the high-frequency signal transmitted from the external connection device such as the power supply device 100B, which is transferred from the first filter 206, is input to the IC chip 280. Further, as illustrated in FIG. 13, the IC chip 280 has the same configuration as the IC chip 252 illustrated in FIG. 7. Thus, the IC chip 280 can demodulate and process the input high-frequency signal and transmit the response signal corresponding to the high-frequency signal through the load modulation, similarly to the IC chip 252 illustrated in FIG. 7.

Further, the IC chip 280 is connected to the first filter 206 as illustrated in FIG. 13, and the first filter 206 is connected to the power line PL as illustrated in FIG. 8. Thus, the response signal transmitted from the IC chip 280 is superimposed on the power line through the first filter 206.

For example, through the configuration illustrated in FIG. 13, the IC chip 280 processes the received high-frequency signal, and performs transmission such that the processed signal is superimposed on the response signal through the load modulation. Of course, the configuration of the IC chip 280 according to the present embodiment is not limited to the configuration illustrated in FIG. 8.

For example, through the configuration illustrated in FIG. 13, the power line communication unit 208 can be driven by power obtained from the received high-frequency signal, perform processing represented by the received high-frequency signal, and transmit the response signal according to the processing through the load modulation.

The power line communication unit 208 of the present embodiment is not limited to the configuration illustrated in FIG. 13. FIG. 14 is an explanatory diagram illustrating another example of the configuration of the power line communication unit 208 arranged in the power receiving device 200B according to the present embodiment. Here, FIG. 14 illustrates this together with the first filter 206. In the power line communication unit 208 of the present embodiment, each of structural elements configuring the IC chip 280 illustrated in FIG. 14 may not be configured in the form of an IC chip.

The power line communication unit 208 according to another example includes a first high-frequency transceiving unit 282, a second high-frequency transceiving unit 284, and an IC chip 280.

For example, the first high-frequency transceiving unit 282 includes a coil L9 having a predetermined inductance and a capacitor C9 having a predetermined capacitance and so configures a resonance circuit. Here, for example, the frequency of the high-frequency signal such as 13.56 [MHz] may be used as the resonance frequency of the first high-frequency transceiving unit 282. Through the above-described configuration, the first high-frequency transceiving unit 282 can transmit the high-frequency signal transferred from the first filter 206, and receive the response signal transmitted from the second high-frequency transceiving unit 284. In other words, the first high-frequency transceiving unit 282 functions as a first communication antenna in the power line communication unit 208.

For example, the second high-frequency transceiving unit 284 includes a coil L10 having a predetermined inductance and a capacitor C10 having a predetermined capacitance and so configures a resonance circuit. Here, for example, the frequency of the high-frequency signal such as 13.56 [MHz] may be used as the resonance frequency of the second high-frequency transceiving unit 284. Through the above-described configuration, the second high-frequency transceiving unit 284 can receive the high-frequency signal transmitted from the first high-frequency transceiving unit 282 and transmit the response signal. More specifically, the second high-frequency transceiving unit 284 generates an inductive voltage through the electromagnetic induction upon receiving the high-frequency signal, and outputs a reception voltage obtained by resonating the inductive voltage at a predetermined resonance frequency to the IC chip 280. Further, the second high-frequency transceiving unit 284 transmits the response signal through the load modulation performed in the load modulating unit 264 arranged in the IC chip 280. In other words, the second high-frequency transceiving unit 284 functions as a second communication antenna in the power line communication unit 208.

The IC chip 280 performs the same processing as in the IC chip 280 illustrated in FIG. 13 based on the reception voltage transferred from the second high-frequency transceiving unit 284.

Even through the configuration illustrated in FIG. 14, the power line communication unit 208 can be driven by power obtained from the received high-frequency signal, perform processing represented by the received high-frequency signal, and transmit the response signal according to the processing through the load modulation, similarly to the configuration illustrated in FIG. 13. Further, when the power line communication unit 208 has the configuration illustrated in FIG. 14, the power line communication unit 208 can use an IC chip related to, for example, NFC or RFID, and thus there is an advantage in that implementation can be easily performed.

In the power receiving device 200B according to the present embodiment, an example of the configuration of the power line communication of the present embodiment will be described with reference to FIG. 8 again. The second filter 210 functions to perform filtering on a signal transferred from the external connection device side such as the power supply device 100B through the power line PL. More specifically, the second filter 210 has a function of blocking at least the high-frequency signal transmitted by the external connection device or the high-frequency signal transmitted by the power line communication unit 208 but passing a signal of a frequency of power supplied through the power line PL. The power receiving device 200B includes the second filter 210 and thus can block, for example, the high-frequency signal related to the communication via the power line or a noise component such as a noise component transferred from the external connection device side. In other words, the second filter 210 functions as a so-called power splitter, similarly to the second filter 112 arranged in the power supply device 100B.

Here, for example, the second filter 210 may have the same configuration as the second filter 112 of the power supply device 100B illustrated in FIG. 12. Of course, the configuration of the second filter 210 according to the present embodiment is not limited to the configuration illustrated in FIG. 12.

For example, as the power supply device according to the present embodiment includes the power line communication unit 108 illustrated in FIG. 8, and the power receiving device according to the present embodiment includes the power line communication unit 208 illustrated in FIG. 8, the power supply device according to the present embodiment and the power receiving device according to the present embodiment can perform power line communication in which the wireless communication technique such as the communication technique by NFC is applied to the wired communication.

Here, the communication device using the wireless communication technique such as the communication technique by NFC is much smaller in circuit size than an existing PLC modem, and thus the size of the communication device can be reduced to the same size as an IC chip. For example, with the spread of devices capable of performing communication using the wireless communication technique such as the communication technique by the NFC, for example, a portable telephone in which an IC card or an IC chip is mounted, the communication device using the wireless communication technique such as the communication technique by the NFC or RFID technique is cheaper than an existing PLC modem.

Further, as the wireless communication technique such as the communication technique by the NFC or RFID technique is applied to the wired communication, the power receiving device according to the present embodiment can be driven by power obtained from the received high-frequency signal through the power line and can transmit stored information by performing the load modulation. In other words, in the communication system including the power supply device according to the present embodiment and the power receiving device according to the present embodiment, the power receiving device according to the present embodiment can perform wired communication even when a separate power supply circuit to perform communication is not arranged. Further, for example, the power receiving device according to the present embodiment can transmit stored information by performing the load modulation even when a signal (a signal representing the user's instruction) according to the user's operation is not input.

Thus, when the wireless communication technique such as the communication technique by the NFC or the RFID technique is used, it is possible to implement wired communication in which a cost is low, a limitation on the size of a communication device is mitigated, and power consumption is low, more than, for example, when conventional wired communication such as an existing PLC is used.

Power Supply Device and Power Receiving Device According to Present Embodiment

Next, an example of configurations of the power supply device according to the present embodiment capable of performing the process related to the billing method according to the present embodiment will be described. Further, in the following, an example of configurations of the power supply device according to the present embodiment and the power receiving device (external connection device) according to the present embodiment will be described in connection with an example in which the power supply device according to the present embodiment performs communication with the power receiving device according to the present embodiment through the power line communication of the present embodiment illustrated in FIG. 8.

FIG. 15 is an explanatory diagram illustrating is an example of a configuration of the power supply device according to the present embodiment 100. Here, FIG. 15 illustrates this together with the power receiving device 200B illustrated in FIG. 8.

For example, the power supply device 100 includes a connecting unit 102, a control unit 106, a power line communication unit 108, a first filter 110, a second filter 112, a power supply unit 114, a power consumption measuring unit 116, a storage unit 118, and a communication unit 120 (a second communication unit).

The power supply device 100 may further include, for example, a ROM (not shown), a RAM (not shown), a display unit (not shown), and the like. For example, the structural elements of the power supply device 100 are connected with one another via a bus serving as a data transmission path.

For example, the control unit 106 is configured with an MPU, various kinds of processing circuits, or the like, and functions to control the power supply device 100 in general. Further, for example, the control unit 106 includes a billing information generating unit 122, a billing processing unit 124, an authenticating unit 126, and a power control unit 128, and actively performs the process related to the billing method according to the present embodiment.

The billing information generating unit 122 actively performs the process (1) (the billing information generating process), and generates the billing information representing the cost of electric power supplied to the external connection device such as the power receiving device 200B for each predetermined amount related to transmitted electric power.

More specifically, for example, the billing information generating unit 122 detects a time elapsed after transmission of electric power to the external connection device starts, and generates the billing information each time the detected elapsed time reaches a predetermined time (an example of the set condition) (when a time of power supply to the external connection device is used as an amount related to transmitted electric power). Here, for example, the billing information generating unit 122 detects that transmission of electric power has started based on a signal representing that transmission of electric power to the external connection device has started, which is transferred from the power control unit 128 which will be described later. Further, for example, the billing information generating unit 122 detects a time elapsed after transmission of electric power starts based on a clock signal obtained from an oscillation circuit or the like.

Further, for example, the billing information generating unit 122 detects an amount of electric power supplied to the external connection device, and generates the billing information each time an amount of detected electric power reaches a predetermined amount of electric power (an example of the set condition) (when an amount of electric power supplied to the external connection device is used as an amount related to transmitted electric power). Here, for example, the billing information generating unit 122 detects an amount of electric power supplied to the external connection device based on information (data) representing power consumption (electric power corresponding to transmitted electric power) transferred from the power consumption measuring unit 116 which will be described later.

Further, for example, the billing information generating unit 122 detects an amount of money corresponding to an amount of electric power supplied to the external connection device, and generates the billing information each time an amount of money corresponding to an amount of detected electric power supply reaches a predetermined amount (an example of the set condition) (when the cost of an amount of electric power supplied to the external connection device is used as an amount related to transmitted electric power). Here, for example, the billing information generating unit 122 specifies an amount of electric power supplied to the external connection device based on information representing power consumption (electric power corresponding to transmitted electric power) transferred from the power consumption measuring unit 116 which will be described later. Further, for example, the billing information generating unit 122 detects an amount of money corresponding to an amount of electric power supplied to the external connection device by calculating an amount of money corresponding to the specified amount of electric power based on price information (data) representing the price of electric power (for example, a unit price such as a price per [kWh]). For example, the billing information generating unit 122 acquires the price information from the external device such as the server, but a method of acquiring the price information according to the present embodiment is not limited to the above example. For example, the billing information generating unit 122 may acquire price information by receiving price information, which is transmitted in a packet form via a power line.

Further, for example, the billing information generating unit 122 may generate the billing information based on at least one or two or more amount of the power supply time to the external connection device, an amount of electric power supplied to the external connection device, or the cost of an amount of electric power supplied to the external connection device.

The billing processing unit 124 actively performs the process (2) (the billing process), and performs the billing process based on the generated billing information in the billing information generating unit 122.

More specifically, when the first billing process (the direct billing process on the external connection device) is performed, for example, the billing processing unit 124 performs billing on the external connection device by causing the power line communication unit 108 (which corresponds to a first communication unit) to perform communication with the external connection device and transmit the billing process command to the external connection device.

For example, when the second billing process (the indirect billing process on the external connection device) is performed, the billing processing unit 124 causes the external billing processing device to perform billing for the user of the external connection device by causing the communication unit 120 (which corresponds to the second communication unit) to perform communication with the external billing processing device and transmit the billing information to the external billing processing device.

In addition, when the second billing process is performed, for example, the billing processing unit 124 may store the billing information generated in the billing information generating unit 122 in the storage unit 118 and may transmit the billing information to the external billing processing device when a predetermined time arrives or at predetermined time intervals. For example, when the billing information is transmitted to the external billing processing device when a predetermined time arrives or at predetermined time intervals, the billing processing unit 124 adds up a value of the cost represented by the billing information corresponding to the same external connection device and transmits the billing information representing the added value to the external billing processing device.

Further, when the third billing process is performed, for example, the billing processing unit 124 preferentially performs the first billing process and performs the process in which the first billing process is combined with the second billing process. Furthermore, when the third billing process is performed, for example, the billing processing unit 124 may selectively perform the first billing process and the second billing process based on the set billing process setting.

The authenticating unit 126 actively performs the authentication process according to the present embodiment, and performs authentication on the external connection device based on the identification information representing the external connection device, which is acquired from the external connection device. More specifically, for example, the authenticating unit 126 acquires the identification information from the external connection device by causing the power line communication unit 108 to perform communication with the external connection device. Then, for example, the authenticating unit 126 performs authentication on the external connection device based on the communication result with the external connection device or the authentication result which is based on the acquired identification information and the database in which the identification information representing the external device of the power supply target is recorded.

The power control unit 128 actively performs the process (3) (the power control process), and for example, selectively transmits electric power to the external connection device based on the result of the billing process transferred from the billing processing unit 124. Further, for example, the power control unit 128 may selectively transmit electric power to the external connection device based on the result of the billing process transferred from the billing processing unit 124 and the authentication result transferred from the authenticating unit 126. More specifically, for example, electric power is selectively transmitted to the external connection device such that a control signal used to control selective supply of electric power to the power line PL in the power supply unit 114 is transferred to the power supply unit 114 to control an operation of the power supply unit 114.

Further, for example, the power control unit 128 may control an operation of the power consumption measuring unit 116 by transferring a control signal used to control a start and a stop of measurement of power consumption in the external connection device such as the power receiving device 200B in the power consumption measuring unit 116 to the power consumption measuring unit 116.

For example, the control unit 106 includes the billing information generating unit 122, the billing processing unit 124, the authenticating unit 126, and the power control unit 128 and thus actively performs the process related to the billing method according to the present embodiment.

The configuration of the control unit arranged in the power supply device according to the present embodiment is not limited to the configuration illustrated in FIG. 15. For example, the power supply device according to the present embodiment may not include the authenticating unit 126. Even when the authenticating unit 126 is not provided, the power supply device according to the present embodiment can perform the process (1) (the billing information generating process) to the process (3) (the power control process) in connection with the billing method according to the present embodiment.

Further, for example, the power supply device according to the present embodiment may individually include one or two or more of the billing information generating unit 122, the billing processing unit 124, the authenticating unit 126, and the power control unit 128 illustrated in FIG. 15 (for example, each unit may be implemented by an individual processing circuit).

The power line communication unit 108 functions as a communication unit (a part of the first communication unit) that performs communication with the external connection device. For example, as described above with reference FIGS. 9 and 10, communication in the power line communication unit 108 is controlled by, for example, the control unit 106, and the power line communication unit 108 transfers the demodulated response signal to the control unit 106.

For example, the power supply unit 114 selectively connects power (for example, an internal power source or an external power source) to the power line PL based on the control signal transferred from the control unit 106 (more technically, the power control unit 124), and selectively supplies the power line PL with power.

Here, for example, a switch which is turned on or off based on a control signal transferred from the control unit 106 may be used as the power supply unit 114. For example, the switch is constituted by a p-channel type MOSFET or an n-channel type MOSFET, but a configuration of the switch is not limited to this example.

The power consumption measuring unit 116 is connected to the connecting unit 102 and measures power consumption (for example, it corresponds to the electric power supplied to the external connection device) expended by the external connection device such as the power receiving device 200. The power consumption measuring unit 116 transfers information of measured power consumption to the control unit 106. For example, the power consumption measuring unit 116 can selectively perform measurement based on a control signal transferred from the control unit 106 (more technically, the power control unit 124). Here, for example, a power consumption meter may be used as the power consumption measuring unit 116.

The storage unit 118 stores a variety of data such as the identification information acquired from the external connection device such as the power receiving device 200B, the database in which the identification information representing the external device of the power supply target is recorded, the billing information, and an application. Here, a magnetic recording medium such as a hard disk or a non-volatile memory such as an Electrically Erasable and Programmable Read Only Memory (EEPROM), a flash memory, a Magnetoresistive Random Access Memory (MRAM), a Ferroelectric Random Access Memory (FeRAM), and a Phase change Random Access Memory (PRAM) may be used as the storage unit 118. Further, the storage unit 118 may be removably mounted in the power supply device 100.

The communication unit 120 is a communication unit arranged in the power supply device 100, and performs wired or wireless communication with an external billing processing device or an external device such as a server via a network (or directly). For example, communication of the communication unit 120 is controlled by the control unit 106.

Here, for example, a communication antenna and a radio frequency (RF) circuit (wireless communication), an IEEE802.15.1 port and a transceiving circuit (wireless communication), an IEEE802.11b port and a transceiving circuit (wireless communication), or a local area network (LAN) terminal and a transceiving circuit (wired communication) may be used as the communication unit 120. Further, the communication unit 120 may have a configuration conforming to an arbitrary communication standard such as a universal serial bus (USB) terminal and a transceiving circuit or a configuration capable of performing communication such as an external device via a network. Examples of the network according to the present embodiment includes a wired network such as a LAN or a wide area network (WAN), a wireless network such as a wireless LAN (WLAN) or a wireless WAN (WWAN) via a base station, and the Internet using a communication protocol such as a transmission control protocol/Internet protocol (TCP/IP).

For example, the power supply device 100 performs the process related to the billing method according to the present embodiment (for example, from the process (1) (the billing information generation process) to the process (3) (the power control process)) through the configuration illustrated in FIG. 15. Thus, for example, the power supply device 100 can reduce the disadvantage to the user in billing for supply of electric power through the configuration illustrated in FIG. 15.

Note that the configuration of the power supply device according to the present embodiment is not limited to the configuration shown in FIG. 15.

1. First Modified Example

For example, the power supply device according to the present embodiment may have a configuration in which the communication unit 120 is not provided. Even when the communication unit 120 is not provided, the power supply device according to the first modified example of the present embodiment can perform the process (1) (the billing information generating process), the first billing process in the process (2) (the billing process), and the process (3) (the power control process). Thus, the power supply device according to the first modified example of the present embodiment can reduce the disadvantage to the user in billing for supply of electric power.

2. Second Modified Example

For example, the power supply device according to the present embodiment may have a configuration in which the communication unit (the first communication unit) for performing the power line communication of the present embodiment such as the power line communication unit 108 and the first filter 110 is not provided. Even when the communication unit for performing the power line communication of the present embodiment is not provided, the power supply device according to the second modified example of the present embodiment can perform the process (1) (the billing information generating process), the second billing process in the process (2) (the billing process), and the process (3) (the power control process). Thus, the power supply device according to the second modified example of the present embodiment can reduce the disadvantage to the user in billing for supply of electric power.

3. Third Modified Example

Further, for example, the power supply device according to the present embodiment may not include the power consumption measuring unit 116 as an external device (or circuit) of the power supply device according to the present embodiment when a device (or circuit) having a function corresponding to the power consumption measuring unit 116 is present. In this case, even when the power consumption measuring unit 116 is not provided, for example, the power supply device according to the third modified example of the present embodiment can perform the process (1) (the billing information generating process) to the process (3) (the power control process) based on information of power consumption received from the device (or circuit) having a function corresponding to the power consumption measuring unit 116. Thus, the power supply device according to the third modified example of the present embodiment can reduce the disadvantage to the user in billing for supply of electric power.

4. Fourth Modified Example

Further, for example, the power supply device according to the present embodiment may not include the power supply unit 114 as an external device (or circuit) of the power supply device according to the present embodiment when the device (or circuit) having a function corresponding to the power supply unit 114 is present. In this case, even when the power supply unit 114 is not provided, the power supply device according to the fourth modified example of the present embodiment can perform the process (1) (the billing information generating process) to the process (3) (the power control process) by controlling the device (or circuit) having a function corresponding to the power supply unit 114 in the same way as control of the power supply unit 114. Thus, the power supply device according to the fourth modified example of the present embodiment can reduce the disadvantage to the user in billing for supply of electric power.

5. Fifth Modified Example

For example, FIG. 15 illustrates the configuration in which the power supply device according to the present embodiment performs communication with the power receiving device (one example of the external connection device) according to the present embodiment through the power line communication of the present embodiment. The power supply device according to the present embodiment can perform communication with the power receiving device according to the present embodiment through wireless communication according to the present embodiment. More specifically, when communication is performed through wireless communication according to the present embodiment, for example, the power supply device according to the present embodiment and the power receiving device according to the present embodiment include a configuration in which communication is performed through the wireless communication according to the present embodiment illustrated in FIG. 8 instead of the configuration in which communication is performed through the power line communication according to the present embodiment illustrated in FIG. 6.

Here, even when the configuration in which communication is performed through the wireless communication according to the present embodiment is provided, the power supply device according to the fifth modified example of the present embodiment can perform the process (1) (the billing information generating process) to the process (3) (the power control process). Thus, the power supply device according to the fifth modified example of the present embodiment can reduce the disadvantage to the user in billing for supply of electric power.

6. Sixth Modified Example

Further, for example, the power supply device according to the present embodiment may have the configuration in which communication is performed through the power line communication according to the present embodiment and the configuration in which communication is performed through the wireless communication according to the present embodiment. More specifically, for example, the power supply device according to the present embodiment has the configuration of FIG. 6 in which communication is performed through the wireless communication according to the present embodiment and the configuration of FIG. 8 in which communication is performed through the power line communication according to the present embodiment.

Here, even when the configuration in which communication is performed through the power line communication according to the present embodiment and the configuration in which communication is performed through the wireless communication according to the present embodiment are provided, the power supply device according to the sixth modified example of the present embodiment can perform the process (1) (the billing information generating process) to the process (3) (the power control process). Thus, the power supply device according to the sixth modified example of the present embodiment can reduce the disadvantage to the user in billing for supply of electric power. Further, for example, the power supply device according to the sixth modified example of the present embodiment may perform different processes when the billing process is performed through the power line communication of the present embodiment and when the billing process is performed through the wireless communication according to the present embodiment.

[7] Seventh Modified Example

Further, for example, the power supply device according to the present embodiment may have a function of performing the billing process on the external connection device before transmitting electric power and transmitting electric power after the billing process is completed (a function of transmitting electric power by pre-payment). More specifically, for example, the power supply device according to the present embodiment transmits electric power to the external connection device each time a billing process of pre-payment on a predetermined amount of money such as 100 yen is completed. When the billing process of pre-payment according to the seventh modified example is performed, even when a connection between the power supply device according to the present embodiment and the power receiving device according to the present embodiment (the external connection device) via the power line is interrupted during transmission of electric power for a certain reason, the situation in which it is difficult for the user of the power supply device to receive the cost of supplied electric power is prevented. Further, even when a connection between the power supply device according to the present embodiment and the power receiving device according to the present embodiment (the external connection device) via the power line is interrupted during transmission of electric power for a certain reason, a shortage of electric power received by the power receiving device on the cost paid by the user of the power receiving device can be reduced, compared to when billing on supplied electric power is performed once in advance.

In addition, when the function of transmitting electric power by pre-payment is provided, for example, the power supply device according to the present embodiment may selectively switch the process related to the billing method according to the present embodiment and the billing process of pre-payment according to the seventh modified example through an operation of the user such as the user of the external connection device.

8. Eighth Modified Example

Further, for example, the power supply device according to the present embodiment can have an arbitrary configuration in which some of the configurations according to from the first modified example to the seventh modified example are combined.

Power Receiving Device According to Present Embodiment

The above embodiment has been described in connection with the example in which the power supply device according to the present embodiment actively performs the process related to the billing method according to the present embodiment. However, the present disclosure is not limited to the example in which the power supply device according to the present embodiment actively performs the process related to the billing method according to the present embodiment, and the power receiving device according to the present embodiment may actively perform the process related to the billing method according to the present embodiment. In this regard, next, the power receiving device according to the present embodiment that actively performs the process related to the billing method according to the present embodiment will be described.

1. Process Related to Billing Method in Power Receiving Device According to Present Embodiment Before the configuration of the power receiving device according to the present embodiment is described, the billing method in the power receiving device according to the present embodiment will be first described.

The power receiving device according to the present embodiment performs communication with the power supply device according to the present embodiment (which corresponds to the external connection device when seen from the power receiving device according to the present embodiment) connected via the power line (the communication process). Then, the power receiving device according to the present embodiment acquires the billing information generated in the process (1) (the billing information generating process), which is transmitted from the power supply device according to the present embodiment, through communication with the power supply device according to the present embodiment. Here, for example, the wireless communication according to the present embodiment or the power line communication of the present embodiment may be used as communication performed between the power receiving device according to the present embodiment and the power supply device according to the present embodiment. Further, for example, the power receiving device according to the present embodiment acquires the billing information by receiving the billing information transmitted from the power supply device according to the present embodiment each time the billing information is generated.

Here, when the billing information is acquired, the power receiving device according to the present embodiment performs the billing process based on the billing information, similarly to the power supply device according to the present embodiment (the billing process). Here, for example, the process corresponding to the first billing process to the third billing process in the power supply device according to the present embodiment may be used as the billing process in the power receiving device according to the present embodiment.

More specifically, for example, the power receiving device according to the present embodiment generates the billing process command according to the present embodiment based on the billing information. Then, for example, the power receiving device according to the present embodiment performs processing on an electronic value stored in an own device (the power receiving device according to the present embodiment) or an electronic value stored in an external device capable of performing communication with the power receiving device according to the present embodiment based on the generated billing process command (the first billing process in the power receiving device according to the present embodiment: the process corresponding to the first billing process in the power supply device according to the present embodiment).

Further, for example, the power receiving device according to the present embodiment may cause the external billing processing device to perform billing for the user of the power receiving device according to the present embodiment by performing communication with the external billing processing device having a function of performing billing for the user of the power receiving device according to the present embodiment, similarly to the second billing process in the power supply device according to the present embodiment (the second billing process in the power receiving device according to the present embodiment: the process corresponding to the second billing process in the power supply device according to the present embodiment).

Further, for example, the power receiving device according to the present embodiment may perform a process in which the first billing process in the power receiving device according to the present embodiment is combined with the second billing process in the power receiving device according to the present embodiment, similarly to the third billing process in the power supply device according to the present embodiment (the third billing process in the power receiving device according to the present embodiment: the process corresponding to the third billing process in the power supply device according to the present embodiment).

For example, the power receiving device according to the present embodiment performs the above-described process as the billing process.

The power receiving device according to the present embodiment selectively transmits electric power based on the result of the billing process to the power supply device according to the present embodiment (the power control process). More specifically, for example, the power receiving device according to the present embodiment transmits a response signal representing the result of the billing process to the power supply device according to the present embodiment and causes the power supply device according to the present embodiment to perform the process (3) (the power control process). Here, a signal representing that billing has been completed normally or a signal representing that billing has not been completed normally may be used as the response signal representing the result of the billing process according to the present embodiment, which is transmitted from the power receiving device according to the present embodiment.

Here, when the response signal representing the result of the billing process transmitted from the power receiving device according to the present embodiment represents that billing has been completed normally, for example, the power supply device according to the present embodiment causes the power supply unit to enter the power suppliable state. Thus, when the response signal representing the result of the billing process transmitted from the power receiving device according to the present embodiment represents that billing has been completed normally, for example, electric power can be continuously transmitted to the power receiving device according to the present embodiment.

However, when the response signal representing the result of the billing process transmitted from the power receiving device according to the present embodiment represents that billing has not been completed normally, for example, the power supply device according to the present embodiment does not cause the power supply unit to enter the power suppliable state. Thus, when the response signal representing the result of the billing process transmitted from the power receiving device according to the present embodiment represents that billing has not been completed normally, electric power is not transmitted to the power receiving device according to the present embodiment.

For example, the power receiving device according to the present embodiment performs (I) the communication process, (II) the billing process, and (III) the power control process as the process related to the billing method according to the present embodiment.

Here, the power receiving device according to the present embodiment performs the billing process based on the billing information acquired from the power supply device according to the present embodiment through the process (I) (the communication process) in the process (II) (the billing process). Further, the power receiving device according to the present embodiment causes the power supply device according to the present embodiment to selectively transmit electric power based on the result of the process (II) (the billing process) in the process (III) (the power control process). As described above, for example, the power supply device according to the present embodiment performs the process (1) (the billing information generating process), and generates the billing information for each predetermined amount related to transmitted electric power.

Thus, even when the power receiving device according to the present embodiment actively performs the process related to the billing method according to the present embodiment, the situation in which it is difficult for the user of the power receiving device to receive electric power corresponding to the cost paid by the power receiving device can be prevented, similarly to when the power supply device according to the present embodiment actively performs the process related to the billing method according to the present embodiment. Further, even when the power receiving device according to the present embodiment actively performs the process related to the billing method according to the present embodiment, the cost of supplied electric power which is not received by the user of the power supply device can be reduced, compared to when billing on supplied electric power is performed once in a post-usage manner, similarly to when the power supply device according to the present embodiment actively performs the process related to the billing method according to the present embodiment.

Thus, for example, by performing the process (I) (the communication process) to the process (III) (the power control process) as the process related to the billing method according to the present embodiment, the power receiving device according to the present embodiment can reduce the disadvantage to the user in billing for supply of electric power, similarly to when the power supply device according to the present embodiment actively performs the process related to the billing method according to the present embodiment.

Note that the process related to the billing method in the power receiving device according to the present embodiment is not limited to the above process (I) (the communication process) to the process (III) (the power control process). For example, the power receiving device according to the present embodiment may make a notice based on the received data (or signals) (notice control process). Here, as a method of making a notice base on the received data (or signals) may be a notice (for example, a notice regarding various information according to the above billing method) made base on control data when received the control data for controlling the notice regarding the present embodiment sent from the power receiving device according to the present embodiment, or a notice base on the control data when received the control data for making an error notice to be notified. Moreover, as a notice made by the power receiving device according to the present embodiment, for example, there is a notice using a method appealing to users' sensitivity, such as a visual notice method using letters, images, or the like, an acoustical notice method using sounds, or the like.

The power receiving device according to the present embodiment allows, for example, a device related to a notice that the power receiving device according to the present embodiment includes (for example, a display device, an audio output device such as a speaker, or the like), and/or an external device such as a device related to an external notice, to make a notice based on data received. Here, the power receiving device according to the present embodiment allows the device related to the notice or the external device to make a notice by conveying or transmitting the received data itself, however, the notice control process in the power receiving device according to the present embodiment is not limited to the above. For example, the power receiving device according to the present embodiment may allow the device related to a notice or the external device to make a notice by conveying or transmitting the data (or signals) generated based on the received data. As the data generated based on the received data, there is data indicating a content of the notice (for example, image data indicating an image corresponding to type of command indicated by a notice command, an audio data indicating sounds corresponding to the type of command, and so on) that is generated based on the notice command included in control data for controlling the received notice according to the present embodiment.

The power receiving device according to the present embodiment may make a notice regarding various information related to a billing method, such as information on power supply mode that is configurable (or power supply mode that has been configured), information on a price of electric power (for example, a unit price, such as a price per [kWh]) at each point, information on discounts applicable for the total amount of electric power supplied, and so on, by performing a notice control process. In addition, by performing a notice control process, the power receiving device according to the present embodiment may make an error notice to be performed based on the received data. Therefore, the user of the power receiving device according to the present embodiment can make various selection or decision, such as selection of power supply mode or decision whether power supply is possible at a price of electric power, based on the notified information. Moreover, the user of the power receiving device according to the present embodiment can understand current state based on the notified information. Further, the user of the power receiving device according to the present embodiment may allow the power receiving device according to the present embodiment to perform processes based on selection result or decision result (for example, process based on operational signals generated based on the above operation) by operating an operational device that the power receiving device according to the present embodiment includes (for example, a button, a touch panel, or the like) an external operational device such as a remote controller.

FIG. 16 is a flowchart illustrating an example of the process related to the billing method in the power receiving device according to the present embodiment. Here, the process of steps S600 and S602 illustrated in FIG. 16 corresponds to the process (II) (the billing process), and the process of steps S604 to S606 illustrated in FIG. 16 corresponds to the process (III) (the power control process). Further, FIG. 16 illustrates an example in which the power supply device according to the present embodiment and the power receiving device according to the present embodiment are in a communicable state, and the process (I) (the communication process) is not illustrated in FIG. 16.

The power receiving device according to the present embodiment determines whether or not the billing information has been received (S600). For example, when data obtained by demodulating a received signal is billing information, the power receiving device according to the present embodiment determines that the billing information has been received.

Here, when it is determined in step S600 that the billing information has been received, the power receiving device according to the present embodiment does not proceed with the process.

However, when it is determined in step S600 that the billing information has not been received, the power receiving device according to the present embodiment performs the billing process (S602). For example, the power receiving device according to the present embodiment performs the first billing process in the power receiving device according to the present embodiment, the second billing process in the power receiving device according to the present embodiment, or the third billing process in the power receiving device according to the present embodiment based on a set billing process setting.

Here, when the process of step S602 is completed, the power receiving device according to the present embodiment determines whether or not the billing process of step S602 has been completed normally (S604).

Here, when it is determined in step S604 that the billing process of step S602 has been completed normally, the power receiving device according to the present embodiment causes the power supply device according to the present embodiment to transmit electric power (S606). However, when it is determined in step S604 that the billing process has been not completed normally, the power receiving device according to the present embodiment does not cause the power supply device according to the present embodiment to transmit electric power (S608). Here, for example, the power receiving device according to the present embodiment performs the process of step S606 or the process of step S608 by transmitting the determination result of step S604, that is, the response signal representing the result of the billing process, to the power supply device according to the present embodiment.

For example, the power receiving device according to the present embodiment performs the process illustrated in FIG. 15 as the process related to the billing method.

2. Configuration Example of Power Receiving Device According to Present Embodiment Next, an example of a configuration of the power receiving device according to the present embodiment which can perform the process related to the billing method in the power receiving device according to the present embodiment will be described. FIG. 17 is an explanatory diagram illustrating an example of a configuration of the power receiving device 200 according to the present embodiment.

For example, the power receiving device 200 includes a connecting unit 202, a first filter 206, a power line communication unit 208, a second filter 210, and a communication unit 212. Further, for example, the power receiving device 200 includes a battery (not shown), various kinds of devices (not shown) for implementing the function of the power receiving device 200, and the like, which are arranged at the stage subsequent to the second filter 210 (at the side of the second filter 210 illustrated in FIG. 17 opposite to the connecting unit 202). In addition, the power receiving device 200 may include, for example, a device related to a notice (for example, a display device, audio output device such as a speaker, and so on). The communication unit 212 may be one of structural elements for implementing the function of the power receiving device 200.

The power line communication unit 208 functions as the communication unit that performs communication with the external connection device by performing load modulation based on the signal transmitted from the external connection device as described above with reference to FIGS. 13 and 14. Further, the power line communication unit 208 actively performs the process (I) (the communication process).

For example, the power line communication unit 208 includes a billing processing unit 220, a power control unit 222, and a notice control unit 224, and actively performs the process related to the billing method in the power receiving device according to the present embodiment (for example, the process (II) (the billing process), the process (III) (the power control process), and the above-mentioned notice control process). Here, in the power line communication unit 208, for example, the data processing unit 262 illustrated in FIGS. 13 and 14 functions as the billing processing unit 220, the power control unit 222, and the notice control unit 224.

In addition, FIG. 17 illustrates the configuration in which the power line communication unit 208 includes the billing processing unit 220, the power control unit 222, and the notice control unit 224, and actively performs the process related to the billing method in the power receiving device according to the present embodiment (for example, the process (I) (the communication process), the process (II) (the billing process), the process (III) (the power control process), and the above-mentioned notice control process)). However, the configuration of the power receiving device according to the present embodiment is not limited to the above example. For example, the power receiving device according to the present embodiment may individually include one or more out of the billing processing unit 220, the power control unit 222, and the notice control unit 224. In other words, in the power receiving device according to the present embodiment, one or more out of the billing processing unit 220, the power control unit 222, and the notice control unit 224 can be implemented by an individual processing circuit such as an MPU. Here, when one or more out of the billing processing unit 220, the power control unit 222, and the notice control unit 224 is provided separately from the power line communication unit 208, for example, one or more out of the billing processing unit 220, the power control unit 222, and the notice control unit 224 performs the process related to the billing method in the power receiving device according to the present embodiment, for example, by electric power obtained based on the high-frequency signal, electric power obtained by the power line PL, electric power obtained from an internal power source such as a battery, or the like.

FIG. 17 illustrates the configuration in which the power line communication unit 208 includes the notice control unit 224, however, the configuration of the power receiving device according to the present embodiment is not limited to the above-configuration. For example, the power receiving device according to the present embodiment may be configured not to include the notice control unit 224. Even if not having such configuration without the notice control unit 224, the power receiving device according to the present embodiment may perform the above-mentioned process of (I) (communication process), the process of (II) (billing process), and the process of (III) (the power control process).

The billing processing unit 220 actively perform the process (II) (the billing process), and performs the billing process based on the billing information transmitted from the power supply device according to the present embodiment. For example, the billing processing unit 220 performs the first billing process in the power receiving device according to the present embodiment, the second billing process in the power receiving device according to the present embodiment, or the third billing process in the power receiving device according to the present embodiment, based on billing process setting data (an example of a set billing process setting) stored in the internal memory 270 illustrated in FIGS. 13 and 14.

The power control unit 222 actively performs the process (III) (the power control process), and causes the power supply device according to the present embodiment (the external connection device) to selectively transmit electric power based on the result of the billing process in the billing processing unit 222. For example, the power control unit 222 causes the power supply device according to the present embodiment to selectively transmit electric power by transmitting the response signal representing the result of the billing process in the billing processing unit 222.

The notice control unit 224 actively performs the notice control process described above, and allows a device related to notification that the power receiving device according to the present embodiment has and/or an external device to make a notice based on the received notice (or signal).

The communication unit 212 is a communication unit arranged in the power receiving device 200, and performs communication with the external billing processing device or the external device such as the server via a network (or directly) in a wired or wireless manner. For example, when the billing processing unit 220 performs the second billing process or the third billing process in the power receiving device according to the present embodiment, for example, the billing processing unit 220 allows the communication unit 212 to transmit the received billing information to the external billing processing device. Further, for example, the communication unit 212 is driven by electric power obtained based on the high-frequency signal, electric power obtained from the power line PL, or electric power obtained from an internal power source such as a battery, and performs communication.

Here, for example, a communication antenna and a radio frequency (RF) circuit (wireless communication), an IEEE802.15.1 port and a transceiving circuit (wireless communication), an IEEE802.11b port and a transceiving circuit (wireless communication), or a local area network (LAN) terminal and a transceiving circuit (wired communication) may be used as the communication unit 212. Further, the communication unit 212 may have a configuration conforming to an arbitrary communication standard such as a universal serial bus (USB) terminal and a transceiving circuit or a configuration capable of performing communication such as an external device via a network.

For example, through the configuration illustrated in FIG. 17, the power receiving device 200 performs the process related to the billing method in the power receiving device according to the present embodiment (for example, from the process (I) (the communication process) to the process (III) (the power control process)). Thus, for example, through the configuration illustrated in FIG. 17, the power receiving device 200 can reduce the detriment that the user may suffer in billing performed on the occasion of supply of electric power.

The configuration of the power receiving device according to the present embodiment is not limited to the configuration illustrated in FIG. 17.

2-1. First Modified Example

For example, the power receiving device according to the present embodiment may not include the communication unit 212. Even when the communication unit 212 is not provided, for example, the power receiving device according to the present embodiment can perform the process (I) (the communication process) to the process (III) (the power control process) by performing the billing process using the electronic value stored in the internal memory 270 illustrated in FIGS. 13 and 14. Thus, the power receiving device according to the first modified example of the present embodiment can reduce the disadvantage to the user in billing for supply of electric power, for example, similarly to the case having the configuration illustrated in FIG. 17.

2-2. Second Modified Example

Further, for example, FIG. 17 illustrates the example in which the power receiving device according to the present embodiment has the configuration in which communication is performed through the power line communication according to the present embodiment. However, the power receiving device according to the present embodiment can perform communication with the wireless communication according to the present embodiment. More specifically, when communication is performed through the wireless communication according to the present embodiment, for example, the power receiving device according to the present embodiment includes the configuration of FIG. 8 in which communication is performed through the wireless communication according to the present embodiment instead of the configuration of FIG. 6 in which communication is performed through the power line communication according to the present embodiment.

Here, even when the configuration in which communication is performed through the wireless communication according to the present embodiment is provided, for example, the power receiving device according to the second modified example of the present embodiment can perform the process (I) (the communication process) to the process (III) (the power control process). Thus, the power receiving device according to the second modified example of the present embodiment can reduce the disadvantage to the user in billing for supply of electric power, for example, similarly to the case having the configuration illustrated in FIG. 17.

2-3. Third Modified Example

Further, for example, the power receiving device according to the present embodiment may have both the configuration in which communication is performed through the power line communication according to the present embodiment and the configuration in which communication is performed through the wireless communication according to the present embodiment. More specifically, for example, the power receiving device according to the present embodiment has the configuration of FIG. 6 in which communication is performed through the wireless communication according to the present embodiment and the configuration of FIG. 8 in which communication is performed through the power line communication according to the present embodiment.

Here, even when both the configuration in which communication is performed through the power line communication according to the present embodiment and the configuration in which communication is performed through the wireless communication according to the present embodiment are provided are provided, the device according to the third modified example of the present embodiment can perform the process (I) (the communication process) to the process (III) (the power control process). Thus, the power receiving device according to the third modified example of the present embodiment can reduce the disadvantage to the user in billing for supply of electric power, for example, similarly to the case having the configuration illustrated in FIG. 17. The power receiving device according to the third modified example of the present embodiment may perform different processes, for example, when the billing process is performed through the power line communication of the present embodiment and when the billing process is performed through the wireless communication according to the present embodiment.

2-4. Fourth Modified Example

Further, the power receiving device according to the present embodiment may be configured not to have the notice control unit 224 as described above. Even when having the configuration not to have the notice control unit 224, the power receiving device according to the present embodiment may perform the process (I) (the communication process) to the process (III) (the power control process). Thus, the power receiving device according to the fourth modified example of the present embodiment can reduce the disadvantage to the user in billing for supply of electric power, for example, similarly to the case having the configuration illustrated in FIG. 17.

2-5. Other Modified Example

For example, the power receiving device according to the present embodiment may have a so-called reader/writer function, similarly to the power supply device according to the present embodiment. In addition, for example, the power receiving device according to the present embodiment may have an arbitrary configuration in which some of the configurations according to from the first modified example to the fourth modified example are combined.

Hereinbefore, the power supply device has been described as the present embodiment, but the present embodiment is not limited to this example. For example, the present embodiment can be applied to various machines or facilities such as public electric outlets installed in airports, shops and so on, electrical outlets installed in buildings, such as apartments, houses, buildings or the like, devices that supply power to computers such as personal computers (PCs) or servers, multi-plugs, electric vehicles, power-driven devices, or the like, display devices, or the like. In addition, for example, the present embodiment can be applied to vehicles such as electric vehicles that undertake the function of the power supply device. Moreover, the power supply device according to the present embodiment may receive power transmitted from the external connection device. In other words, the power supply device according to the present embodiment may undertake the function of the power receiving device.

Further, the power receiving device has been described as the present embodiment, and the present embodiment is not limited to this example. For example, the present embodiment can be applied to various devices driven by electric power such as communication devices such as computers such as PC, mobile phones, or smart phones, video/audio reproducing devices (or video/audio recording/reproducing devices), portable game machines, display devices, television receivers, lighting devices, toasters, and vehicles driven by electric power such as electric vehicles. For example, the present embodiment can be applied to plugs. In addition, the power receiving device according to the present embodiment may transmit electric power to the external connection device. In other words, the power receiving device according to the present embodiment may undertake the function of the power supply device.

Program According to Present Embodiment

1. Program According to Power Supply Device According to Present Embodiment A program (for example, a program capable of executing the process related to the notice control method according to the present embodiment in the power supply device according to the present embodiment such as the process (I) (the communication process) to the process (III) (the power control process), and the above-mentioned notice control process) causing a computer to function as the power supply device according to the present embodiment is executed in a computer so as to reduce the disadvantage to a user in billing for supply of electric power.

2. Program According to Power Receiving Device According to Present Embodiment A program (for example, a program capable of executing the process related to the notice control method according to the present embodiment in the power receiving device according to the present embodiment such as the process (I) (the communication process) to the process (III) (the power control process), and the above-mentioned notice control process) capable of causing a computer to function as the power receiving device according to the present embodiment is executed in a computer, and thus the user can be notified of whether or not the external device connected via the power line supports a predetermined authentication function.

It should be understood by those skilled in the art that various modifications, combinations, sub-combinations and alterations may occur depending on design requirements and other factors insofar as they are within the scope of the appended claims or the equivalents thereof.

For example, it has been described above that a program (computer program) causing a computer to function as the power supply device according to the present embodiment or the power receiving device according to the present embodiment is provided. However, in the present embodiment, a recording medium recording each program described above or a recording medium recording both programs can be provided as well.

The above-described configuration illustrates an example of the present embodiment, and it should be understood that the above-described configuration belongs to the technical scope of the present disclosure.

Additionally, the present technology may also be configured as below.

(A1) A power supply device (100A, 100B, 100), comprising: a billing information generating unit (122) for generating billing information (S104) for an amount related to electric power transmitted by the power supply device; a billing processing unit (124) for performing a billing process (S106) based on the billing information, wherein performing the billing process includes: performing communication with a second device, and determining a result of the billing process based on the communication; and a power control unit (128) for selectively transmitting (S100, S110) electric power based on the result of the billing process.

(A2) The power supply device of (A1), wherein: performing communication with the second device includes: transmitting a billing process command to the second device, and receiving a response signal from the second device, the response signal representing the result of the billing process, the second device being a power receiving device (200A, 200B); and selectively transmitting the electric power comprises selectively transmitting the electric power to the power receiving device.

(A3) The power supply device of (A2), wherein the response signal is provided by load modulation, the power receiving device providing the response signal by performing load modulation based on a signal received from the power supply device.

(A4) The power supply device of (A1), wherein: performing communication with the second device includes: transmitting a billing process command to the second device, and receiving a response signal from the second device, the response signal representing the result of the billing process, the second device being a billing processing device; and selectively transmitting the electric power comprises selectively transmitting the electric power to a power receiving device (200A, 200B).

(A5) The power supply device of (A2) or (A4), wherein selectively transmitting the electric power to the power receiving device comprises selectively transmitting the electric power to the power receiving device via a power line (PL).

(A6) The power supply device of any of (A1) to (A5), wherein generating the billing information comprises generating the billing information when the amount related to the electric power transmitted by the power supply device satisfies a set condition.

(A7) The power supply device of (A6), wherein the amount related to the electric power comprises an amount of power supply time that elapses after the power control unit (128) begins transmitting the electric power, and the set condition comprises a predetermined time.

(A8) The power supply device of any of (A6) to (A7), wherein the amount related to the electric power comprises an amount of electric power that the power control unit (128) supplies after the power control unit begins transmitting the electric power, and the set condition comprises a predetermined amount of electric power.

(A9) The power supply device of any of (A6) to (A8), wherein the amount related to the electric power comprises a cost of an amount of electric power that the power control unit (128) supplies after the power control unit begins transmitting the electric power, and the set condition comprises a predetermined price.

(A10) The power supply device of any of (A1) to (A5), wherein the billing information corresponds to a power supply mode (S204, S206, S208) of the power supply device.

(A11) The power supply device of any of (A1) to (A5), wherein: when a total amount of electric power supplied is less than the predetermined value (S304), the billing information corresponds to a first unit price of electric power (S306); and when the total amount of electric power supplied is not less than the predetermined value (S308), the billing information corresponds to a second unit price of electric power (S310, S312).

(A12) The power supply device of any of (A1) to (A5), wherein selectively transmitting (S100, S110) the electric power comprises transmitting the electric power (S100) when the billing process is completed, and not transmitting (S110) the electric power when the billing process is not completed.

(A13) The power supply device of (A12), wherein: performing the billing process comprises determining (S410) whether there is an unpaid shortage when the billing process is not completed.

(A14) The power supply device of any (A1) to (A5), wherein generating the billing information comprises acquiring (S504) price information, and wherein the billing information corresponds to a price of electric power represented by the price information.

(A15) The power supply device of any of (A1) to (A14), wherein performing communication with the second device comprises performing the communication using a communication unit (104, 108).

(A16) The power supply device of (A1), further comprising: a power line communication unit (108) for performing communication with a power receiving device (200A, 200B) via a power line (PL); a first filter (110) for blocking a signal of a first frequency, the first filter being connected between the power line communication unit and the power line (PL); and an authenticating unit (126) for performing authentication on the power receiving device based on the communication with the power receiving device.

(A17) The power supply device of (A1), further comprising: a wireless communication unit (104) for performing wireless communication with a power receiving device (200A, 200B), the wireless communication unit comprising an antenna (152); and an authenticating unit (126) for performing authentication on the power receiving device based on the communication with the power receiving device.

(C1) A billing method comprising: generating billing information (S104) for an amount related to electric power transmitted by a power supply device (100, 100A, 100B); performing a billing process (S106) based on the billing information, wherein performing the billing process includes: performing communication with a second device, and determining a result of the billing process based on the communication; and selectively transmitting (S100, S110) electric power based on the result of the billing process.

(C2) The billing method of (C1), wherein: performing communication with the second device includes: transmitting a billing process command to the second device, and receiving a response signal from the second device, the response signal representing the result of the billing process, the second device being a power receiving device (200A, 200B); and selectively transmitting the electric power comprises selectively transmitting the electric power to the power receiving device.

(C3) The billing method of (C2), the power receiving device providing the response signal by performing load modulation based on a signal received from the power supply device.

(C4) The billing method of (C1), wherein: performing communication with the second device includes: transmitting a billing process command to the second device, and receiving a response signal from the second device, the response signal representing the result of the billing process, the second device being a billing processing device; and selectively transmitting the electric power comprises selectively transmitting the electric power to a power receiving device (200A, 200B).

(C5) The billing method of (C2) or (C4), wherein selectively transmitting the electric power to the power receiving device comprises selectively transmitting the electric power to the power receiving device via a power line (PL).

(C6) The billing method of any of (C1) to (C5), wherein generating the billing information comprises generating the billing information when the amount related to the electric power transmitted by the power supply device satisfies a set condition.

(C7) The billing method of (C6), wherein the amount related to the electric power comprises an amount of power supply time that elapses after the power supply device begins transmitting the electric power, and the set condition comprises a predetermined time.

(C8) The billing method of any of (C6) to (C7), wherein the amount related to the electric power comprises an amount of electric power that the power supply device supplies after the power supply device begins transmitting the electric power, and the set condition comprises a predetermined amount of electric power.

(C9) The billing method of any of (C6) to (C8), wherein the amount related to the electric power comprises a cost of an amount of electric power that the power supply device supplies after the power supply device begins transmitting the electric power, and the set condition comprises a predetermined price.

(C10) The billing method of any of (C1) to (C5), wherein the billing information corresponds to a power supply mode (S204, S206, S208) of the power supply device.

(C11) The billing method of any of (C1) to (C5), wherein: when a total amount of electric power supplied is less than the predetermined value (S304), the billing information corresponds to a first unit price of electric power (S306); and when the total amount of electric power supplied is not less than the predetermined value (S308), the billing information corresponds to a second unit price of electric power (S310, S312).

(C12) The billing method of any of (C1) to (C5), wherein selectively transmitting (S100, S110) the electric power comprises transmitting the electric power (S100) when the billing process is completed, and not transmitting (S110) the electric power when the billing process is not completed.

(C13) The billing method of (C12), wherein: performing the billing process comprises determining (S410) whether there is an unpaid shortage when the billing process is not completed.

(C14) The billing method of any of (C1) to (C5), wherein generating the billing information comprises acquiring (S504) price information, and wherein the billing information corresponds to a price of electric power represented by the price information.

(C15) The billing method of any of (C1) to (C14), wherein performing communication with the second device comprises performing the communication using a communication unit (104, 108).

(C16) The billing method of (C1), further comprising: performing communication with a power receiving device (200A, 200B) via a power line (PL) and through a first filter (110); and performing authentication on the power receiving device based on the communication with the power receiving device.

(C17) The billing method of (C1), further comprising: performing wireless communication with a power receiving device (200A, 200B) using an antenna (152); and performing authentication on the power receiving device based on the communication with the power receiving device.

(B1) A power receiving device (200), comprising:
a billing processing unit (220) for: determining (S600) whether billing information has been received, the billing information being for an amount related to electric power received from a power supply device; and after it is determined that the billing information has been received, performing (S602) a billing process;
a power control unit (222) for causing transmission of a response signal to the power supply device (100A, 100B, 100), the response signal being based on the billing process; and
a notice control unit for providing notice regarding information related to the billing process.

(B2) The power receiving device of (B1), wherein the response signal represents a result of the billing process.

(B3) The power receiving device of (B2), wherein causing transmission of the response signal comprises causing load modulation based on a signal received from the power supply device.

(B4) The power receiving device of any of (B1) to (B3), wherein the information related to the billing process comprises information on a configurable power supply mode.

(B5) The power receiving device of any of (B1) to (B4), wherein the information related to the billing process comprises information on a price of electric power.

(B6) The power receiving device of (B1), further comprising: a power line communication unit (208) for performing communication with the power supply device (100A, 100B, 100) via a power line (PL), the power line communication unit (208) being connected to the power line by a first filter (206), wherein performing the communication with the power supply device includes transmitting a response signal to the power supply device by performing load modulation based on a signal received from the power supply device.

(B7) The power receiving device of (B1), further comprising: a wireless communication unit (204) for performing wireless communication with the power supply device (100A, 100B, 100) using an antenna (250), wherein performing the wireless communication with the power supply device includes transmitting a response signal to the power supply device by performing load modulation based on a signal received from the power supply device.

(B8) The power receiving device of (B1), wherein performing the billing process comprises: generating a billing process command based on the billing information; and processing an electronic value based on the generated billing process command.

(B9) The power receiving device of any of (B1) or (B8), wherein: the power receiving device further comprises a communication unit (212); and performing the billing process comprises performing communication with an external billing process device using the communication unit (212).

(D1) A billing method, comprising: determining (S600) whether billing information has been received, the billing information being for an amount related to electric power received from a power supply device; after it is determined that the billing information has been received, performing (S602) a billing process; transmitting a response signal to the power supply device (100A, 100B, 100), the response signal being based on the billing process; and providing notice regarding information related to the billing process.

(D2) The billing method of (D1), wherein the response signal represents a result of the billing process.

(D3) The billing method of (D2), wherein transmitting the response signal comprises performing load modulation based on a signal received from the power supply device.

(D4) The billing method of any of (D1) to (D3), wherein the information related to the billing process comprises information on a configurable power supply mode.

(D5) The billing method of any of (D1) to (D4), wherein the information related to the billing process comprises information on a price of electric power.

(D6) The billing method of (D1), further comprising: performing communication with the power supply device (100A, 100B, 100) via a power line (PL) and through a first filter (206), wherein performing the communication with the power supply device includes transmitting a response signal to the power supply device by performing load modulation based on a signal received from the power supply device.

(D7) The billing method of (D1), further comprising: performing wireless communication with the power supply device (100A, 100B, 100) using an antenna (250), wherein performing the wireless communication with the power supply device includes transmitting a response signal to the power supply device by performing load modulation based on a signal received from the power supply device.

(D8) The billing method of (D1), wherein performing the billing process comprises: generating a billing process command based on the billing information; and processing an electronic value based on the generated billing process command.

(D9) The billing method of any of (D1) or (D8), wherein performing the billing process comprises performing communication with an external billing process device.

(E1)
A power supply device, including:
a connecting unit that connects a power line used to transmit electric power to an external device;
a billing information generating unit that generates billing information representing a cost of electric power supplied to an externally-connected device connected by a power line in a wired manner through the connecting unit for each predetermined amount related to transmitted electric power;
a billing processing unit that performs a billing process based on the generated billing information; and
a power control unit that causes the electric power to be selectively transmitted to the external connection device based on the result of the billing process.

(E2)
The power supply device according to (E1), further including
a first communication unit that performs communication with the external connection device,
wherein the billing processing unit performs the billing process by causing communication to be performed between the first communication unit and the external connection device.

(E3)
The power supply device according to (E2),
wherein the billing processing unit transmits a billing process command to the first communication unit as the billing process, the billing process command causing a value corresponding to the cost represented by the billing information to be subtracted from an electronic value, and
determines whether or not the billing process has been completed normally based on a response signal to the billing process command, which is received by the first communication unit.

(E4)
The power supply device according to (E3),
wherein when the response signal indicates that at least a part of values corresponding to the cost represented by the billing information is not able to be subtracted from the electronic value, the billing processing unit does not determine whether or not the billing process has been completed normally, and
when the billing process is not determined to have been completed normally, the billing processing unit causes a notice regarding shortage corresponding to the at least a part of the values to be reported.

(E5)
The power supply device according to (E3), further including
a second communication unit that performs communication with an external billing processing device performing billing for a user of the external connection device, wherein the billing processing unit causes the second communication unit to transmit the billing information or billing information corresponding to a part of a cost represented by the billing information to the external billing processing device when it is determined that the billing process is not completed normally.

(E6)
The power supply device according to (E1), further comprising:
a first communication unit that performs communication with the external connection device; and
a second communication unit that performs communication with an external billing processing device performing billing on a user of the external connection device, wherein the billing processing unit performs at least one of the billing process by causing the first communication unit to perform communication with the external connection device or the billing process by causing the second communication unit to transmit the billing information to the external billing processing device, based on a set billing process setting.

(E7)
The power supply device according to (E1), further including:
a first communication unit that performs communication with the external connection device; and
an authenticating unit that performs authentication on the external connection device based on identification information representing the external connection device, which is acquired from the external connection device,
wherein the power control unit causes the electric power to be selectively transmitted to the external connection device based on a result of the billing process and a result of the authentication.

(E8)
The power supply device according to (E1),
wherein the billing information generating unit generates billing information that represents a cost corresponding to an power supply mode being set among power supply modes regarding a plurality of levels of power supply speed.

(E9)
The power supply device according to (E1),
wherein the billing information generating unit generates billing information corresponding to total amount of electric power supplied to the external connection device.

(E10)
The power supply device according to (E1),
wherein the billing information generating unit generates billing information corresponding to price of electric power indicated by acquired price information indicating price of electric power.

(E11)
The power supply device according to (E2),
wherein the first communication unit transmits a signal to the external connection device, and receives a response signal transmitted by performing load modulation based on a received signal in the external connection device.

(E12)
The power supply device according to (E11),
wherein the first communication unit includes
a power line communication unit that transmits a high-frequency signal having a frequency higher than a frequency of the power through the power line, and performs communication with the external connection device, and
a communication filter that is connected between the power line communication unit and the power line, blocks at least a signal having the frequency of the power, and does not block the high-frequency signal.

(E13)
The power supply device according to (E11),
wherein the first communication unit includes
a communication antenna that transmits a carrier wave according to a high-frequency signal having a frequency higher than a frequency of the power, and
a wireless communication unit that transmits the high-frequency signal through the communication antenna, and performs communication with the external connection device.

(E14)
The power supply device according to (E1), further including
a second communication unit that performs communication with an external billing processing device performing billing on a user of the external connection device, wherein the billing processing unit causes the second communication unit to transmit the billing information to the external billing processing device as the billing process.

(E15)
The power supply device according to (E1),
wherein a predetermined amount related to the transmitted electric power is one or two or more of a time of power supply to the external connection device, an amount of electric power supplied to the external connection device, and a cost corresponding to an amount of electric power supplied to the external connection device.

(E16)
A power receiving device, including:
a connecting unit that is connected with a power line used to transmit electric power;
a communication unit that is connected by a power line in a wired manner through the connecting unit and performs communication with a power supply device performing transmission of electric power;
a billing processing unit that performs a billing process based on billing information representing a cost of supplied electric power, which is generated for each predetermined amount related to electric power transmitted to the power line in the power supply device and transmitted from the power supply device; and
a power control unit that causes the power supply device to selectively transmit the electric power based on the result of the billing process.

(E17)
A billing method, including:
generating billing information representing a cost of electric power supplied to an external connection device connected by the power line in a wired manner for each predetermined amount related to electric power transmitted to a power line;
performing a billing process based on the generated billing information; and
causing electric power to be selectively transmitted to the external connection device based on a result of the billing process.

(E18)
A billing method, including:
performing communication with a power supply device that is connected by a power line used to transmit electric power in a wired manner and performs transmission of electric power;
performing a billing process based on billing information representing a cost of supplied electric power, which is generated for each predetermined amount related to electric power transmitted to the power line in the power supply device and transmitted from the power supply device; and
causing the power supply device to selectively transmit the electric power based on the result of the billing process.

(E19)
A program causing a computer to execute:
generating billing information representing a cost of electric power supplied to an external connection device connected by the power line in a wired manner for each predetermined amount related to electric power transmitted to a power line;
performing a billing process based on the generated billing information; and causing electric power to be selectively transmitted to the external connection device based on a result of the billing process.

(E20)
A program causing a computer to execute:
performing communication with a power supply device that is connected by a power line used to transmit electric power in a wired manner and performs transmission of electric power;
performing a billing process based on billing information representing a cost of supplied electric power, which is generated for each predetermined amount related to electric power transmitted to the power line in the power supply device and transmitted from the power supply device; and
causing the power supply device to selectively transmit the electric power based on the result of the billing process.

REFERENCE SIGNS LIST 100, 100A, 100B Power Supply Device
102, 202 Connecting Unit
104, 204 Wireless Communication Unit
106 Control Unit
108, 208 Power Line Communication Unit
110, 206 First Filter
112, 210 Second Filter
114 Power Supply Unit
116 Power Consumption Measuring Unit
118 Storage Unit
120, 212 Communication Unit
122 Billing Information Generating Unit
124, 220 Billing Processing Unit
126 Authenticating Unit
128, 222 Power Control Unit
200, 200A, 200B Power Receiving Device
224 Notice Control Unit

The invention claimed is:
1. A first device, comprising:
a billing information generating unit configured to generate billing information for an amount related to electric power transmitted by the first device, wherein the first device is a power supply device;
a power line communication unit configured to communicate with a second device via a power line;
a billing processing unit configured to:
communicate with the second device to execute a billing process based on the communication via the power line and the billing information;
receive a response signal indicating a result of the billing process from the second device based on the communication, wherein
the response signal is transmitted by the second device by load modulation performed based on a first signal received from the first device; and
determine the result of the billing process based on the response signal; and a power control unit configured to selectively transmit electric power to the second device based on the determined result.

2. The first device of claim 1, further comprising:
a filter configured to block a second signal of a frequency, wherein
the second device is a power receiving device,
the power supply device and the power receiving device are connected through the power line,
the frequency is associated with the power receiving device, and
the filter is connected between the power line communication unit and the power line; and
an authenticating unit configured to authenticate the power receiving device based on the communication with the power receiving device.

3. The first device of claim 1, wherein
the billing processing unit is further configured to:
transmit a billing process command to the second device; and
receive the response signal from the second device based on the billing process command, and
the second device is a power receiving device.

4. The first device of claim 1, wherein
the billing processing unit is further configured to:
transmit a billing process command to the second device; and
receive the response signal from the second device based on the billing process command, and
the second device is a billing processing device.

5. The first device of claim 1, wherein the billing processing unit is further configured to transmit the electric power to the second device via a power line.

6. The first device of claim 1, wherein the billing information generating unit is further configured to generate the billing information based on the amount that satisfies a set condition.

7. The first device of claim 6,
wherein the amount comprises a duration of power supply time that elapses after the power control unit begins the selective transmission of the electric power, and
wherein the set condition comprises a determined time.

8. The first device of claim 6,
wherein the amount comprises a total amount of the electric power that the power control unit supplies after the power control unit begins the selective transmission of the electric power, and
wherein the set condition comprises a determined amount of the electric power.

9. The first device of claim 6,
wherein the amount comprises a cost of an amount of the electric power that the power control unit supplies after the power control unit begins the selective transmission of the electric power, and
wherein the set condition comprises a determined price.

10. The first device of claim 1,
wherein the billing information corresponds to a power supply mode of the power supply device, and
wherein the power supply mode corresponds to a supply speed of the electric power.

11. The first device of claim 1, wherein
the billing information corresponds to a first unit price of the electric power based on a determination that a total amount of the electric power supplied is less than a determined value, and
the billing information corresponds to a second unit price of the electric power based on a determination that the total amount of the electric power supplied is greater than the determined value.

12. The first device of claim 1, wherein the power control unit is further configured to transmit the electric power based on a completion of the billing process.

13. The first device of claim 12, wherein the billing processing unit is further configured to determine an unpaid shortage based on incompletion of the billing process.

14. The first device of claim 1,
wherein the billing information generating unit is further configured to acquire price information, and
wherein the billing information corresponds to a price of the electric power indicated by the price information.

15. The first device of claim 1, wherein the billing information generating unit is further configured to:
change a cost of the electric power based on a power supply speed of the first device; and
generate the billing information that indicates the changed cost of the electric power.

16. The first device of claim 1, further comprising:
a power consumption measuring unit configured to measure power consumption corresponding to the electric power transmitted to the second device, wherein the second device is a power receiving device.

17. A power receiving device, comprising:
a power line communication unit configured to communicate with a power supply device via a power line;
a billing processing unit configured to:
determine that billing information is received, wherein the billing information is for an amount related to electric power received from the power supply device;
execute a billing process based on the communication via the power line and the billing information;
a power control unit configured to:
transmit a response signal to the power supply device based on the billing process, wherein
the response signal is transmitted by load modulation, and
the load modulation is based on a signal received from the power supply device, and
the response signal indicates a result of the billing process;
control reception of the electric power from the power supply device based on the result of the billing process; and
a notice control unit configured to generate notice information related to the billing process.

18. The power receiving device of claim 17, wherein
the power supply device and the power receiving device are connected through a power line, and
the power line communication unit is connected to the power line by a filter.

19. The power receiving device of claim 17, wherein the billing information comprises information associated with a configurable power supply mode.

20. The power receiving device of claim 17, wherein the billing processing unit is further configured to:
generate a billing process command based on the billing information; and
process an electronic value based on the generated billing process command.

* * * * *